United States Patent
Mullins

(10) Patent No.: US 11,961,319 B2
(45) Date of Patent: Apr. 16, 2024

(54) MONITORING SYSTEMS

(71) Applicant: Raptor Vision, LLC, Tustin, CA (US)

(72) Inventor: Scott Charles Mullins, Tustin, CA (US)

(73) Assignee: Raptor Vision, LLC, Tustin, CA (US)

( * ) Notice: Subject to any disclaimer, the term of this patent is extended or adjusted under 35 U.S.C. 154(b) by 0 days.

(21) Appl. No.: 16/843,730

(22) Filed: Apr. 8, 2020

(65) Prior Publication Data

US 2020/0364999 A1 Nov. 19, 2020

Related U.S. Application Data

(60) Provisional application No. 62/947,468, filed on Dec. 12, 2019, provisional application No. 62/907,484, (Continued)

(51) Int. Cl.
*H04N 7/18* (2006.01)
*G06T 7/292* (2017.01)
(Continued)

(52) U.S. Cl.
CPC ............ *G06V 40/103* (2022.01); *G06T 7/292* (2017.01); *G06T 7/70* (2017.01); *G06V 20/53* (2022.01);
(Continued)

(58) Field of Classification Search
CPC ........... G06K 9/00369; G06K 9/00778; G06K 2009/00738; G06K 9/0077;
(Continued)

(56) References Cited

U.S. PATENT DOCUMENTS 5,151,684 A 9/1992 Johnsen
6,476,859 B1 11/2002 Galloway et al.
(Continued)

FOREIGN PATENT DOCUMENTS

CA 2 971 586 12/2017
CN 109391757 2/2019
(Continued)

OTHER PUBLICATIONS

Written Opinion for PCT Application No. PCT/US2020/027312 dated Oct. 29, 2020.
(Continued)

*Primary Examiner* — Gims S Philippe
(74) *Attorney, Agent, or Firm* — KNOBBE MARTENS OLSON & BEAR LLP

(57) ABSTRACT

A system can use a video analytic algorithm and/or other input parameters to identify an event (e.g., theft). Optionally, the system can take action in response. For example, the security system can use video analytics to determine that a person has reached into a shelf multiple times at a rate above a threshold, which can indicate that a thief is quickly removing items from the shelf. A monitoring system can monitor other areas for breaches, such as an entrance to a store or residence. Monitoring entrances and/or exits can be used to determine occupancy, or to determine rush events to prompt customer service action, such as opening additional point of sale stations.

21 Claims, 39 Drawing Sheets

Related U.S. Application Data filed on Sep. 27, 2019, provisional application No. 62/865,828, filed on Jun. 24, 2019, provisional application No. 62/831,955, filed on Apr. 10, 2019.

(51) Int. Cl.
| | |
|---|---|
| *G06T 7/70* | (2017.01) |
| *G06V 20/52* | (2022.01) |
| *G06V 40/10* | (2022.01) |
| *G08B 13/196* | (2006.01) |

(52) U.S. Cl.
CPC . *G08B 13/19615* (2013.01); *G08B 13/19645* (2013.01); *G08B 13/1968* (2013.01); *G08B 13/19682* (2013.01); *H04N 7/181* (2013.01); *G06T 2207/10016* (2013.01)

(58) Field of Classification Search
CPC ........ G08B 13/19615; G08B 13/19645; G08B 13/1968; G08B 13/19682; G06T 7/292; G06T 7/70; G06T 2207/10016; H04N 7/181
USPC ........................................................ 348/152
See application file for complete search history.

(56) References Cited

U.S. PATENT DOCUMENTS

| | | | |
|---|---|---|---|
| 6,528,788 B1 | 3/2003 | Galloway | |
| 6,628,835 B1 | 9/2003 | Brill et al. | |
| 6,653,939 B2 | 11/2003 | Galloway | |
| 6,693,279 B2 | 2/2004 | Porter et al. | |
| 6,710,345 B2 | 3/2004 | Carter et al. | |
| 6,727,938 B1 * | 4/2004 | Randall ............ | G08B 13/19602 348/143 |
| 6,744,049 B2 | 6/2004 | Galloway | |
| 6,809,595 B2 | 10/2004 | Porter et al. | |
| 6,818,893 B2 | 11/2004 | Carter | |
| 6,992,291 B2 | 1/2006 | Porter et al. | |
| 6,992,292 B2 | 1/2006 | Cross | |
| 7,008,063 B2 | 3/2006 | Porter et al. | |
| 7,263,500 B2 | 8/2007 | Deal | |
| D550,198 S | 9/2007 | Deal | |
| 7,355,626 B2 | 4/2008 | Porter et al. | |
| D583,355 S | 12/2008 | Wente | |
| 7,778,855 B2 | 8/2010 | Holliday | |
| 7,796,780 B2 | 9/2010 | Lipton et al. | |
| 7,801,330 B2 | 9/2010 | Zhang et al. | |
| 7,957,565 B1 | 6/2011 | Sharma et al. | |
| 8,325,036 B1 | 12/2012 | Fuhr et al. | |
| 8,438,175 B2 * | 5/2013 | Papke ................... | G06F 16/784 707/756 |
| 8,489,065 B2 | 7/2013 | Green et al. | |
| 8,564,661 B2 | 10/2013 | Lipton et al. | |
| 8,629,772 B2 | 1/2014 | Valiulis et al. | |
| 8,731,241 B2 | 5/2014 | Johnson et al. | |
| 8,803,687 B2 | 8/2014 | Valiulis et al. | |
| 8,866,612 B1 | 10/2014 | Foster | |
| 8,884,761 B2 | 11/2014 | Valiulis | |
| 9,000,926 B2 | 4/2015 | Hollock et al. | |
| 9,035,771 B2 | 5/2015 | Argue et al. | |
| 9,196,136 B2 | 11/2015 | King | |
| 9,318,007 B2 | 4/2016 | Valiulis et al. | |
| 9,318,008 B2 | 4/2016 | Valiulis et al. | |
| 9,324,220 B2 | 4/2016 | Valiulis | |
| 9,530,060 B2 | 12/2016 | Zhang et al. | |
| 9,591,267 B2 | 3/2017 | Lipton et al. | |
| 9,613,518 B2 | 4/2017 | Dunn et al. | |
| 9,672,707 B2 | 6/2017 | Kerzner | |
| 9,674,458 B2 | 6/2017 | Teich et al. | |
| 9,697,709 B2 | 7/2017 | King et al. | |
| 9,740,937 B2 | 8/2017 | Zhang et al. | |
| 9,787,862 B1 | 10/2017 | Newman et al. | |
| 9,805,582 B2 | 10/2017 | Jedwab | |
| 9,922,483 B2 | 3/2018 | Forshaw | |
| 9,965,936 B1 | 5/2018 | Epps | |
| 10,043,360 B1 | 8/2018 | Mullins | |
| 10,055,850 B2 | 8/2018 | Piekniewski et al. | |
| 10,186,124 B1 | 1/2019 | Mullins | |
| 10,373,322 B1 | 8/2019 | Buibas et al. | |
| 10,445,944 B2 | 10/2019 | Galera et al. | |
| 10,497,231 B2 | 12/2019 | Mullins | |
| 10,510,227 B2 | 12/2019 | King et al. | |
| 11,216,827 B2 | 1/2022 | Budano et al. | |
| 2002/0095490 A1 | 7/2002 | Baker et al. | |
| 2003/0107650 A1 | 6/2003 | Colmenarez et al. | |
| 2003/0136910 A1 | 7/2003 | Carter | |
| 2004/0105570 A1 * | 6/2004 | Venetianer ................ | G06T 7/80 382/100 |
| 2004/0190767 A1 | 9/2004 | Tedesco et al. | |
| 2005/0078853 A1 | 4/2005 | Buehler et al. | |
| 2006/0053342 A1 | 3/2006 | Bazakos et al. | |
| 2006/0078047 A1 | 4/2006 | Shu et al. | |
| 2006/0262958 A1 | 11/2006 | Yin et al. | |
| 2007/0051872 A1 | 3/2007 | Goldberg et al. | |
| 2007/0273514 A1 | 11/2007 | Winand et al. | |
| 2008/0018738 A1 | 1/2008 | Lipton et al. | |
| 2008/0074496 A1 | 3/2008 | Venetianer et al. | |
| 2008/0317286 A1 | 12/2008 | Thorpe et al. | |
| 2009/0140850 A1 | 6/2009 | Kangas et al. | |
| 2009/0179988 A1 | 7/2009 | Reibel et al. | |
| 2009/0268028 A1 | 10/2009 | Ikumi et al. | |
| 2010/0149330 A1 | 6/2010 | Salgar et al. | |
| 2010/0195865 A1 * | 8/2010 | Luff ...................... | H04H 60/33 382/100 |
| 2011/0228984 A1 | 9/2011 | Papke et al. | |
| 2011/0295583 A1 | 12/2011 | Hollock et al. | |
| 2012/0038456 A1 | 2/2012 | Pikkarainen et al. | |
| 2012/0150586 A1 | 6/2012 | Harper et al. | |
| 2012/0176496 A1 | 7/2012 | Carbonell et al. | |
| 2013/0182114 A1 | 7/2013 | Zhang et al. | |
| 2013/0246182 A1 | 9/2013 | Bradley et al. | |
| 2013/0305261 A1 | 11/2013 | Snell et al. | |
| 2014/0104034 A1 | 4/2014 | Ambrefe, Jr. et al. | |
| 2014/0161315 A1 * | 6/2014 | Ostrovsky-Berman ...................... | G06F 40/186 382/103 |
| 2014/0362223 A1 | 12/2014 | LaCroix et al. | |
| 2015/0294183 A1 * | 10/2015 | Watanabe ................ | G07C 9/28 382/203 |
| 2015/0312602 A1 | 10/2015 | Myers et al. | |
| 2016/0006991 A1 | 1/2016 | Sablak et al. | |
| 2016/0019698 A1 * | 1/2016 | Kalva ................ | G06K 9/00778 382/103 |
| 2016/0043905 A1 | 2/2016 | Fiedler | |
| 2016/0133021 A1 | 5/2016 | Gouda et al. | |
| 2016/0148218 A1 * | 5/2016 | Koch ................ | G06Q 30/0201 705/7.29 |
| 2016/0342929 A1 | 11/2016 | Tanaka et al. | |
| 2017/0004694 A1 | 1/2017 | Dodson | |
| 2017/0024986 A1 | 1/2017 | Austin | |
| 2017/0053191 A1 * | 2/2017 | Koyama ............ | G06K 9/00771 |
| 2017/0234067 A1 | 8/2017 | Fasi et al. | |
| 2017/0256148 A1 | 9/2017 | King et al. | |
| 2017/0308939 A1 | 10/2017 | Krishnan et al. | |
| 2018/0192057 A1 | 7/2018 | Ardo et al. | |
| 2018/0247132 A1 * | 8/2018 | Liu ................... | G06K 9/00362 |
| 2019/0012547 A1 | 1/2019 | Togashi et al. | |
| 2019/0012607 A1 | 1/2019 | Holliday et al. | |
| 2019/0088096 A1 * | 3/2019 | King ............... | G08B 13/19665 |
| 2019/0149725 A1 | 5/2019 | Adato et al. | |
| 2019/0325230 A1 | 10/2019 | Nadler | |
| 2019/0392605 A1 | 12/2019 | Holliday et al. | |
| 2020/0211343 A1 | 7/2020 | Mullins | |
| 2020/0286347 A1 | 9/2020 | Kernzer | |
| 2020/0349820 A1 | 11/2020 | Speagle et al. | |

FOREIGN PATENT DOCUMENTS

| | | |
|---|---|---|
| JP | 2002252848 | 9/2002 |
| JP | 2017-118324 | 6/2017 |
| KR | 10-2015-437120000 | 8/2015 |

(56) References Cited

FOREIGN PATENT DOCUMENTS

| KR | 10-2016-0081736 | 7/2016 |
|---|---|---|
| TW | 201830973 | 8/2018 |
| TW | 201901626 | 1/2019 |
| WO | WO 2017/122258 | 7/2017 |
| WO | WO 2019/083902 | 5/2019 |
| WO | WO 2020/210385 | 10/2020 |

OTHER PUBLICATIONS

International Search Report for PCT Application No. PCT/US2020/027312 dated Oct. 29, 2020.
U.S. Appl. No. 16/888,236, filed May 29, 2020, Mullins.
Written Opinion for PCT Application No. PCT/US2018/056934 dated Feb. 8, 2019.
International Search Report for PCT Application No. PCT/US2018/056934 dated Feb. 8, 2019.
Transcript of "Perimeter Protection in VideoEdge and victor 5.0 and above," Aug. 22, 2017, video available at: http://learn.tycosecurityproducts.com/video/Perimeter-Protection-in-VideoEdge-and-victor-50-and-above/4112a02c147b83549245bf8a0664f358.
Occupancy Monitoring and Desk Occupancy Sensors, retrieved May 21, 2020 from: https://www.pressac.com/occupancy-monitoring/ https://www.pressac.com/desk-occupancy-sensors/.
Ahmad et al., "An Intelligent Real-Time Occupancy Monitoring System Using Single Overhead Camera." Proceedings of the 2018 Intelligent Systems Conference, IntelliSys 2018, AISC 869, pp. 957-969, Nov. 2018.
Axis Occupancy Estimator, Sep. 4, 2019, https://www.axis.com/en-us/products/axis-occupancy-estimator/.
Axis Store Optimization: Reference Guide, dated Apr. 2018.
Axis Occupany Estimator—Data Sheet. Appears to have a date of 2013.
Axis—Flexible and Reliable Recording Solutions—Edge Storage, appears to have a date of 2017.
Axis announces tightly integrated edge storage for more robust video surveillance systems, dated Sep. 19, 2011.
Anthony, K.S., "This AI Detects Shoplifters Before They Steal, But There's Something Even Creepier About It," Mar. 7, 2019.
Cal Atlantic. "Everything You Need to Know About Intelligent Video Surveillance Systems for Retail," Apr. 10, 2020.
U.S. Appl. No. 17/739,011, filed May 6, 2022, Mullins.
Written Opinion for PCT Application No. PCT/US2021/073163 dated Apr. 20, 2022.
International Search Report for PCT Application No. PCT/US2021/073163 dated Apr. 20, 2022.

\* cited by examiner

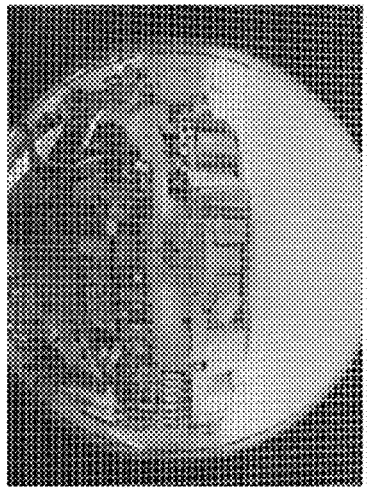
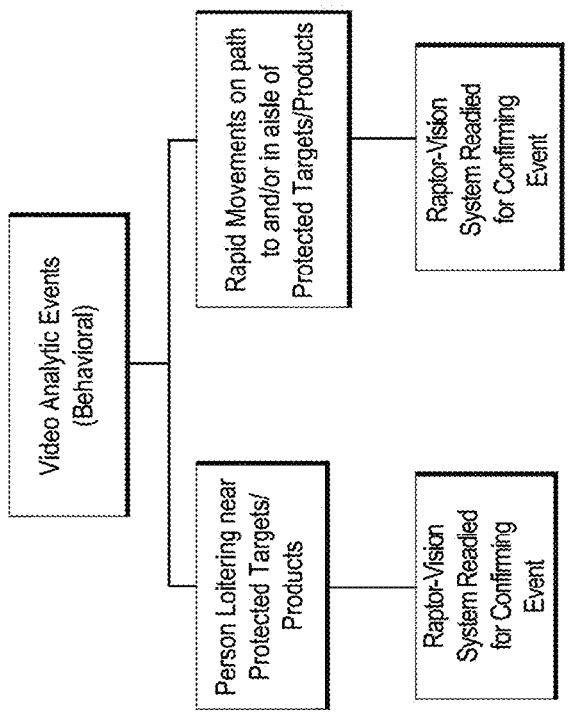
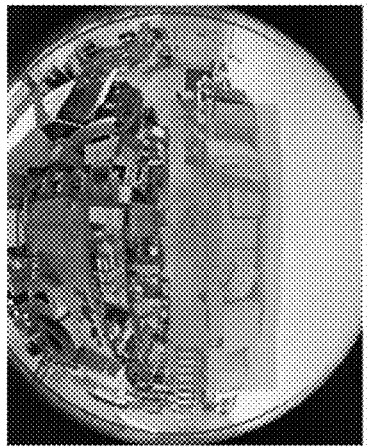
FIG. 4

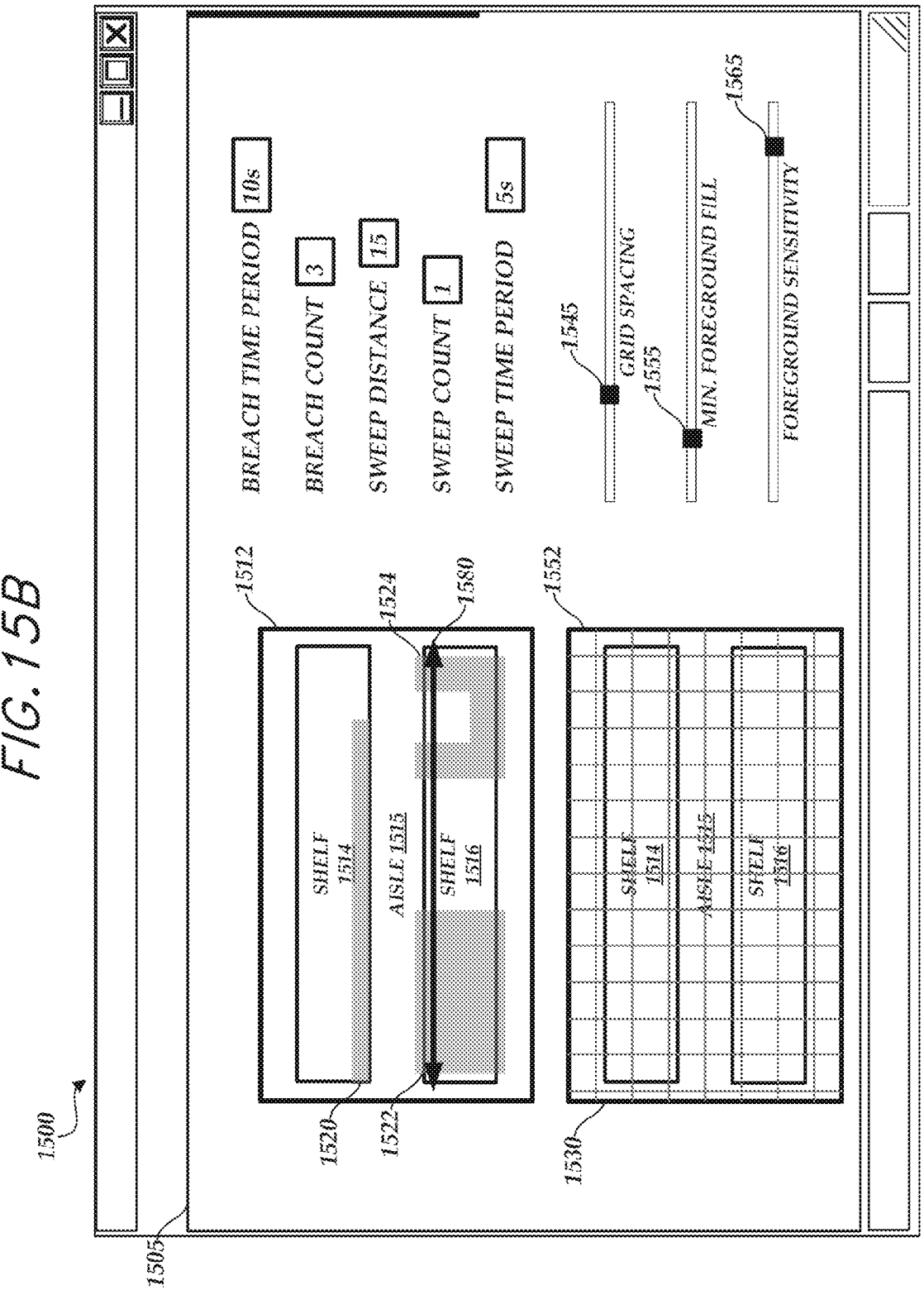

| Camera | Rule | Combine | Trigger Count | Reset Seconds | Delay Seconds | Confirm |
|---|---|---|---|---|---|---|
| Door 1 | Entry Count | | 30 | 180 | 300 | X |
| Door 2 | Entry Count | X | ///// | ///// | ///// | ///// |
| Retail Shelf 1 | Breach Count | | 4 | 10 | | |
| Retail Shelf 2 | Breach Count | | 4 | 10 | | |

Fig. 31

| Camera | Rule | Time Range | | | Trigger Count | Reset Seconds | Delay Seconds |
|---|---|---|---|---|---|---|---|
| Door 1 | Entry Count | 7:00 AM | to | 11:00 AM | 10 | 180 | 120 |
| | | 11:00 AM | to | 4:00 PM | 20 | 120 | 360 |
| | | 4:00 PM | to | 11:00 PM | 30 | 120 | 360 |
| | | 11:00 PM | to | 7:00 AM | 2 | 240 | 0 |

Fig. 32

MONITORING SYSTEMS

CROSS-REFERENCE TO RELATED APPLICATIONS

This application claims the benefit under 35 U.S.C. § 119(e) of U.S. Provisional Patent Application No. 62/831,955, filed Apr. 10, 2019, and titled BEHAVIORAL INTRUSION DETECTION SYSTEM; U.S. Provisional Patent Application No. 62/865,828, filed Jun. 24, 2019, and titled BEHAVIORAL INTRUSION DETECTION SYSTEM; U.S. Provisional Patent Application No. 62/907,484, filed Sep. 27, 2019, and titled MONITORING SYSTEMS; and U.S. Provisional Patent Application No. 62/947,468, filed Dec. 12, 2019, and titled MONITORING SYSTEMS. The above-identified applications are hereby incorporated by reference in their entirety and made a part of this specification for all that they disclose. U.S. Pat. No. 10,186,124 is also hereby incorporated by reference herein in its entirety.

BACKGROUND

Security systems are often installed to detect and/or deter crime. For example, a security system can be installed in a home, a bank, an office building, or any other type of structure. If crime is detected, the security system can be configured to sound an alarm, notify authorities, close doors, enable locks, and/or the like. Monitoring systems can be used to identify events, such as theft or other crimes, as well as to monitor other types of events or actions.

SUMMARY OF SOME FEATURES

The systems, methods, and devices described herein each have several aspects, no single one of which is solely responsible for its desirable attributes. Without limiting the scope of this disclosure, several non-limiting features will now be discussed briefly.

One aspect of the disclosure provides a system for deterring organized retail crime. The system comprises a camera positioned to monitor a merchandise area in a retail store, the merchandise area having one or more merchandise shelves, where the camera is configured to produce video footage comprising image frames that include at least a portion of the one or more merchandise shelves; a speaker positioned to deliver audio to the merchandise area; a store terminal comprising: a terminal display, a terminal speaker, and a terminal microphone; an alarm controller comprising: a hardware processor, and non-transitory computer-readable memory in communication with the hardware processor, the memory storing one or more threshold pixel difference criteria, a threshold breach distance value, a threshold breach time value, a threshold breach count value, and instructions executable by the processor to cause the alarm controller to: receive the video footage comprising the multiple image frames from the camera, compare a first group of pixels at a first location in a first image frame to a second group of pixels at the first location in a second image frame that is subsequent to the first image frame, identify a first breach into the one or more merchandise shelves based at least in part on a determination that a difference between the first group of pixels and the second group of pixels satisfies the one or more threshold pixel difference criteria, compare a third group of pixels at a second location in a third image frame to a fourth group of pixels at the second location in a fourth image frame, where the third image frame is subsequent to the second image frame, and where the fourth image frame is subsequent to the third image frame, identify a second breach into the one or more merchandise shelves based at least in part on a determination that a difference between the third group of pixels and the fourth group of pixels satisfies the one or more threshold pixel difference criteria, associate the first breach and the second breach together based at least in part on a determination that a distance between the first location and the second location is less than the threshold breach distance value, and based at least in part on a determination that a duration of time between the first breach and the second breach is less than the threshold breach time value, determine a potential theft event by at least identifying a number of associated breaches that satisfies the threshold breach count value, where the associated breaches are at locations within the threshold breach distance value and at times within the threshold breach time value, in response to the determination of the potential theft event, cause the speaker to broadcast an automated message to the merchandise area, and in response to the determination of the potential theft event, establish a communication link between the camera and the store terminal, to display video footage from the camera on the terminal display, and to enable audio communication from the terminal microphone through the speaker; and an alarm trigger system configured to send an alarm notification to an outside system in response to the determination of the potential theft event.

The system of the preceding paragraph can include any sub-combination of the following features: where the system further comprises a user interface configured to receive user input to change the threshold distance value, the threshold time value, and the threshold breach count value; where the system further comprises a user interface configured to receive user input to define a mask area in the image frames, where the alarm controller is configured to analyze the mask area of the image frames to identify the breaches; where the memory stores a threshold sweep distance value and a threshold sweep time value, and where the instructions are executable by the processor to cause the alarm controller to: compare corresponding groups of pixels at a first location in a first pair of image frames, and determine a difference between the corresponding groups of pixels, compare corresponding groups of pixels at a second location that is adjacent to the first location in a subsequent second pair of the image frames, and determine a difference between the corresponding groups of pixels, compare one or more corresponding groups of pixels at one or more further locations, which are each adjacent to a prior compared location, in one or more further pairs of the image frames, and determine differences between the corresponding groups of pixels, and determine the potential theft event by at least identifying a series of differences between corresponding groups of pixels across a series of adjacent locations in a series of the image frames, where the series of differences each satisfy the one or more threshold pixel difference criteria, where a distance across the series of adjacent locations satisfies the threshold sweep distance value, and where the series of image frames occur within the threshold sweep time value; where the alarm controller is configured analyze the video footage and identify individual person(s) and to determine the potential theft event based at least in part on a number of person(s) present at the merchandise area; where the system further comprises a display at the merchandise area, where the display has a first operating mode for displaying advertising information, where the display has a second operating mode for displaying one or more images to deter theft, where the display transitions from the first operating mode to the second operating mode in response to the determination of the potential theft event; where the store terminal has a terminal camera, and where the display in the second operating mode displays video footage from the terminal camera; where the store terminal is a video phone; where the system further comprises a facial recognition camera at an entrance to the retail store, where the alarm controller is configured to access a facial recognition data store with face information for suspected criminals, and where the alarm controller is configured to perform facial recognition analysis on images of people captured by the facial recognition camera to determine whether the people are suspected criminals; where the alarm controller is configured to send a notification to the store terminal in response to a determination that a person on one or more images captured by the facial recognition camera is a suspected criminal; where the system further comprises one or more motion detectors at the merchandise area, and where the alarm controller is configured to determine the potential theft event based at least in part on information from the one or more motion sensors; where the system further comprises one or more seismic sensors at the merchandise area, and where the alarm controller is configured to determine the potential theft event based at least in part on information from the one or more seismic sensors; and where a public address (PA) system of the store comprises the speaker, and where the alarm controller is configured cause the PA system to broadcast the automated message in response to the determination of the potential theft event.

Another aspect of the disclosure provides a security system comprising: a camera positioned to monitor a merchandise area, where the camera is configured to produce video footage comprising image frames that include at least a portion of the merchandise area; a speaker positioned to deliver audio to the merchandise area; and an alarm controller configured to: receive the video footage comprising the multiple image frames from the camera, apply a mask to the image frames to define a monitored area that comprises a subset of pixels in the image frames, determine a potential theft event based at least in part on: (a) detecting a threshold number of breaches in the monitored area within a threshold amount of time, where the alarm controller is configured to detect a breach by comparing a group of pixels within the monitored area in a first image frame with a corresponding group of pixels within the monitored area in a second image frame that is subsequent to the first image frame, or (b) detecting at least one sweep action by identifying a series of changes between corresponding groups of pixels across a series of adjacent locations in a series of the image frames, where the series of adjacent locations extend across a distance in the image frames that satisfies a threshold distance, and where the series of image frames occur within a threshold amount of time, and cause the speaker to broadcast an audio message to the merchandise area in response to the determination of the potential theft event.

The security system of the preceding paragraph can include any sub-combination of the following features: where the alarm controller is configured to determine the potential theft event based at least in part on detecting the threshold number of breaches within the threshold amount of time; where the alarm controller is configured to determine the potential theft event based at least in part on detecting the sweep action; where the alarm controller is configured to cause the speaker to automatically broadcast a prerecorded message in response to the determination of the potential theft event; where the system further comprises a terminal that includes a terminal display, where the alarm controller is configured to establish a communication link between the camera and the terminal in response to the determination of the potential theft event to display video footage from the camera on the terminal display; where the terminal has a terminal microphone for receiving a voice message from a user at the terminal, and where the audio message broadcast by the speaker is the voice message received by the terminal microphone; where the terminal comprises a video phone; where the alarm controller is configured analyze the video footage and determine a number of people in the area, and where the alarm controller is configured to determine the potential theft event based at least in part on the determined number of people in the area; where the system further comprises a display visible at the area, where the display has a first operating mode and a second operating mode for displaying one or more images to deter theft, where the display transitions from the first operating mode to the second operating mode in response to the determination of the potential theft event; and where a terminal has a terminal camera, and where the display in the second operating mode shows video footage from the terminal camera.

Another aspect of the disclosure provides a method for setting up a security system in a retail store. The method comprises: providing an alarm controller configured to process video footage and determine a potential theft event based at least in part on (a) multiple breaches detected in a monitored area of the video footage, or (b) a sweep action detected in the monitored area of the video footage; positioning a camera in the retail store to monitor a merchandise area having one or more merchandise shelves; establishing communication between the camera and the alarm controller so that the camera sends video footage to the alarm controller for analysis; accessing at least one image from the camera and use a user interface to position a mask to define the monitored area for the video footage from the camera; establishing communication between the alarm controller and a speaker positioned to deliver audio to the merchandise area, where the alarm controller is configured to cause the speaker to automatically broadcast a prerecorded message to the merchandise area in response to the determination of the potential theft event; providing a store terminal comprising: a terminal display, and a terminal microphone; and establishing communication between the alarm controller and the store terminal, where the alarm controller is configured to establish a communication link between the camera and the store terminal in response to the determination of the potential theft event to display video footage from the camera on the terminal display, and where the alarm controller is configured to enable audio communication from the terminal microphone to the speaker in response to the determination of the potential theft event.

The method of the preceding paragraph can include any sub-combination of the following features: where an edge of the monitored area generally conforms to a transition in the at least one image from the camera from the one or more merchandise shelves to an aisle; where the method further comprises using a user interface to specify a threshold breach count, a threshold breach time, and a threshold breach distance, where the alarm controller is configured to determine the potential theft event based at least in part on identifying a number of breaches in the monitored area of the video footage that are within the threshold breach distance and within the threshold breach time, where the number of breaches satisfies the threshold breach count; where the method further comprises using a user interface to specify a threshold sweep time and a threshold sweep distance, where the alarm controller is configured to determine the potential theft event based at least in part on identifying a series of changes between pixels in a series of image frames of the video footage corresponding to an object moving across the monitored area for at least the threshold sweep distance within the threshold sweep time; where the method further comprises positioning a facial recognition camera at an entrance to the retail store, where the alarm controller is configured to access a facial recognition data store with face information for suspected criminals and perform facial recognition analysis on images of people captured by the facial recognition camera to determine whether the people are suspected criminals, and where the alarm controller is configured to send a notification to the store terminal in response to a determination that a person on one or more images captured by the facial recognition camera is a suspected criminal; where the method further comprises positioning a display to be visible at the merchandise area and establishing communication between the display and the alarm controller, where the display has a first operating mode for displaying advertising information, where the display has a second operating mode for displaying video footage from a terminal camera of the store terminal, where the alarm controller is configured to transition the display from the first operating mode to the second operating mode in response to the determination of the potential theft event; and where the method further comprises providing an alarm trigger in communication with the alarm controller, where the alarm trigger is configured to send an alarm notification to an outside system in response to the determination of the potential theft event.

Another aspect of the disclosure provides a system for deterring organized retail crime. The system comprises a camera positioned to monitor a merchandise area in a retail store; a speaker positioned to deliver audio to the merchandise area; a store terminal comprising: a terminal display, a terminal speaker, and a terminal microphone; an alarm controller configured to: receive video footage comprising multiple frames from the camera, analyze the frames of the video footage and determine a potential theft event based at least in part on multiple breaches into a monitored portion of the frames or a sweep action into the monitored portion of the frames, in response to the determination of the potential theft event, broadcast an automated message to the merchandise area using the speaker, and in response to the determination of the potential theft event, establish a communication link between the camera and the store terminal, to display video footage from the camera on the terminal display, and to enable audio communication from the terminal microphone to the speaker at the merchandise area; and an alarm trigger system configured to send an alarm notification to an outside system in response to the determination of the potential theft event.

The system of the preceding paragraph can include any sub-combination of the following features: where the alarm controller is configured to determine the potential theft event based at least in part on a threshold number of breaches into the monitored portion of the frames within a threshold area and within a threshold amount of time; where the threshold number of breaches is user-adjustable, where the threshold area is user-adjustable, and where the threshold amount of time is user-adjustable; where the alarm controller is configured analyze the video footage and identify individual person(s) and to determine the potential theft event based at least in part on a number of person(s) present at the merchandise area; where the system further comprises a display at the merchandise area, where the display has a first operating mode for displaying advertising information, where the display has a second operating mode for displaying image(s) to deter theft, where the display transitions from the first operating mode to the second operating mode in response to the determination of the potential theft event; where the store terminal has a terminal camera, and where the display in the second operating mode shows video footage from the terminal camera; where the store terminal is a video phone; where the system further comprises a facial recognition camera at an entrance to the retail store, where the alarm controller is configured to access a facial recognition data store with face information for suspected criminals and to perform facial recognition analysis on images of people captured by the facial recognition camera to determine whether the people are suspected criminals; where the alarm controller is configured to send a notification to the store terminal in response to a determination that a person on image(s) captured by the facial recognition camera is a suspected criminal; where the system further comprises one or more motion detectors at the merchandise area, and where the alarm controller is configured to determine the potential theft event based at least in part on information from the one or more motion sensors; where the system further comprises one or more seismic sensors at the merchandise area, and where the alarm controller is configured to determine the potential theft event based at least in part on information from the one or more seismic sensors; and where a public address (PA) system of the store comprises the speaker, and where the alarm controller is configured to broadcast the automated message over the PA system in response to the determination of the potential theft event.

Another aspect of the disclosure provides a security system comprising: a camera positioned to monitor an area; a speaker positioned to deliver audio to the area; an alarm controller configured to: receive video footage from the camera, and analyze the video footage and determine a potential theft event based at least in part on video footage from the camera, where the speaker is responsive to the determination of the potential theft event to broadcast an audio message to the area.

The security system of the preceding paragraph can include any sub-combination of the following features: where the alarm controller is configured to broadcast a prerecorded message automatically using the speaker in response to the determination of the potential theft event; where the system further comprises a terminal that includes a terminal display, where the alarm controller is configured to establish a communication link between the camera and the terminal in response to the determination of the potential theft event to display video footage from the camera on the terminal display; where the terminal has a terminal microphone for receiving a voice message from a user at the terminal, and where the audio message broadcast by the speaker is the voice message received by the terminal; where the terminal comprises a video phone; where the alarm controller is configured to determine the potential theft event based at least in part on a number of breaches into a monitored area of the video footage within an amount of time; where the alarm controller is configured to determine the potential theft event based at least in part on a sweep action into a monitored area of the video footage; where the alarm controller is configured analyze the video footage and determine a number of people in the area, and where the alarm controller is configured to determine the potential theft event based at least in part on the determined number of people in the area; where the system further comprises a display at the area, where the display has a first operating mode and a second operating mode for displaying image(s) to deter theft, where the display transitions from the first operating mode to the second operating mode in response to the determination of the potential theft event; and where the terminal has a terminal camera, and where the display in the second operating mode shows video footage from the terminal camera.

Another aspect of the disclosure provides a video monitoring system. The video monitoring system comprises: a camera positioned to monitor an area; and an alarm controller configured to: receive video footage comprising multiple frames from the camera, the video footage comprising a monitored portion of the frames, and analyze the frames of the video footage and determine a potential theft event based at least in part on a threshold number of breaches into the monitored portion of the frames within a threshold area and within a threshold amount of time.

The video monitoring system of the preceding paragraph can include any sub-combination of the following features: where the threshold number of breaches is user-adjustable, where the threshold area is user-adjustable, and where the threshold amount of time is user-adjustable; where the camera is positioned to monitor a merchandise area in a retail store having an aisle and one or more shelves, and where the monitored portion of the frames of the video footage includes the one or more shelves; where the alarm controller is configured to broadcast an automated audio message to the area using a speaker in response to the determination of the potential theft event; where the alarm controller is configured to establish a communication link between the camera and a terminal in response to the determination of the potential theft event, to display video footage from the camera on a display of the terminal, and to enable audio communication from a microphone of the terminal to a speaker to deliver audio to the area; where the system further comprises an alarm trigger system configured to send an alarm notification to an outside system in response to the determination of the potential theft event; and where the alarm controller is configured analyze the video footage and identify individual person(s) and to determine the potential theft event based at least in part on a number of person(s) present at the area.

Various embodiments disclosed herein can relate to a method for setting up a security system. The method can include positioning a camera to monitor a region that includes a monitored area, and the camera can be configured to produce video footage at a camera frame rate. The method can include establishing communication between the camera and a controller so that the camera sends video footage to the controller for analysis, accessing at least one image frame from the camera, using a user interface to position a mask in the at least one image from the camera to define the monitored area for the video footage from the camera, and using the user interface to specify a grid size for dividing image frames of the video footage into groups of pixels. The grid size can determines the size of the groups of pixels. The method can include using the user interface to specify a threshold pixel change amount that indicates how much a single pixel needs to change between successive analyzed frames for that pixel to count as a changed pixel. The method can include using the user interface to specify a threshold amount of pixels within one of the groups of pixels that need to change between the successive analyzed frames for a determination of activity for that group of pixels. The method can include using the user interface to specify an analysis frame rate that is slower than the camera frame rate. Successive analyzed frames can have the analysis frame rate. The method can include using the user interface to specify a re-intrusion time that defines the amount of time after a first intrusion is detected that must pass before a second intrusion can be detected. The controller can be configured to perform video analysis on the video footage from the camera to determine an event at least in part by identifying a number of intrusions into the monitored area that satisfies a threshold intrusion count within a threshold intrusion timeframe.

The method can include using the user interface to specify the threshold intrusion count and the threshold intrusion timeframe. The method can include using the user interface to specify a threshold intrusion distance, and the controller can be configured to determine the event based at least in part on identifying a number of intrusions in the monitored area of the video footage that are within the threshold intrusion distance and within the threshold intrusion timeframe, where the number of intrusions satisfies the threshold intrusion count. The camera can be positioned to monitor a merchandise area in a retail store. The controller can be configured to perform the video analysis on the video footage from the camera to determine a potential crime event. The method can include establishing communication between the controller and a speaker positioned to deliver audio to the merchandise area. The controller can be configured to cause the speaker to automatically broadcast a message to the merchandise area in response to the determination of the potential theft event or other determined event. The method can include providing a store terminal that includes a terminal display, and establishing communication between the controller and the store terminal. The controller can be configured to display video footage from the camera on the terminal display in response to the determination of the potential theft event. The store terminal can include a terminal microphone. The controller can be configured to enable audio communication from the terminal microphone to the speaker in response to the determination of the potential theft event. The method can include using the user interface to specify a grid shape. The method can include using the user interface to specify a grid orientation. The method can include using the user interface to specify multiple grids for different portions of the image frame. The multiple grids can have different sizes, shapes, and/or orientations. The analysis frame rate can be less than half the camera frame rate. The analysis frame rate can be between about 5 frames-per-second and about 15 frames-per-second.

Various embodiments disclosed herein can relate to a system, which can include a camera that can be positioned to monitor a region and produce video footage that includes multiple image frames that include at least a portion of a monitored area. The system can include a controller, which can be configured to determine an event based at least in part on detecting a threshold number of intrusions into the monitored area within a threshold amount of time. The controller can be configured to detect an intrusion at least in part by comparing at least a portion of a first image frame of the video footage to at least a portion of a second image frame of the video footage, where one or more additional image frames between the first and second image frames are not analyzed to detect the intrusion. The camera can be configured to produce the video footage with a camera frame rate, and the controller can be configured to analyze image frames of the video footage at an analysis frame rate the is slower than the camera frame rate.

Various embodiments disclosed herein can relate to a system, which can include a camera positioned to monitor a region and produce video footage comprising multiple image frames that include at least a portion of a monitored area. The system can include a controller, which can be configured to detect a first intrusion at a first time, and disregard information that would otherwise identify an intrusion until a re-intrusion amount of time has passed. The controller can be configured to detect a second intrusion at a second time that is later than the first time by at least the re-intrusion amount of time. The controller can be configured to determine an event based at least in part on detecting a threshold number of intrusions into the monitored area within a threshold amount of time.

The controller can be configured to detect an intrusion at least in part by comparing at least a portion of a first image frame of the video footage to at least a portion of a second image frame of the video footage, where one or more additional image frames between the first and second image frames are not analyzed to detect the intrusion. The camera can have a camera frame rate, and the controller can be configured to analyze image frames at an analysis frame rate that is different than the camera frame rate. The analysis frame rate can be less than half of the camera frame rate. The analysis frame rate can be between about 10% and about 60% of the camera frame rate. The analysis frame rate can be between about 5 frames-per-second and about 15 frames-per-second. The camera can be positioned to monitor a merchandise area in a retail store. The camera can be positioned to monitor an area of interest of an exterior of a building. The camera can be positioned to monitor an area of interest of an interior of a building. The system can include a speaker positioned to deliver audio to the region, and the controller can be configured to cause the speaker to broadcast a message to the region in response to the determination of the event. The system can include a display positioned to deliver video to the region. The controller can be configured to cause the display to display video footage of the region in response to the determination of the event. The system can include a terminal with a terminal display. The controller can be configured to display video footage from the camera on the terminal display in response to the determination of the event. The terminal can have a microphone, and the controller can be configured to enable audio communication from the terminal microphone through a speaker at the region in response to the determination of the event. The controller can be configured to compare a first group of pixels at a first location in a first image frame to a second group of pixels at the first location in a second image frame, identify a first intrusion based at least in part on a determination that a difference between the first group of pixels and the second group of pixels satisfies one or more threshold pixel difference criteria, compare a third group of pixels at a second location in a third image frame to a fourth group of pixels at the second location in a fourth image frame, and identify a second intrusion based at least in part on a determination that a difference between the third group of pixels and the fourth group of pixels satisfies the one or more threshold pixel difference criteria. The controller can be configured to determine whether to associate the first intrusion and the second intrusion together based at least in part on whether a distance between the first location and the second location is less than the threshold intrusion distance value. The controller can be configured to determine whether to associate the first intrusion and the second intrusion together based at least in part on whether a duration of time between the first intrusion and the second intrusion is less than the threshold intrusion time value. The controller can be configured to determine whether to associate the first intrusion and the second intrusion together based at least in part on whether the duration of time between the first intrusion and the second intrusion is over a re-intrusion time. The controller can be configured to ignore the second intrusion based at least in part on whether the duration of time between the first intrusion and the second intrusion is less than a re-intrusion time. The controller can be configured to associate the first intrusion and the second intrusion together when the distance between the first location and the second location is less than the threshold intrusion distance value and the duration of time between the first intrusion and the second intrusion is greater than a re-intrusion time. The controller can be configured to disregard the second intrusion when the distance between the first location and the second location is less than the threshold intrusion distance value and the duration of time between the first intrusion and the second intrusion is less than the re-intrusion time. The controller can be configured to register the first and second intrusions as unassociated intrusions when the distance between the first location and the second location is greater than the threshold intrusion distance value. The system can record the video footage at a record frame rate, and the record frame rate can be different from the camera frame rate. The record frame rate can be different from the analysis frame rate. The image frames can include multiple distinct monitored areas.

Various embodiments disclosed herein can relate to a method that includes positioning a camera to monitor a region that includes a monitored area. The camera can have a camera frame rate. The method can include establishing communication between the camera and a controller so that the camera sends video footage to the controller for analysis. The controller can be configured to perform video analysis on the video footage from the camera to make determinations regarding intrusions into the monitored area. The method can include using a user interface to designate one or more of a) an analysis frame rate, and b) a re-intrusion time.

The method can include using the user interface to designate both of the analysis frame rate and the re-intrusion time. The analysis frame rate can be different than the camera frame rate. The controller can be configured to identify an intrusion at least in part by comparing at least a portion of a first image frame of the video footage to at least a portion of a second image frame of the video footage, where one or more additional image frames between the first and second image frames are not analyzed to identify the intrusion. The method can include recording at a record frame rate, and the record frame rate can be different from the camera frame rate. The record frame rate can be different from the analysis frame rate. The re-intrusion time can define the amount of time after a first intrusion is detected that must pass before a second intrusion can be detected. The controller can be configured to make a determination regarding a number of intrusions within an amount of time. The method can include using a user interface to position a mask in the at least one image from the camera to define the monitored area for video footage from the camera. The method can include using the user interface to specify a size, shape, or orientation for groups of pixels within the image frames from the camera. The controller can be configured to detect an intrusion at least in part by comparing groups of pixels from multiple image frames. The method can include using the user interface to specify a threshold pixel change amount that indicates how much a single pixel needs to change between successive analyzed frames for that pixel to count as a changed pixel. The method can include using the user interface to specify a threshold amount of pixels within one of the groups of pixels that need to change between the successive analyzed frames for a determination of activity for that group of pixels. Two or more of the multiple distinct monitored areas can overlap, in some embodiments.

Various embodiments disclosed herein can relate to a method for setting up a security system. The method can include positioning a camera to monitor a region that includes a monitored area. The camera can be configured to produce video footage at a camera frame rate. The method can include establishing communication between the camera and a controller so that the camera sends video footage to the controller for analysis, accessing at least one image frame from the camera, using a user interface to position a mask in the at least one image from the camera to define the monitored area for the video footage from the camera, and using the user interface to specify a grid size for dividing image frames of the video footage into groups of pixels. The grid size can determine the size of the groups of pixels. The method can include using the user interface to specify a threshold amount of pixels within one of the groups of pixels that need to change for a determination of activity for that group of pixels. The method can include using the user interface to specify a threshold number of pixel groups that need to have activity for a determination of an intrusion into the monitored area. The controller can be configured to perform video analysis on the video footage from the camera to determine an event at least in part by identifying a number of intrusions into the monitored area that satisfies a threshold intrusion count within a threshold intrusion timeframe.

The method can include using the user interface to specify a pixel change amount that indicates how much a single pixel needs to change for that pixel to count as a changed pixel. The method can include using the user interface to specify an analysis frame rate that is slower than the camera frame rate. Successive analyzed frames can have the analysis frame rate. The method can include using the user interface to specify a re-intrusion time that defines the amount of time after a first intrusion is detected that must pass before a second intrusion can be detected. In some embodiments, only adjacent pixel groups that have activity count towards the threshold number of pixel groups. The method can include determining a first set of one or more groups of pixels with activity in a first frame, determining a second set of one or more groups of pixels with activity in a second frame, and aggregating the first and second sets of one or more groups of pixels with activity to satisfy the threshold number of pixel groups and determine an intrusion.

The methods disclosed herein can include specifying multiple sets of video analysis parameters. The systems disclosed herein can include multiple sets of video analysis parameters. A user interface can have a user input element for changing between the sets of video analysis parameters. The systems can be configured to apply different sets of video analysis parameters at different times.

Various embodiments disclosed herein can relate to a system that includes a camera positioned to produce video footage of a region that includes an entrance of a retail store, and a controller that has a hardware processor and non-transitory computer-readable memory in communication with the hardware processor. The memory can contain a threshold entrance count value, a threshold entrance time value, and instructions executable by the processor to cause the controller to receive the video footage from the camera, analyze the video footage from the camera to identify entrance events when persons enter the retail store through the entrance, determine a customer rush event by at least identifying a number of entrance events that satisfies the threshold entrance count value within an amount of time that satisfies the threshold entrance time value, and provide a customer service notification in response to the determination of the customer rush event.

The instructions can be executable by the processor to cause the controller to wait a delay amount of time after determining the customer rush event and to provide the customer service notification after the delay amount of time. The delay amount of time can be between about 1 minute and about 30 minutes. A user interface can be configured to enable user adjustment of the delay amount of time. A user interface can enable user adjustment of the threshold entrance count value and/or user adjustment of the threshold entrance time value. The customer service notification can include a request for additional cashiers. The customer service notification can include an audio message delivered by a speaker. The customer service notification can include a message provided to a mobile device. The system can include one or more additional cameras positioned to produce video footage of one or more additional regions that include one or more additional entrances of the retail store. The instructions can executable by the processor to cause the controller to receive the video footage from the one or more additional cameras, analyze the video footage from the one or more additional cameras to identify entrance events when persons enter the retail store through the one or more additional entrances, and determine the customer rush event by at least identifying an aggregate number of entrance events for the entrances that satisfies the threshold entrance count value within the amount of time that satisfies the threshold entrance time value. The memory can contain a plurality of time ranges, a plurality of threshold entrance count values associated with the respective plurality of time ranges, and a plurality of threshold entrance time values associated with the respective plurality of time ranges. The instructions can be executable by the processor to cause the controller to determine the customer rush event using the respective threshold entrance count value and threshold entrance time value that correspond to the time range that includes the current time. The instructions can be executable by the processor to cause the controller to analyze the video footage to perform person identification. A user interface can be configured to enable a user to define a line at the entrance. The instructions can be executable by the processor to cause the controller to identify an entrance event by identifying a person in the video footage and determining that the person crossed the line in an entrance direction.

Various embodiments disclosed herein can relate to a method that includes positioning a camera to monitor a region that includes an entrance, establishing communication between the camera and a controller so that the camera sends video footage to the controller for analysis, accessing at least one image frame from the camera, using a user interface to define the entrance in the at least one image frame, using the user interface to designate a threshold entrance count value, and using the user interface to designate a threshold entrance time value. The controller can be configured to analyze the video footage from the camera to identify entrance events when persons enter through the entrance, and to determine an event by at least identifying a number of entrance events that satisfies the threshold entrance count value within an amount of time that satisfies the threshold entrance time value. The method can include using the user interface to position a tripwire line to define the entrance. The method can include using the user interface to designate a masked area to define the entrance. The controller can be configured to provide a notification in response to the determination. The method can include using the user interface to designate a delay amount of time. The controller can be configured to wait for the delay amount of time after the determination before providing the notification. The notification can be a request for additional point of sale systems to be opened in a store. The method can include positioning multiple cameras to monitor multiple entrances. The controller can be configured to aggregate entrance events from the multiple entrances. The method can include using the user interface to assign a time range to the threshold entrance count value and the threshold entrance time value, and using the user interface to designate one or more additional time ranges and one or more additional threshold entrance count values and one or more additional threshold entrance time values that are associated with the one or more additional time ranges. The controller can be configured to determine which time range applies to the time of analysis and to use the threshold entrance count value and the threshold entrance time value that are associated with applicable time range.

Various embodiments disclosed herein can relate to a method that includes acquiring video footage of a region that includes an entrance, analyzing the video footage to identify when persons enter through the entrance, and determining an event by at least identifying when a threshold number of persons has entered through the entrance within a predetermined amount of time.

The entrance can be an entrance of a retail store. The method can include issuing a request for additional point of sale systems to be opened in response to the determination of the event. The request can be an audio message delivered via a speaker. The request can be a text message delivered to a mobile user device. The method can include waiting for a delay amount of time after determining the event before issuing the request. The method can include requesting confirmation from a user before issuing the request. The method can include comparing a current time to a plurality of time ranges to determine which of the plurality of time ranges contains the current time. Each of the plurality of time ranges can have an associated threshold entrance count value and a threshold time value. The method can include obtaining the threshold entrance count value and the threshold time value for the time range that contains the current time and applying the threshold entrance count value and the threshold time value for determining the event. The method can include acquiring second video footage of a second region that includes a second entrance, analyzing the second video footage to identify when persons enter through the second entrance, and determining the event by at least identifying when a threshold number of persons has entered through the combination of the entrance and the second entrance within a predetermined amount of time.

Various embodiments disclosed herein can relate to a system for tracking occupancy of an area. The system can include one or more cameras positioned to produce video footage of one or more entrances and/or exits for the area, a controller that has a hardware processor and non-transitory computer-readable memory in communication with the hardware processor. The memory can contain an occupancy value and instructions executable by the processor, which can cause the controller to acquire the video footage from the one or more cameras, analyze the video footage from the one or more cameras to identify entrance events when persons enter through the one or more entrances and/or to identify exit events when persons exit through the one or more exits, increase the occupancy value when entrance events are identified, and/or decreasing the occupancy value when exit events are identified.

The memory can include an occupancy threshold value. The instructions can be executable by the processor to cause the controller to determine an event when the occupancy satisfies the threshold value. The memory can contain instructions executable by the processor to cause the controller to issue a request for additional point of sale systems to be opened in response to the determination of the event. The request can be an audio message delivered via a speaker. The request can be a text message delivered to a mobile user device. The memory can contain instructions executable by the processor to cause the controller to wait for a delay amount of time after determining the event before issuing the request. The memory can contain instructions executable by the processor to cause the controller to wait for confirmation from a user before issuing the request. The memory can include an occupancy threshold value, and the instructions can be executable by the processor to cause the controller to issue a safety notification when the occupancy satisfies the threshold value. The system can include multiple cameras positioned to produce video footage of multiple entrances and/or exits. The instructions can be executable by the processor to cause the controller to receive the video footage from the multiple cameras, analyze the video footage from the multiple cameras to identify entrance events and exit events when persons respectively enter and exit the area through the multiple entrances and/or exits, and aggregate the entrance events and exit events across the multiple entrances and/or exits to determine the occupancy value. The memory can contain instructions executable by the processor to cause the controller to determine a predicted future occupancy value.

Various embodiments disclosed herein can relate to a system that includes a camera positioned to monitor a region that includes a monitored area and a controller onboard the camera. The controller can include a hardware processor and non-transitory computer-readable memory in communication with the hardware processor. The memory can have a threshold breach count value, a threshold breach time value, and instructions executable by the processor to cause the controller to perform video analysis on video footage captured by the camera to determine an event at least in part by identifying a number of breaches into a monitored area that satisfies the threshold breach count value within the threshold breach time value.

The camera can be positioned to monitor one or more shelves in a retail store. The camera can include a speaker. The controller can be configured to output an audio message via the speaker in response to determination of the event. The camera can include a communication interface. The system can include an alarm system in communication with the camera. The system can be configured to trigger the alarm system in response to determination of the event. The system can include a terminal in communication with the camera, and the system can be configured to provide a massage or video footage from the camera to the terminal in response to determination of the event. The camera can include a communication interface, and the system can include a display at the monitored area and in communication with the camera. The system can be configured to display a message on the display in response to determination of the event. The camera can include a communication interface, and the system can include a data store in communication with the camera. The system can be configured to store video footage associated with the event on the data store and on the camera memory in response to determination of the event.

Various embodiments disclosed herein can relate to a monitoring camera that can include a housing and an image sensor inside the housing. The camera can be configured to produce video footage using the image sensor. The camera can include a controller inside the housing, can the controller can have a hardware processor and non-transitory computer-readable memory in communication with the hardware processor. The memory can have instructions executable by the processor to cause the controller to perform video analysis on the video footage to determine an event at least in part by identifying a number of breaches into a monitored area that satisfies a threshold breach count value within a threshold breach time valve.

BRIEF DESCRIPTION OF DRAWINGS

Certain embodiments will be discussed in detail with reference to the figures, which are provided for illustrative purposes and the embodiments are not limited to the specific implementations illustrated in the figures. In some instances in the figures, the system for detecting and/or deterring crime described herein is referred to as Raptor-Vision or RV.

FIGS. 1-10 are block diagrams that schematically show features of example embodiments of systems for detecting and/or deterring crime.

FIGS. 15A-15E illustrate example user interfaces for configuring the theft event detection functionality of the alarm controller.

FIG. 20 illustrates the exterior of an example commercial or industrial building at which the system of FIG. 14 can detect potential crime, such as tagging, graffiti, forcible entry, and/or the like.

FIG. 31 shows an example user interface for specifying parameters for video analysis.

FIG. 32 shows another example user interface for specifying parameters for video analysis.

DETAILED DESCRIPTION OF SPECIFIC EMBODIMENTS

Figure 1:
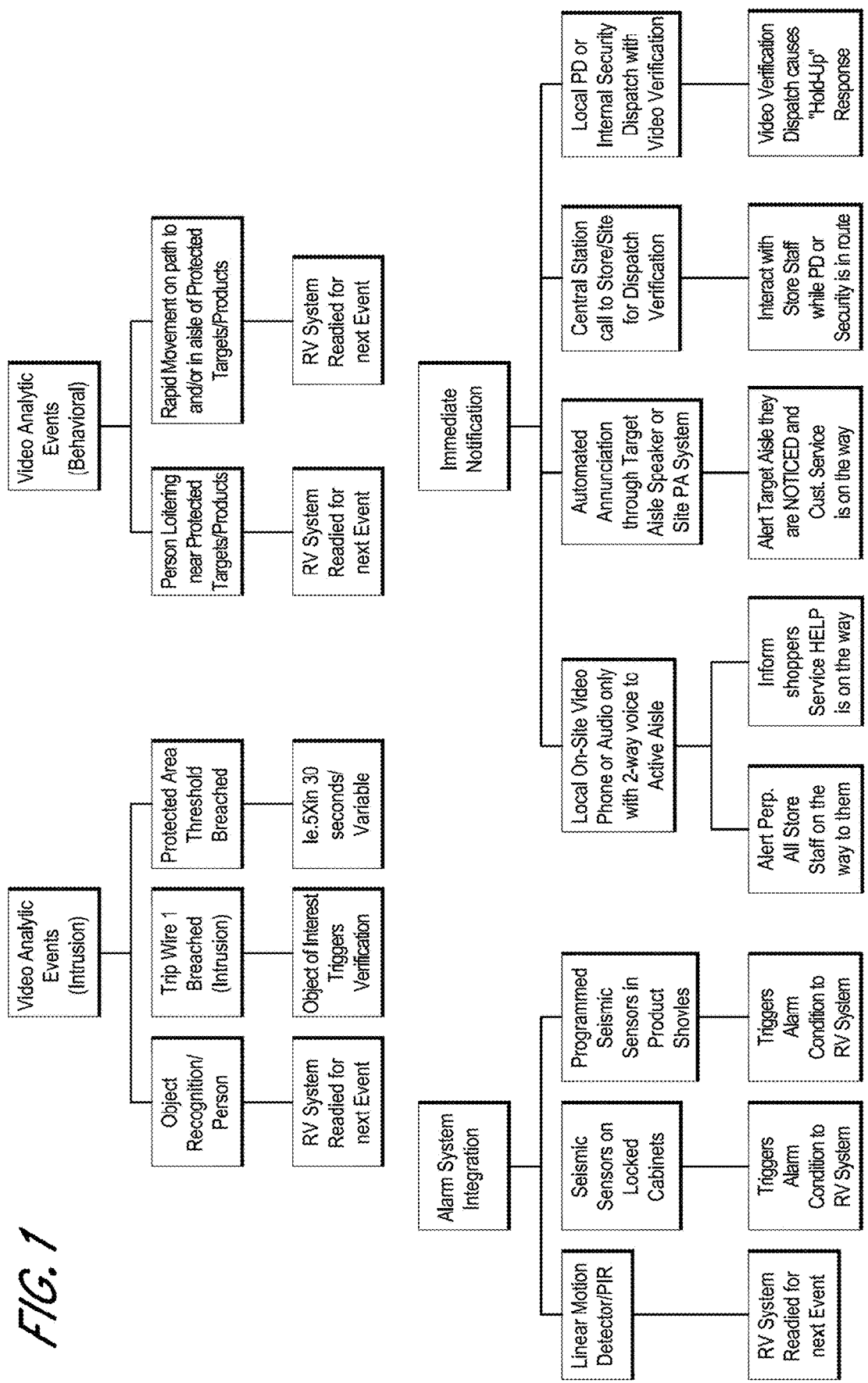
Figure 2:
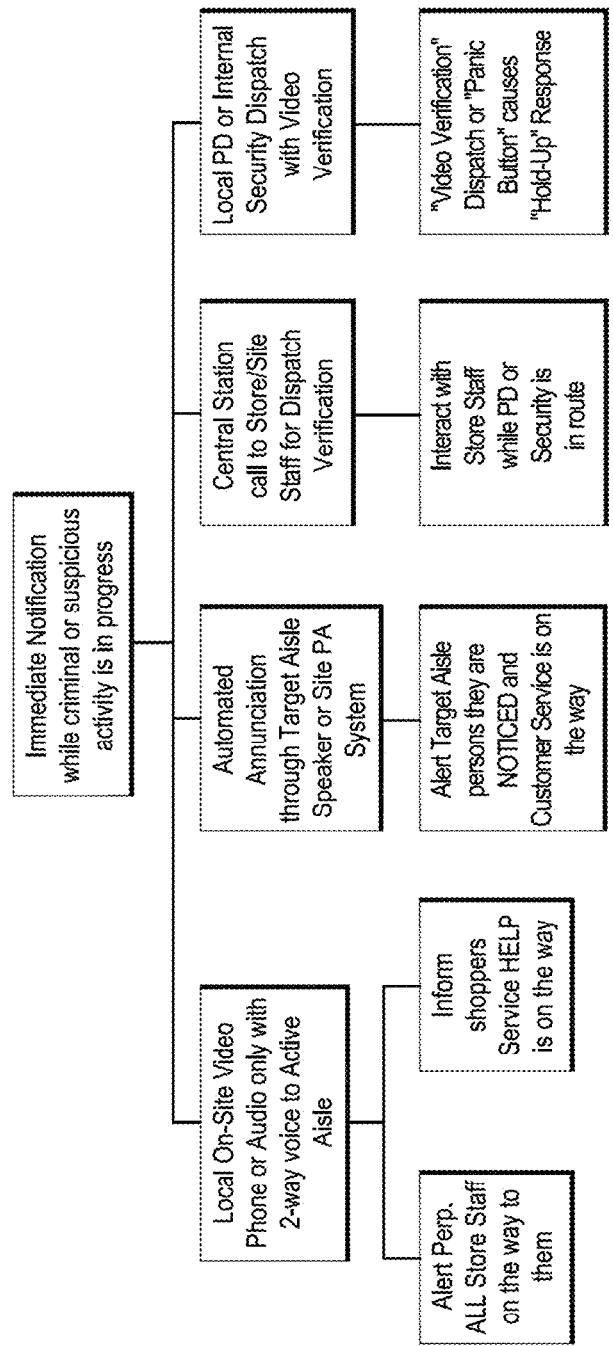

Aspects of this disclosure relate to systems and methods specifically designed to detect, deter, and/or stop theft activities described herein, such as Organized Retail Crime (ORC), as well as to detect, deter, and/or stop other perpetrators at any retail, industrial, or any other commercial site, or any other suitable location. Aspects of this disclosure relate to systems and methods for monitoring human behavior and detecting ORC or other theft events or other criminal activity. Aspects of this disclosure also relate to systems and methods for monitoring human behavior and detecting intrusions for inventory management and/or criminal activity detection purposes. Aspects of this disclosure can relate to monitoring and/or making determinations regarding various other criminal activity (e.g., vandalism, burglary, breaking and entering, unauthorized border crossings, etc.), and other types of human behavior. For example, features of the video analytics disclosed herein can be used to count the number of people or objects that enter a monitored are within a specified time. For example, the video analytics can be used for determining a number of soldiers or law enforcement professional that leave and/or or enter a vehicle or other area.

Certain example embodiments are discussed below for illustrative purposes. The embodiments are not limited to the specific implementations recited herein. Embodiments may include several novel features, no single one of which is essential or solely responsible for the desirable attributes discussed herein.

Embodiments disclosed herein can relate to systems and methods for detecting and/or deterring theft, such as organized retail crime (ORC). An example of an organized retail crime event is described below. Two thieves enter a retail store. A first thief obtains a shopping cart and approaches an area with high-value merchandise, such as liquor, perfume, etc. The first thief loads the cart with high value merchandise quickly while the second thief stands nearby to watch for security or other threats. Then the two thieves exit the retail store quickly with the stolen merchandise, which is often later resold in grey markets or sub-prime distributors. Although some systems and methods are discussed herein in connection with detecting and/or deterring organized retail crime, the systems and methods can apply to other types of crime, such as shoplifting by a single thief acting alone, etc.

Conventional security systems have difficulty detecting and/or deterring ORC. For example, conventional security systems are generally set up to detect and/or deter ORC at store entrances and/or exits (e.g., via the use of metal detectors, radio frequency identification (RFID) detectors, etc.). However, attempting to detect and/or deter ORC at store entrances and/or exits can be problematic because the initial crime of, for example, stealing items has already been committed. By the time the ORC is detected, the perpetrator may already be outside the store (and therefore be more likely to evade authorities). Some conventional security systems include cameras. However, the cameras serve as passive devices that record events for review by authorities after ORC has already occurred. Thus, these cameras are not useful for detecting ORC while the crime is taking place such that the perpetrator can be apprehended and/or the stolen items can be recovered. In general, the components included in conventional security systems, such as the metal detectors, RFID detectors, cameras, etc., are not sufficient by themselves of detecting and/or deterring ORC when the initial crime is actually taking place. Building a security system that can actually detect ORC when the initial crime is taking place may significantly reduce the likelihood that the perpetrator can evade authorities and/or increase the likelihood that stolen items can be recovered.

Accordingly, a security system can use a video analytic algorithm, video analytics and/or other input parameters to identify a theft event (e.g., ORC) or suspicious behavior, and in some embodiments the system can take remedial action in response. For example, video analytics can be used to determine that a person has reached into a shelf multiple times at a rate above a threshold (e.g., five times within thirty seconds, although other rates and thresholds can be used), which can indicate that a thief is quickly removing merchandise from the shelf. The video analytics can also determine that a person has reached into a shelf via a sweeping action, which can indicate that a thief is gathering and removing a large quantity of merchandise from the shelf in one motion. The video analytics can also determine that a person is loitering near an area of high-value merchandise. Video analytics can also be used to determine that a person is moving above a threshold speed towards, or within, or away from the high-value merchandise area. Identification of one or more of these events can be used to determine that a theft event is occurring. One or multiple events can contribute to the determination that a theft event is occurring. For example, activity at the merchandise shelf can trigger an identification of a theft event if a person is loitering nearby even if that same activity at the merchandise shelf would not trigger an identification of a theft event when no loitering is happening. One or multiple events can also enhance the likelihood that a determination is made that a theft event is occurring. For example, the threshold for determining whether activity at the merchandise shelf would trigger an identification of a theft event can be relaxed if a person is loitering nearby. A score can be determined based on one or more of these identified events, and if the score satisfies a threshold (e.g., above a threshold value), then the system can determine that a theft event is occurring. Multiple factors disclosed herein can contribute to the calculated score which can trigger a determination of a theft event, or a single factor can be sufficient to trigger the determination of a theft event (e.g., overlapping factors or single factor determinations).

The systems disclosed herein can identify theft events with high confidence. In some cases, multiple factors can be used to verify theft events. In some implementations, the system can determine a confidence level for the determination of a theft event, or can determine theft events of different categories or types. For example, if a threshold score of 50 is used for identifying a theft event, then a score of 52 can be determined to be a theft event with low confidence while a score of 75 can be determined to be a theft event with high confidence. The system can take different action depending on the confidence level or category of the theft event determination or depending on the calculated score. For example, a theft event having a low confidence level or of a first category (e.g., a score that satisfies a first threshold (e.g., 50) but not a second threshold (e.g., 70)) can cause the system to take less serious action(s), such as privately alerting score security or other store personnel (e.g., via a terminal), storing or flagging portions of the video relating to the theft event, activating or readying other sensors or systems, and/or providing a non-threatening automated message (e.g., "customer service to the liquor department"), or providing no automated message. A theft event having a high confidence level or of a second category (e.g., a score that satisfied the second threshold (e.g., 70)) can cause the system to take more serious action(s), such as alerting law enforcement, providing an automated message to the target area, and/or providing a more serious automated message (e.g., "security to the liquor department").

Seismic sensor(s) can be used identify a theft event. Seismic sensors can be positioned on locked cabinet(s) and/or on product shelve(s). A seismic sensor can output information when products are removed from a shelf, for example. The level of shaking indicated by the seismic sensor(s) can be used in identifying a theft event. Generally, products are removed from the shelf more quickly and with less care during a theft event than during normal shopping behavior, which can be manifest by more shaking of the seismic sensor(s). Also, in some cases, the rate at which products are removed from the shelf (e.g., as indicated by the seismic sensor(s) and/or video analytics) can be used to determine a theft event, such as product removal over a threshold rate and/or number (e.g., five times within 30 seconds, although other rates can be used). In some embodiments, the seismic sensor(s) can indicate a large spike when a cabinet or gondola is seriously disrupted or jolted, as often occurs during a theft, and the system can use this information in determining a theft event. The seismic sensor(s) can be used to confirm the information provided by the video analytics, in some embodiments. Information from the seismic sensor(s) (e.g., amplitude of shaking, rate of shaking events, and/or number of shaking events) can be used in determining the score. Door contact sensors can be used to determine whether cabinet doors are closed or open, and this information can be used in identifying a theft event (e.g., in calculating the score).

Other inputs can be used to identify a theft event. For example, a threshold sensor, such as an optical sensor, can be used to determine when an object has crossed a threshold (e.g., the front of a merchandise shelf). If someone reaches into the shelf and triggers the threshold sensor enough times and/or at a threshold rate (e.g., five times within 30 seconds), that can be used to identify a theft event). The threshold sensor can be a passive infrared sensor (PIR), a linear motion detector, a curtain motion detector, etc. Information from the threshold sensor(s) can be used to determine the score.

When the system makes a theft event determination, the system can take action to prevent the crime. The system can provide an alert to a store/site terminal that is located in the retail store or other site using the system. Although some embodiments are discussed in connection with a store (e.g., using a store terminal), the same or similar systems and methods can be used for other sites that are not stores (e.g., a warehouse). A manager, security personnel, or other employee can interact with the terminal to take action. The terminal can present video and/or sound information of the theft event. Live video and/or sound of the target area can be provided to the terminal, which can enable the store personnel to view the current actions of the suspect(s). Past video and/or sound of the target area can be accessible via the system. The system can store the video and/or sound associated with a detected potential theft event. The past video and/or sound can be provided (e.g., through email, text, or other suitable data transfer manner) to a remote device. In some cases a local or remote computer can be used to access video and/or sound information stored in the system. In some cases, the past video and/or sound can optionally be provided to the store/site terminal. For example, the past video and/or sound around the time of the event(s) that triggered the theft event determination can be stored and/or flagged. For example, if a theft event is identified at an event time (e.g., 3:05:46), the system can store, or flag, or send video of the location of the theft event starting at an amount of time before the event time to an amount of time after the event time (e.g., from 3:05:41 to 3:05:51). The system can store video so that if a theft event is triggered, the system can access the past video from the area during the time before and/or after the theft event was triggered. In some cases, the terminal can optionally present both the live video and the past video (e.g., simultaneously on a display).

The terminal can used to communicate with the suspects. For example, an input element (e.g., a button) can be actuated to engage a communication link between the terminal and a communication device (e.g., a speaker and/or display) at the target area. The user can actuate the input element and provide an audio message to the suspect(s) via a speaker, such as: "We see that you are very interested in our selection of perfumes. A service manager is on the way to help you." Two-way voice communication can be used, which can enable the user to converse with the suspect(s). This can be used to assess whether a theft is actually occurring, as opposed to innocent behavior, and this can also be used to keep the suspect(s) busy or to delay the theft. In some implementations, a display can be located at the target area and can be used to display an image or video to the suspect(s). For example, the terminal can include a camera or video camera and can communicate with the display at the target area to display an image or video of the store personnel at the terminal. The system can enable two-way video and/or audio communication between the terminal and the target area. In some embodiments, the terminal can be located off-site at a location remote to the store. For example, a centralized monitoring station can be used to monitor multiple stores.

In some embodiments, an automated message can be delivered to the target area when a theft event has been determined. The message can be an audio message, which can be delivered through a speaker at the target area, or over a public announcement or public address (PA) system of the store. In some embodiments, the system can provide a notification to the terminal when a theft event has been identified. A user can use the terminal to communicate with the suspect(s), as discussed herein, to trigger an alarm, or take other responsive action. A user can provide input to disregard the theft event (e.g., in the event of a false positive). If no input is provided within an amount of time (e.g., 10 seconds), then the system can deliver the automated message to the target area. Thus, if the store personnel are not available at the terminal when the theft event is identified, the system can have a default responsive action. In some embodiments, an automated message can be delivered when the theft event is identified by the system, without delay. In some cases, the user can follow up with additional communication to the suspect(s), such as using the terminal (e.g., for two-way communication). Different automated responses (e.g., audio recordings) can be used for different target areas in the store, or for different types of triggered events. For example, a different message can be used if one suspect is identified or if multiple suspects are identified, and a different message can be applied for the liquor section and perfume section in the store, etc. The system can take multiple actions when a theft event is identified, such as providing an immediate automated audio message (e.g., which in some cases can be chosen from a set of pre-recorded messages based on the parameters or triggers or location of the theft event) through a local speaker at the target area and/or over a PA system, providing a notification to a local terminal in the store (e.g., to enable live communication from store personnel, such as via a video phone), and/or providing a report to a remote central security center.

In some embodiments, the display at the target area can have a first operating mode when no theft event is detected. For example, the display can be used to display advertising information, such as specifically related to the high-value merchandise in the target area. When a theft event is identified, the display can transition to a second operating mode to display an image or video configured to deter theft, which can be a video communication from the terminal, or an automated message, or an alert (e.g., a flashing red screen). In some cases, the second operating mode can display the live video of the monitored area. This can show the live video of the perpetrator to himself (e.g., in the aisle of the store). The video display can operate differently than a public view monitor because it activates when triggered to transition to the second operating mode. In some cases, the second operating mode can show video that was recorded in the recent past, which triggered the system. The second operating mode can get the perpetrator's attention and alert them that their activity is being and/or has been monitored. This can deter the person from continuing with criminal behavior. In some cases, the system can send the video (live or recent past triggering footage) to the terminal and/or to a remote dispatcher (e.g., at the same time as displaying the video on the display). As discussed herein, an audio message can also be delivered to the monitored area when a response is triggered (e.g., an automated recording or a live audio feed from the terminal or remote dispatcher).

The system can include a security alarm system (e.g., including a security panel), which can notify a central security station that a theft event was detected at the store. The notification to the central security station can include video footage of the theft event. Personnel at the central security station can contact the store to verify the theft event and/or to inform the store personnel regarding the status of law enforcement dispatch. The system can contact (e.g., directly, or through the central security station) law enforcement dispatch (e.g. the local police department) to report the theft event, and the report can include video footage verifying the theft event. Video verification can result in rapid response from law enforcement (e.g., a "hold-up alarm" type response). The system can contact law enforcement (e.g., local police department), such as through the central security center (e.g., simultaneously) to report the theft event.

Figure 3:
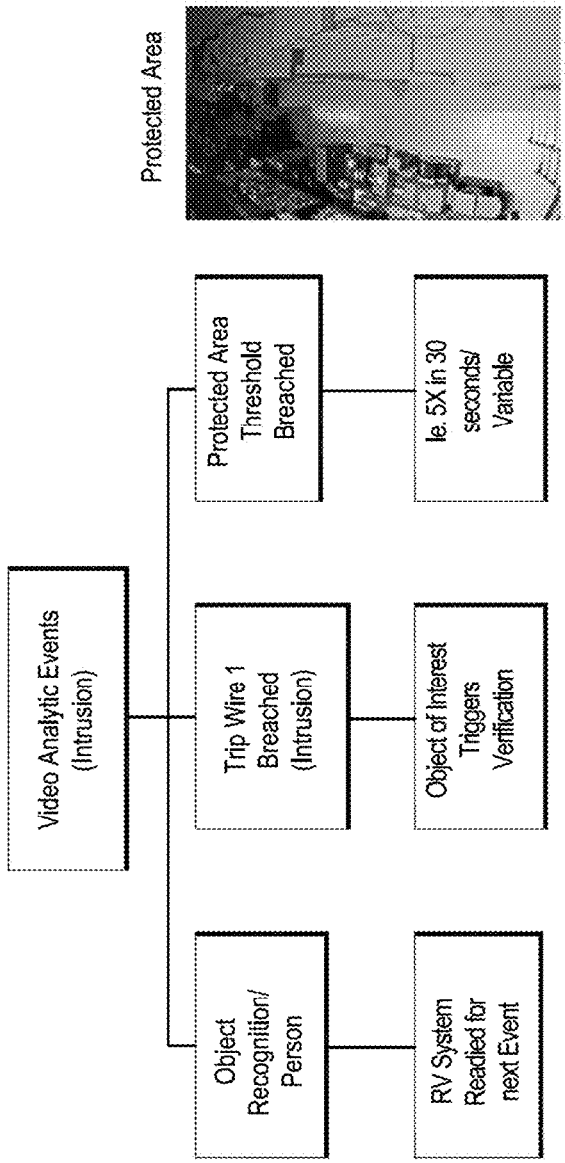
Figure 5:
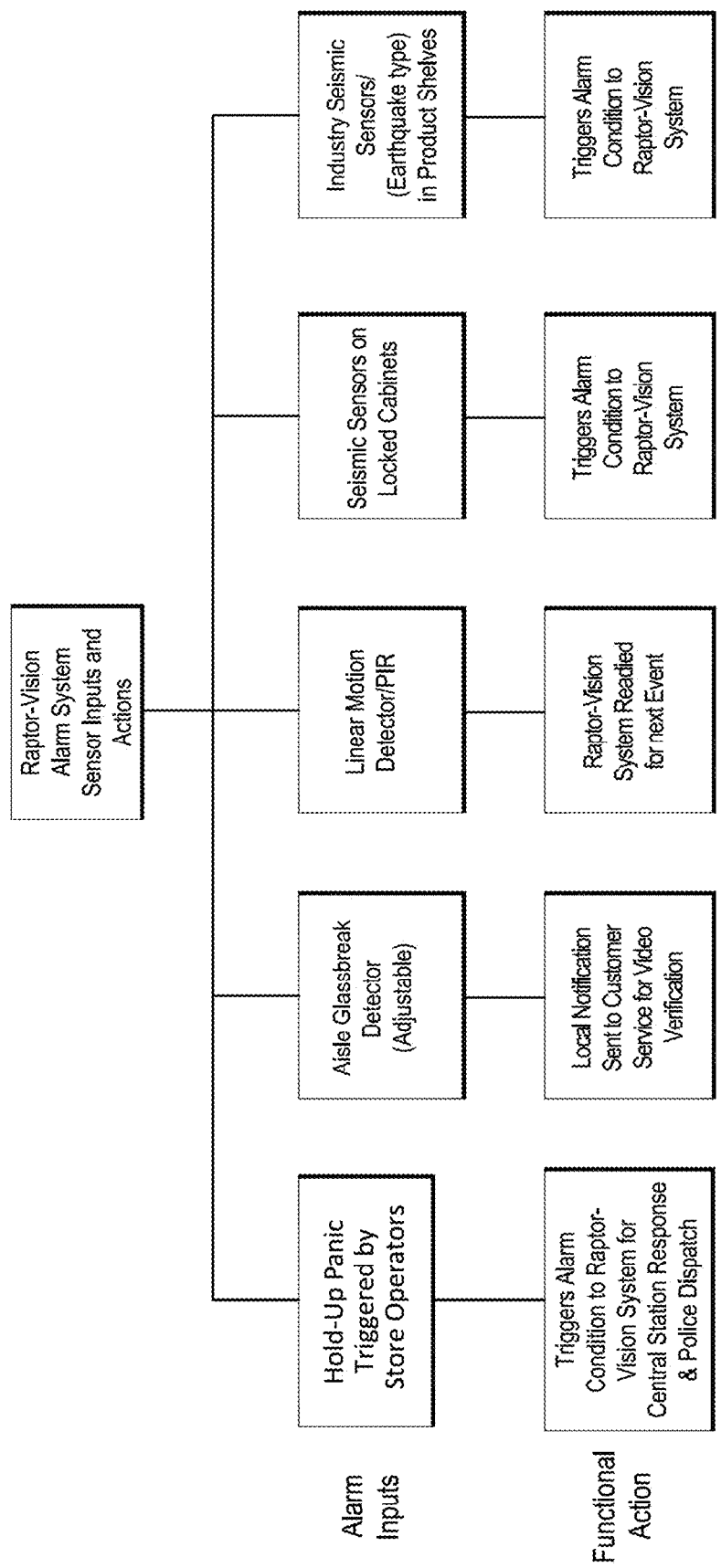
Figure 6:
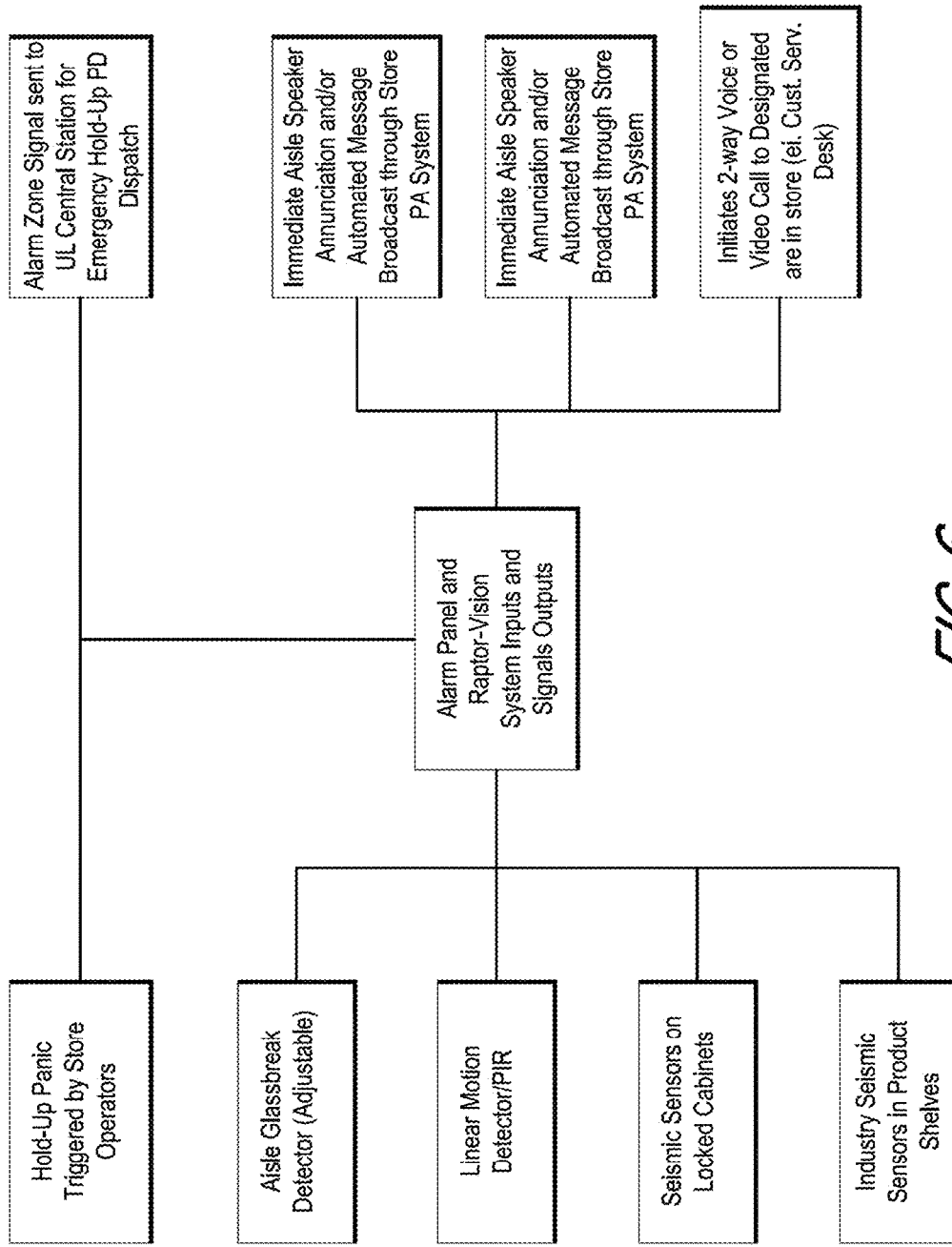
Figure 7:
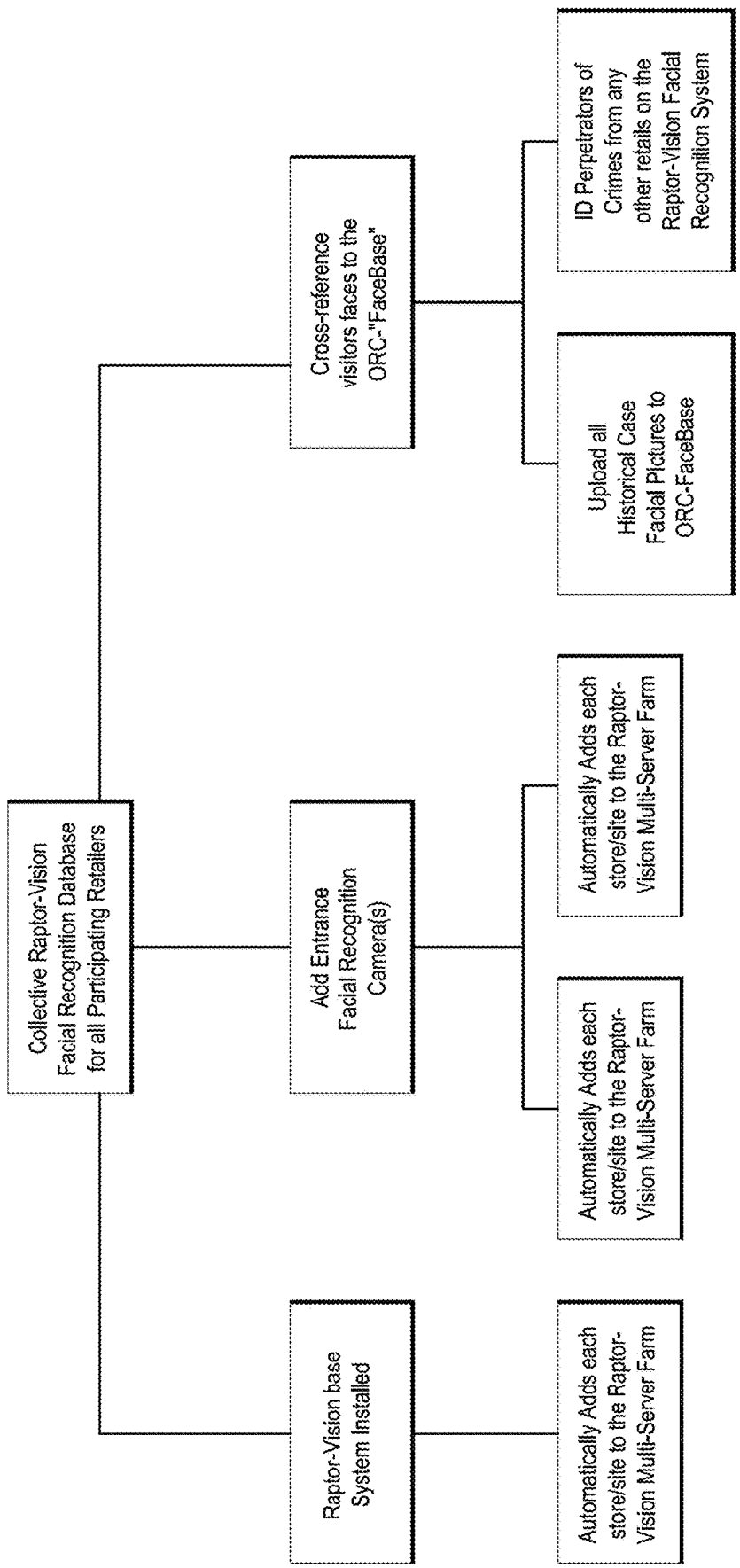
Figure 8:
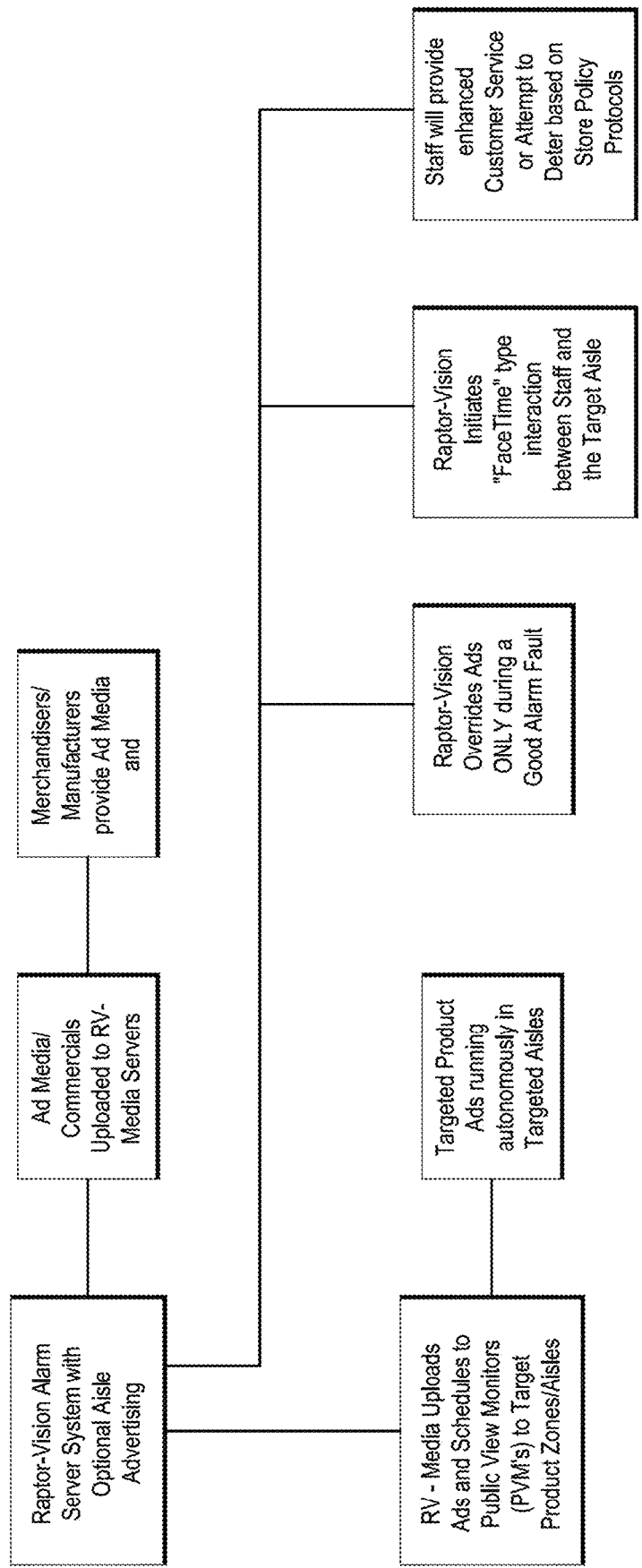
Figure 9:
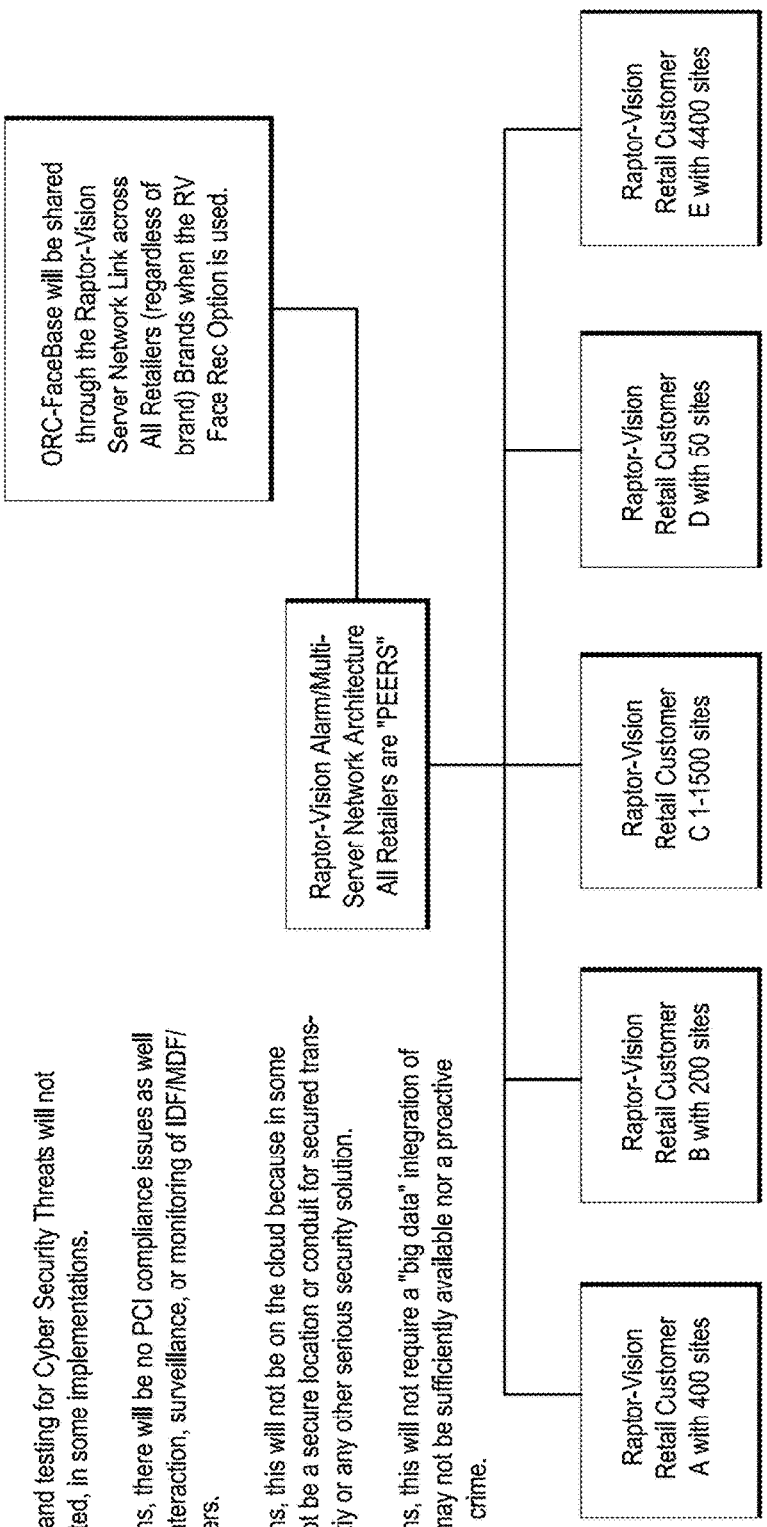
Figure 10:
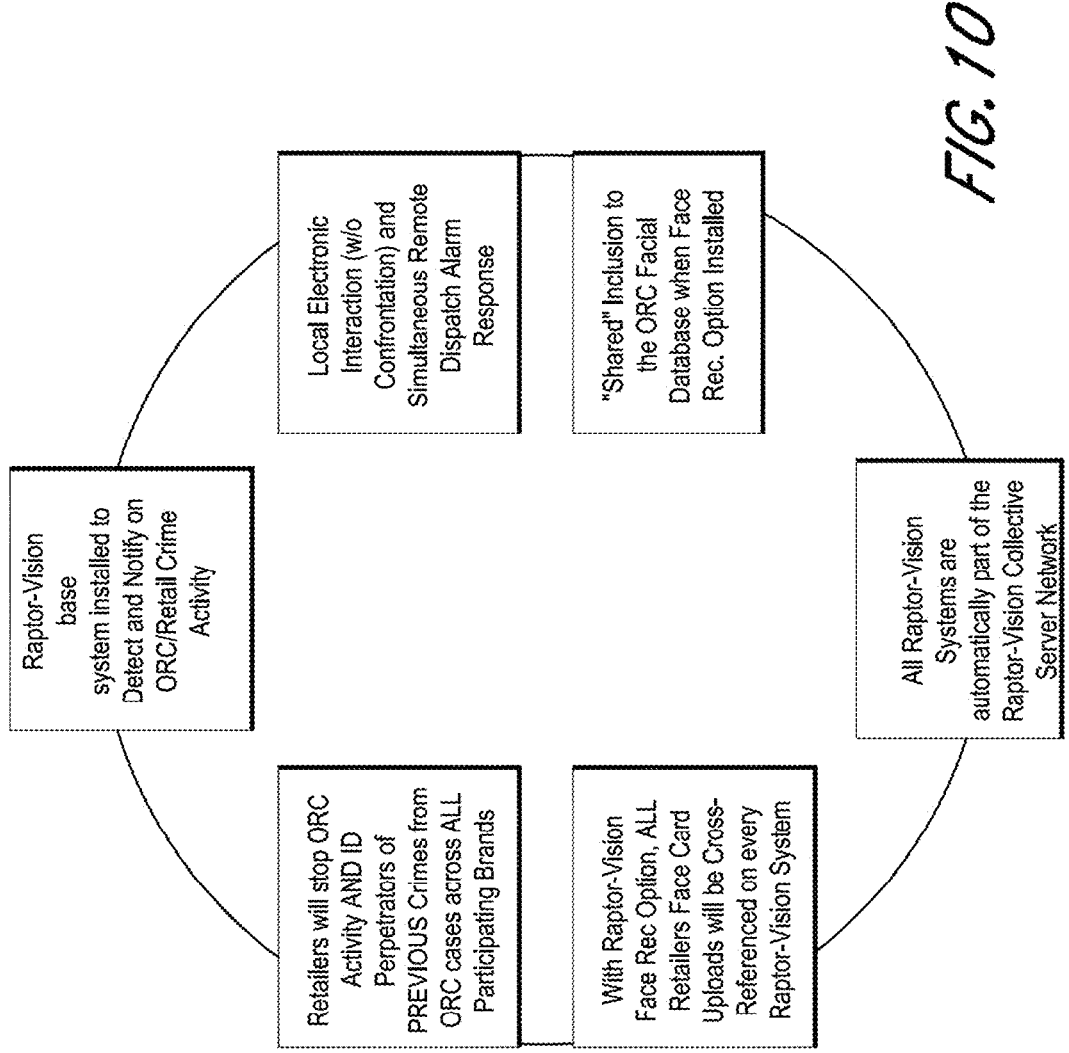

With reference to FIG. 3, the video analytics can perform object recognition, such as to identify a person in the target area (e.g., in the aisle of the store with high-value merchandise, where the aisle can be an area in front of one shelf or an area between two or more shelves). The position of the camera and the video analytic software of the system can be configured to define virtual tripwires or virtual fences in the video area. When an object (e.g., a part of a person) moves across the virtual tripwire or fence or merely breaches the virtual tripwire or fence, a breach event can be logged. The system can have a threshold number of breach events and/or a threshold breach event rate, which can be used to trigger a theft event in the system, as discussed herein. The number of breach events and/or the breach event rate can be used in determining a score (e.g., along with other factors like loitering, fast movement, seismic sensor data, threshold sensor data, crowd detection data, etc.). The position of the camera and the video analytic software can define protected areas, and movement of an object into the protected area can be logged as a breach event.

The system can include one or more cameras having wide angle lenses for monitoring a larger area around the protected area(s) or virtual fences, and this larger area can be monitored for loitering and/or fast moving objects towards, inside, or away from the target area(s). As discussed, the video analytic software can perform object recognition to identify a person.

In some implementations, the security system can use facial recognition video analytics to identify individual criminals and/or past perpetrators. In some cases, at least one camera configured to be used for facial recognition can be used, and can be positioned, for example, at an entrance of the store so that the camera can capture images of the faces of people entering the store. The system can access a database (e.g., a facial recognition data store, such as facial recognition data store 1432, stored locally or stored remotely and accessed over a network, such as a private retail network) of face information for suspected criminals. If a person commits a crime, images of that person captured by the cameras in the store can be used to create face information in the database. Then when that same person later enters a store, the camera can capture an image of the person's face and compare it to the face information in the database. The system can determine that the person who entered the store is the same person that had previously committed a crime. The system can notify the store security, manager, or other store personnel that the suspected criminal is in the store. When the previous crime was committed in a different store (e.g., a different location of the same store brand, or a different store brand, which may also use a similar security system), the system can notify the store security, manager, or other store personnel from that different store regarding the location of the suspected criminal. The system can contact the central security center (e.g., simultaneously) to report the criminal to law enforcement (e.g., local police department) and/or any investigator with an existing case involving the identified suspect. The report can include photo or video evidence of the current location of the suspected criminal at the store, and it can also include video or photograph footage of the previous crime (e.g., from any participating retailer with the security system). The system can store the video or photograph information so that it can later be used for reporting. A centralized private database of face information from multiple stores can be used.

Figure 11:
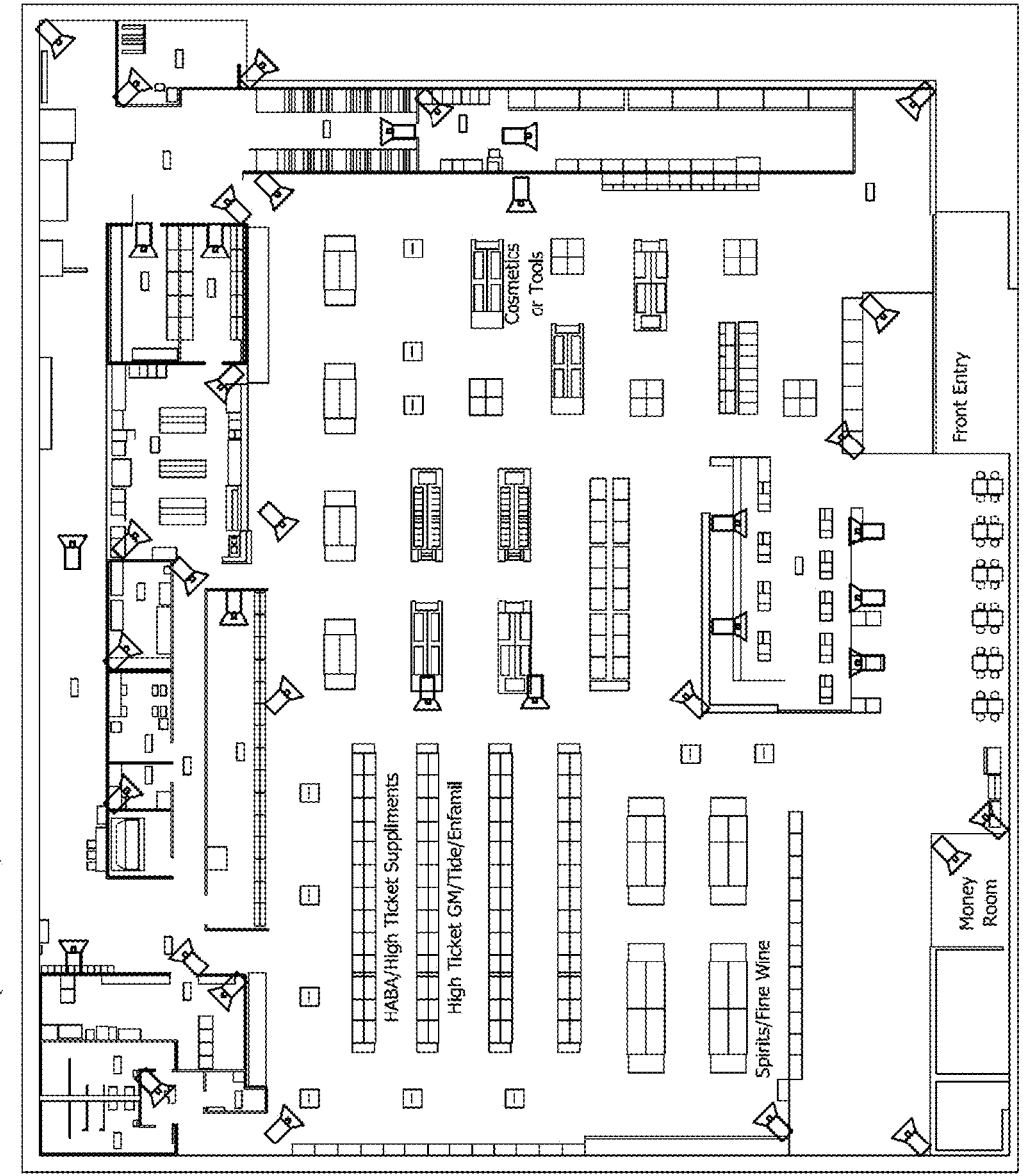
FIG. 11 schematically shows an example embodiment of a physical structure or building (e.g., a store) having a passive camera system.
Figure 12:
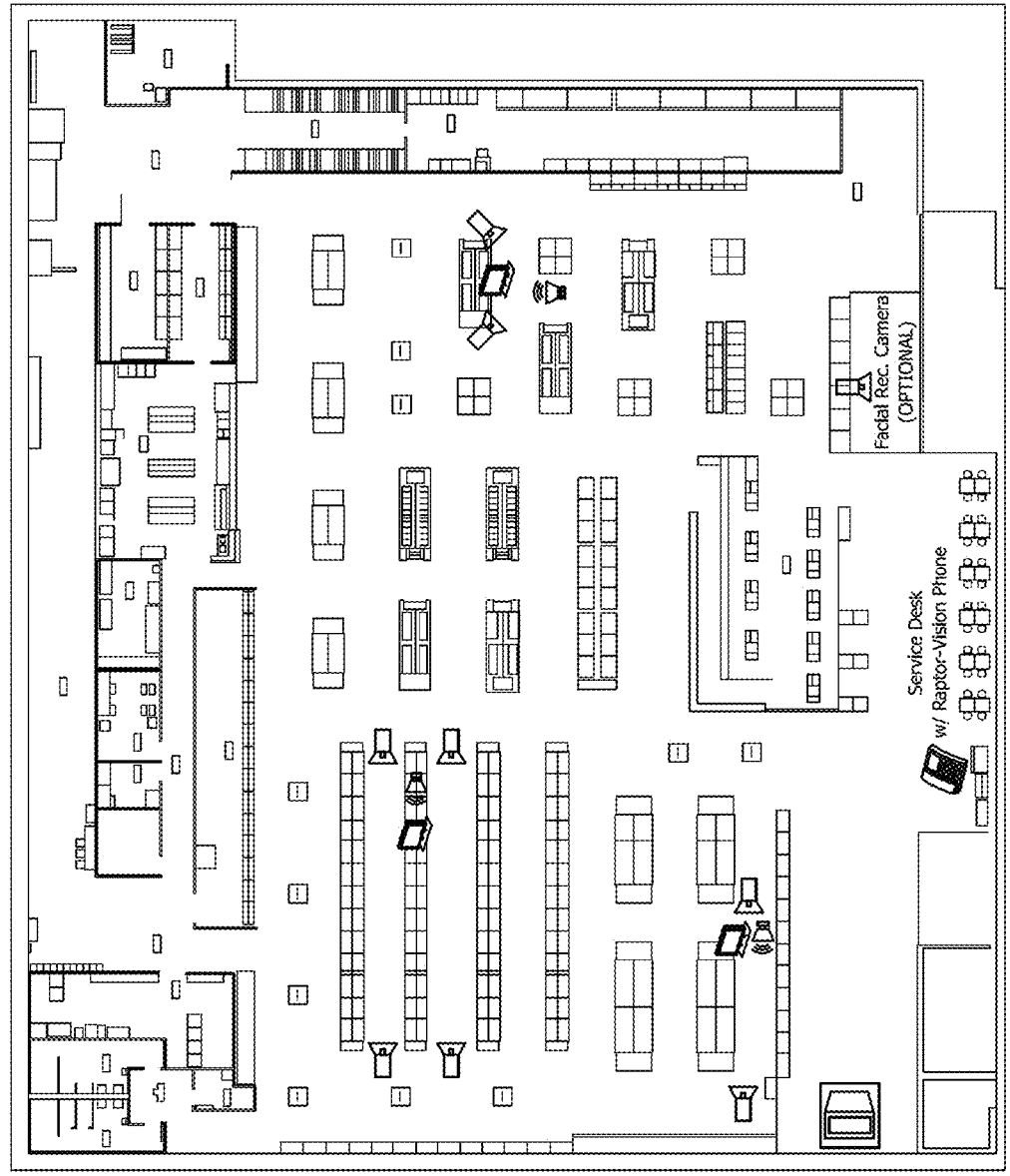
FIG. 12 schematically shows an example embodiment of a physical structure or building (e.g., a store) having a system (e.g., an active camera system) for detecting and/or deterring crime.
Figure 13:
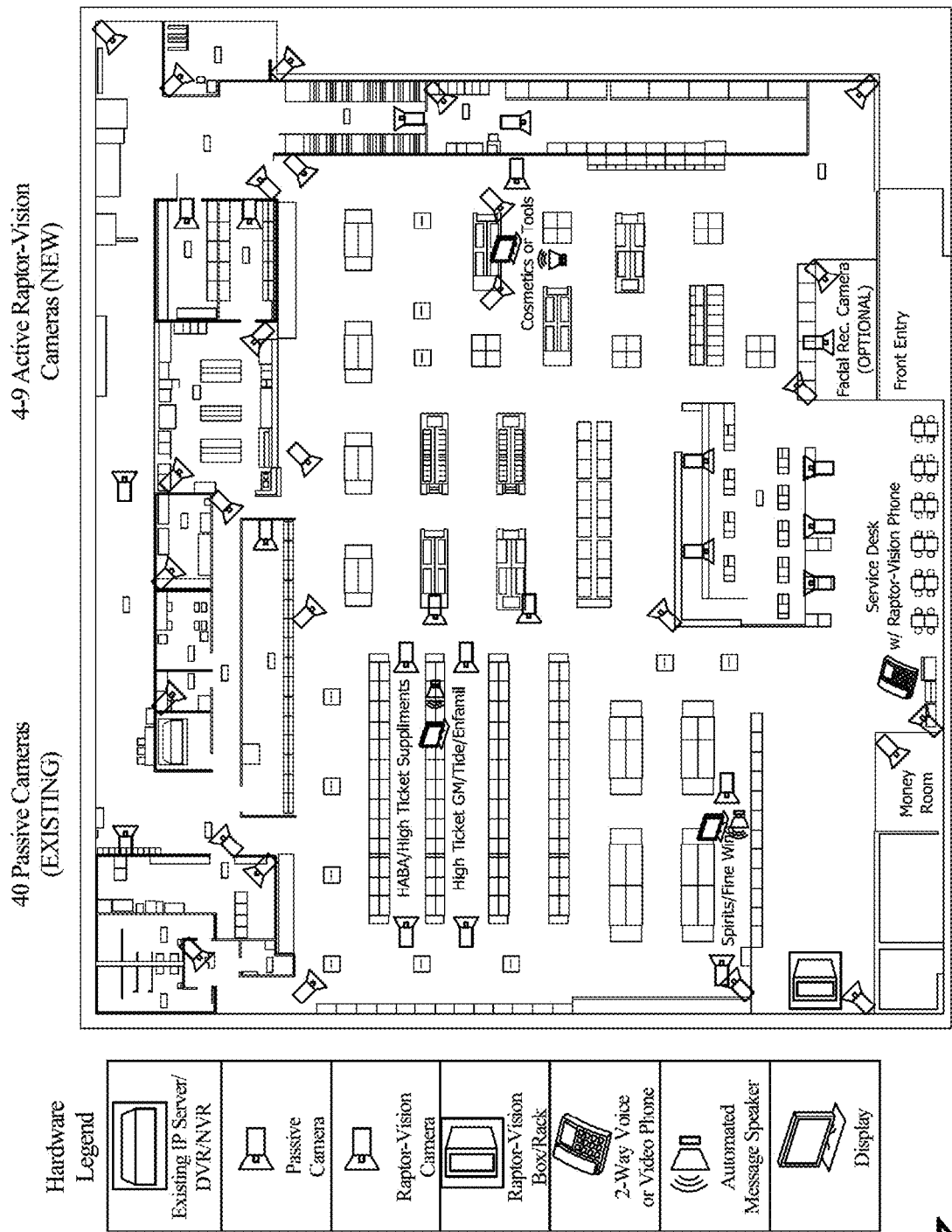
FIG. 13 schematically shows an example embodiment of a physical structure or building (e.g., a store) having the systems of FIGS. 12 and 13 implemented independent from each other.

In some embodiments, the security system can be isolated from the existing company network, security systems, and other store systems. Because the security system of this embodiment does not have access to the company network or any other systems, it does not pose a cyber security risk to the store. If a hacker were to compromise the security system of this embodiment, the hacker would not gain access to the company network or any other system of the store. FIG. 11 shows an example embodiment of a store having a system that includes 40 passive cameras that communicate with an IP server/DVR/NVR or the like. As shown in FIG. 13, the security system disclosed herein can be installed in the same store, in addition to the system of FIG. 11 (e.g., as a separate layer of defense). The security system can be independent of the system of FIG. 11, and independent of any other system of the store, as discussed herein. As shown in FIG. 12, the system can be installed in a store that does not include the system of FIG. 11. Many alternatives are possible. For example, the systems disclosed herein can be integrated with other store systems, in some instances. For example, in some embodiments, the system can use the existing cameras of the system of FIG. 11. Although many embodiments are discussed as using a plurality of cameras, a single camera can be used in some implementations.

With reference to FIGS. 12 and 13, the system can include video cameras, which can be positioned at locations to monitor target areas within the store, such as areas that have high-value merchandise. The system can include a controller (e.g., an alarm controller), such as a box or rack, that includes one or more computer processors and non-transient computer readable memory in communication with the one or more computer processors. The controller can perform the functions and operations discussed herein. The controller can perform video analytics, such as to identify a theft event, as discussed herein. The system can include one or more cameras positioned and/or configured for facial recognition. The controller can contain or access the database of face information and perform the face recognition operations discussed herein. In some instances the controller can be in communication with a central security center or other remote system (e.g., a dispatch system, using a network), which can perform the video analytic functions, the theft event determinations, or other functions described herein. The controller can include an alarm panel or communicate with an alarm panel, which can send alarm signals to an alarm system in the retail store, a central station, and/or to law enforcement.

The system can include one or more terminals, such as a 2-way voice or video phone. The terminal can be used to provide input to the system (e.g., cancel a detected theft event, or activate a message or alarm, or modify system settings). The terminal can be used to communication with the central security center or law enforcement. The terminal can be used to provide a message to or converse with the suspected criminal(s), to converse with shoppers in the target area, to view video footage or images relating to the detected theft event, to listen to audio relating to the detected theft event. In some embodiments, the system can include microphones at the target areas to record or transmit audio (e.g., to the terminal and/or to the controller). In some embodiments, the cameras can include integrated microphones. In some cases the system can use the microphones for communication (e.g., like an intercom) during a triggered theft event. In some cases the system does not record or store audio information from the microphones. The system can include one or more speakers, which can be used to provide messages to, or to converse with, suspected criminals or shoppers in the target area. The system can include one or more displays, which can be used for displaying messages, images, or video to suspected criminals, such as two-way video/audio communication. The display(s) and/or speaker(s) can be used to provide advertisement information when no theft event is identified, as discussed herein. The controller can include a media server, which can stream out independently controlled advertising. A media server can provide advertisements for two or more (e.g., several) different aisles with different target products, for example. The speaker(s) can be integrated into the display(s) in some cases. Accordingly, the system can enable store personnel to safely engage a suspected criminal, and can also enable store personnel to make a proactive customer service interaction with a shopper when appropriate. Communication can be audio only, in some embodiments. In some embodiments, a camera can be located at or incorporated into the terminal, to enable video communication from the terminal.

The system can be used to detect a potential crime, notify of a crime in progress, and/or deter a crime. The system can provide local interaction with a customer or a suspected criminal together with simultaneous remote dispatch response.

While certain embodiments are described herein with respect to theft events, this is not meant to be limiting. For example, the techniques described herein as being implemented by the system can be used to detect and/or deter theft events (e.g., stealing an item from a specified area in a retail store, from a specified area in a distribution center, from a specified area in a manufacturing facility, from a specified area in a storage facility, from a specified area in a pharmacy, etc.), to detect and/or deter any criminal activity other than theft (e.g., tagging or applying graffiti to a wall, cutting wires in a fence, breaking down or attempting to forcibly enter a door, cutting or otherwise circumventing locks, or any other activity in which multiple intrusions are performed, such as quick lateral motions (e.g., the back and forth movement of a hand, arm, leg, head, etc.) at a single location or within a defined area that may be made by a perpetrator in performing the crime), and/or to detect the selection of items (and/or the number of such selections) from a counter, cabinet, shelf, rack, safe, secure area, etc. (e.g., to track item inventory, to determine whether the number of item selections matches or closely matches the number of item purchases, to determine whether an item, such as a toxic, volatile, valuable, or controlled substance, has been accessed more than an allowed number of times, etc.).

System Diagram

Figure 14:
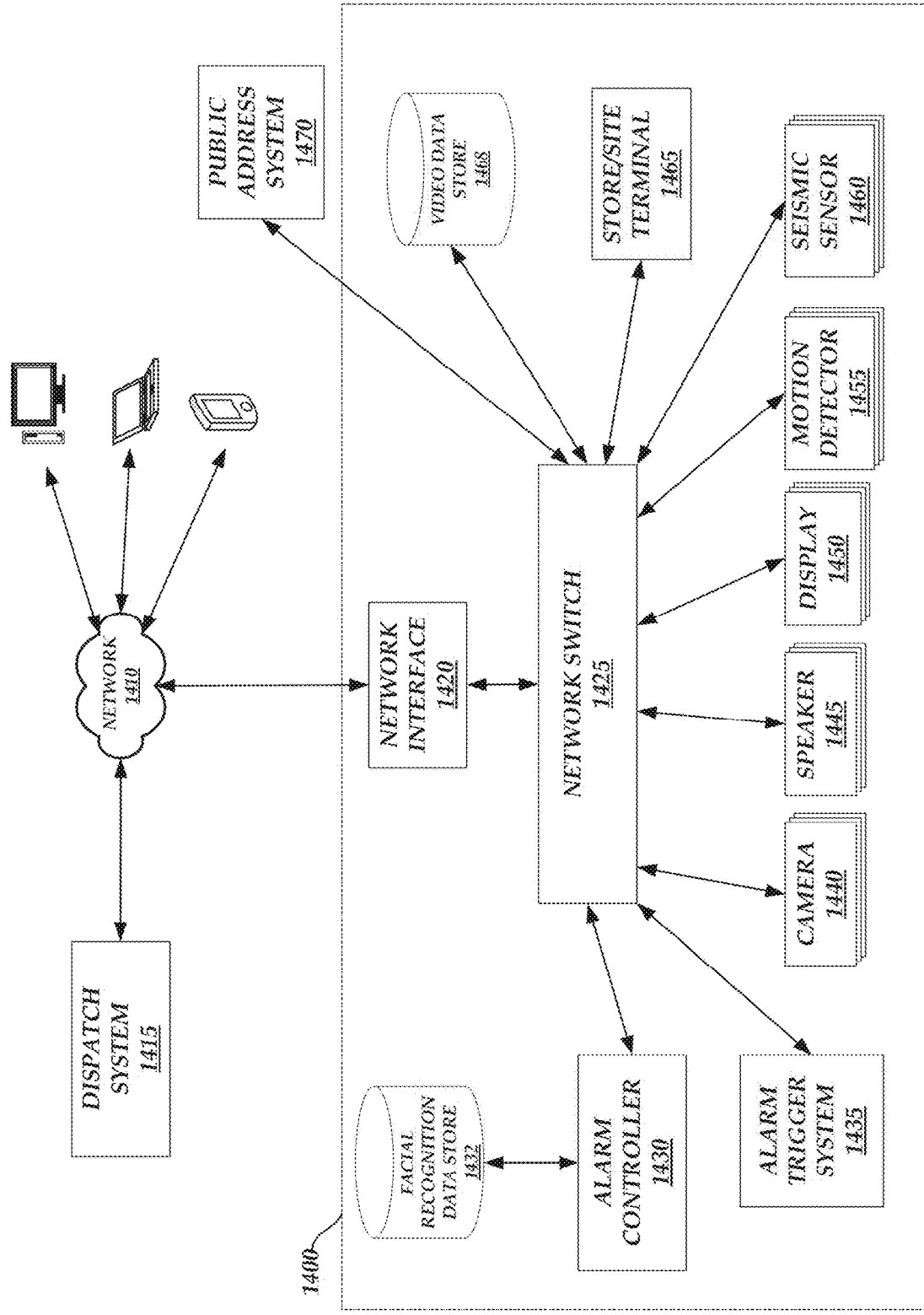
FIG. 14 schematically shows a block diagram depicting components of an example embodiment of a system.

FIG. 14 schematically shows a block diagram depicting components of an example embodiment of a system 1400. The system 1400 may be located in a building, such as a retail store. As illustrated in FIG. 14, the system 1400 includes a network interface 1420, a network switch 1425, an alarm controller 1430, a facial recognition data store 1432, an alarm trigger system 1435, one or more cameras 1440, one or more speakers 1445, one or more displays 1450, one or more motion detectors 1455, one or more seismic sensors 1460, a store/site terminal 1465, and/or a video data store 1468.

The network interface 1420 can be any physical computing device configured to communicate with a network, such as network 1410. For example, the network interface 1420 can be a physical computing device configured to provide a wireless area network (WAN), such as a cellular hotspot, a router, an optical network terminal, etc. The network interface 1420 can serve as an interface between the network 1410 and the network switch 1425. A dispatch system 1415 and various user devices 1402 may be external (or internal) to the building in which the system 1400 is located and may be in communication with the network 1410. The components of the system 1400 can therefore communicate with the dispatch system 1415 and/or the user device(s) 1402 via the network interface 1420 and network 1410. The dispatch system 1415 can include a physical computing system operated by a remote monitoring station, which can be a centralized monitoring station that monitors a plurality of locations having the system 1400. The monitoring station can interface with law enforcement in response to a theft event, such as to send law enforcement to the site of the system 1400. In some cases the dispatch system 1415 can include a system operated by law enforcement that receives information about potential crimes and allows dispatchers to dispatch law enforcement accordingly).

In some embodiments, the network 1410 includes any wired network, wireless network, or combination thereof. For example, the network 1410 may be a personal area network, local area network, wide area network, over-the-air broadcast network (e.g., for radio or television), cable network, satellite network, cellular telephone network, or combination thereof. As a further example, the network 1410 may be a publicly accessible network of linked networks, possibly operated by various distinct parties, such as the Internet. In some embodiments, the network 110 may be a private or semi-private network, such as a corporate or university intranet. The network 1410 may include one or more wireless networks, such as a Global System for Mobile Communications (GSM) network, a Code Division Multiple Access (CDMA) network, a Long Term Evolution (LTE) network, or any other type of wireless network. The network 1410 can use protocols and components for communicating via the Internet or any of the other aforementioned types of networks. For example, the protocols used by the network 1410 may include Hypertext Transfer Protocol (HTTP), HTTP Secure (HTTPS), Message Queue Telemetry Transport (MQTT), Constrained Application Protocol (CoAP), and the like. Any suitable protocols and components for communicating via the Internet or any of the other aforementioned types of communication networks can be used.

The alarm controller 1430, the alarm trigger system 1435, the camera(s) 1440, the speaker(s) 1445, the display(s) 1450, the motion detector(s) 1455, the seismic sensor(s) 1460, the terminal 1465, and/or the video data store 1468 can be in communication with each other (e.g., via the network switch 1425). For example, some or all of the alarm controller 1430, the alarm trigger system 1435, the camera(s) 1440, the speaker(s) 1445, the display(s) 1450, the motion detector(s) 1455, the seismic sensor(s) 1460, the terminal 1465, and/or the video data store 1468 are coupled to each other and/or to the network switch 1425 via a wired connection (e.g., an Ethernet cable). Alternatively or in addition, some or all of the alarm controller 1430, the alarm trigger system 1435, the camera(s) 1440, the speaker(s) 1445, the display(s) 1450, the motion detector(s) 1455, the seismic sensor(s) 1460, the terminal 1465, and/or the video data store 1468 are in communication with each other and/or the network switch 1425 via a wireless connection (e.g., via BLUETOOTH, WIFI, etc.). In addition, PA system 1470, which may be located in the same building as the system 1400, may be in communication with the network switch 1425 via a wired or wireless connection. The PA system can be triggered and/or controlled by the alarm controller 1430, such as to broadcast a message to at least the monitored area. It will be understood that in some embodiments, various components of the system 1400 can communicate directly with each other, without going through the network switch. In some embodiments, the network switch 1425 can be omitted, or multiple network switches, hubs, or other communication components can be used to facilitate communication between the components of the system to implement the functionality discussed herein.

The network switch 1425 may receive AC power from a main power line accessible via the building. The network switch 1425 can then route power to one or more of the other components of the system 1400 via a cable, such as an Ethernet cable (e.g., power over Ethernet (POE) can be used to route power from the network switch 1425 to the other components of the system 1400). Alternatively, the alarm controller 1430 and/or alarm trigger system 1435 receive AC power in addition to or instead of the network switch 1425, and the alarm controller 1430 and/or alarm trigger system 1435 routes power to the other components of the system 1400 via the network switch 1425 and POE.

As described herein, the camera(s) 1440, the speaker(s) 1445, the display(s) 1450, the motion detector(s) 1455, and/or the seismic sensor(s) 1460 may be located in various locations within the building. The camera(s) 1440, the speaker(s) 1445, the display(s) 1450, the motion detector(s) 1455, and/or the seismic sensor(s) 1460 may each be associated with a zone or area corresponding to the location within the building in which the respective component is located.

Data received from the camera(s) 1440, the motion detector(s) 1455, and/or the seismic sensor(s) 1460 can be routed (e.g., by the network switch 1425, other communication components, direct wired connections, or wireless signals) to the alarm controller 1430, which can be located within the system 1400 (as shown) or external to the system 1400 (e.g., in the building, but external to the system 1400, external to the building, etc., not shown). The alarm controller 1430 can process images and/or videos received from the camera(s) 1440 and/or indications of movement or shaking received from the motion detector(s) 1455 and/or seismic sensor(s) 1460 to determine whether a potential theft event is detected. Additional details regarding the operations performed by the alarm controller 1430 to determine whether a potential theft event is detected are described in greater detail below. The alarm controller 1430 can be an alarm monitoring video server or any video server. The alarm controller 1430 can also simply be referred to as a controller. The alarm controller 1430 can be a general computer system running software to implement the functionality described herein, or can be a dedicated computing hardware system designed to implement the functionality described herein.

If the alarm controller 1430 determines that a potential theft event is detected, then the alarm controller 1430 may transmit a message to the alarm trigger system 1435 (e.g., via the network switch 1425). The message may include an indication of a time that the potential theft event is detected and an indication of a zone or area within the building in which the potential theft event is detected. The alarm trigger system 1435 can include an alarm panel. In some the alarm controller 1430 can send the message to an existing alarm panel at the store/site, which also handles other alarm types (e.g., break in, robbery, burglary, etc.). In some embodiments, the alarm trigger system 1435 can include an alarm panel that is dedicated to the system 1400. The alarm trigger system can include a user interface, such as having a display, buttons, or other user input elements or information output elements. The alarm system can be in communication with a network interface 1420 so that it can communicate alarms to outside entities (e.g., the dispatch system 1415), such as in response to the message from the alarm controller 1430 indicating a potential theft event. In some cases the alarm trigger system 1435 can have its own dedicated network interface (e.g., a cellular network interface).

In response to the potential theft event, the alarm controller 1430 and/or the alarm trigger system 1435 can cause one or more of the components to take automated action(s). One or more speaker(s) 1445 can play an automated message. The automated message can be designed to deter theft, while not being accusatory (e.g., "Sales associates are coming to isle 6 immediately to assist you."). In response to the potential theft event, the alarm controller 1430 and/or the alarm trigger system 1435 can cause the establishment of a communication link between the camera 1440 (e.g., that captured the video/images that triggered the potential theft event) and the terminal 1465. By way of example, the alarm trigger system 1435, which may be located within an alarm panel in the building, can transmit a signal to the camera 1440 in the building that is associated with the zone or area within the building in which the potential theft is detected via the network switch 1425. The signal, when received by the camera 1440, can cause the camera 1440 to call the terminal 1465.

As described herein, when a manager, security personnel, or other employee answers the call, the terminal 1465 can present images, video, and/or audio information captured by the camera 1440 or other devices associated with the area of interest. For example, live video and/or sound of the zone or area in which a potential theft event is detected can be provided by the camera 1440 to the terminal 1465, which can enable the store personnel to view the current actions of the suspect(s). In some implementations, past video and/or audio of the zone or area in which a potential theft event is detected can also be stored, made accessible via the alarm controller 1430, and/or optionally provided to the terminal 1465, such as the video and/or audio captured around the time of the event(s) that triggered the theft event determination. For example, video and/or audio captured by the camera(s) 1440 can be stored by the camera(s) 1440 in the video data store 1468 (e.g., transmitted via the network switch 1425). The video and/or audio data can be stored in the video data store 1468 in entries associated with the time that the respective video and/or audio is captured and with an indication of the camera 1440 that captured the respective video and/or audio. If a potential theft event is determined to have occurred at a first time (e.g., 3:05:46) in a first zone or area, the alarm controller 1430 or the alarm trigger system 1435 can retrieve from the video data store 1468 (e.g., stored locally or on a server) the video and/or audio captured around the first time (e.g., from 3:05:41 to 3:05:51) by the camera 1440 located in the first zone or area. The alarm controller 1430 or alarm trigger system 1435 can then store that video and/or audio differently so that it will not be deleted automatically, or can flag the video and/or audio as being associated with the potential theft event. The user can retrieve the video and/or audio information, such as using the alarm controller 1430 or other user device associated with the system. The video and/or audio can optionally be transmitted to a user device 1402 (e.g., via an email or text), to a dispatch system 1415, and/or to the store/site terminal 1465.

When no potential theft event is identified, the system can store (e.g., in the video data store 1468) a rolling window of video footage and/or images received from the camera(s) 1440 and/or audio information. After an amount of time has passed (e.g., 5 seconds, 10 seconds, 30 seconds, 1 minute, 5 minutes, 15 minutes, 1 hour, 3 hours, 12 hours, 24 hours, or more, or any range of times bounded by these values), video footage and/or images and/or audio can be deleted or replaced. When a potential theft event occurs the system can save footage/images/audio associated with the potential theft event, so that it is not deleted or replaced. The saved footage/images can be used to enable a user to determine whether a theft is actually happening, to identify the thief, etc.

Alternatively or in addition, the alarm controller 1430 or alarm trigger system 1435 can transmit the retrieved video and/or audio to the dispatch system 1415 (e.g., a centralized monitoring station or to law enforcement) via the network switch 1425, the network interface 1420, and the network 1410 and/or to one or more user devices 1402 via the network switch 1425, the network interface 1420, and the network 1410. In some cases, information can be transmitted over multiple networks at once. For example, the video and/or audio can be transmitted to the user device 1402 as part of a text message, as an attachment in an email (e.g., where the email and attachment(s) are transmitted to an email server accessible by the user device 1402), and/or as standalone file(s).

The manager, security personnel, or other employee (e.g., user) can use the terminal 1465 to communicate with the suspects. For example, the terminal 1465 can include a camera and/or microphone used to capture video and/or audio of the user. The terminal 1465 can be a telephone, a video telephone, or other suitable communication device. The terminal 1465 can be a telephone (e.g., a video telephone) that is dedicated to communication with the system 1400 (e.g., not capable of receive or making outside phone calls). In some cases, the terminal 1465 can be part of a normal phone system, so that the terminal can be used to make and receive normal phone calls, as well as to interface with the system 1400, as described herein. In some cases the system 1400 can have multiple terminals 1465, such as positioned at different locations in the store (e.g., one terminal at a security station, one terminal at a customer service station, one terminal at a manager's office, and/or one terminal at a front desk). The terminal 1465 can be a stationary terminal, such as a phone that is wired to a communication port. The terminal 1465 can be a mobile communication device, such as a smartphone or tablet computer, etc. The terminal 1465 can communicate with other components of the system 1400 through a wireless protocol (e.g., WIFI, a cellular network, BLUETOOTH, etc.) or through a wired connection (e.g., through the network switch 1425).

The user can actuate an input element (e.g., a button, a touch screen, a voice command, etc.) of the terminal 1465 to engage a communication link between the terminal 1465 and the camera 1440, speaker 1445, and/or display 1450 located in the zone or area in which the potential theft event is detected a communication device. As described above, the user can actuate the input element and provide an audio message to the suspect(s) via the camera 1440 (e.g., if the camera 1440 includes a speaker) or the speaker 1445. The terminal 1465 and the camera 1440 can be configured to provide two-way voice communications such that the user can converse with the suspect(s). Further as described above, the alarm trigger system 1435 and/or the terminal 1465 can transmit an instruction to the display 1450 via the network switch 1425 to display an image or video to the suspect(s) (e.g., a video of the user as captured by the terminal 1465). In some embodiments, the terminal 1465 can include a user input element configured to enable the user to indicate that a theft event is happening. The user input element can be a panic button. In response to input received from the user input element (e.g., panic button), the system can contact the dispatch system 1415, send a message to the monitored area such as using the speaker(s) 1445 and/or the PA system 1470, or take other remedial action as discussed herein.

The user can also use the terminal 1465 to trigger an alarm or to identify a false positive. For example, the user can select an input element that, when selected, causes the terminal 1465 to transmit a message to the alarm trigger system 1435, which can cause the alarm trigger system 1435 to take an action responsive to the indication of a theft event, such as triggering or activating a silent or audible alarm in the building (e.g., via the PA system 1470), in the target zone or area of the building (e.g., via the PA system 1470), and/or with an external system (e.g., a remote monitoring station and/or a law enforcement alarm system). As another example, the user may determine that a theft event is not occurring. The user can select an input element indicating that the detection is a false positive (which may cause the alarm trigger system 1435 to not trigger an alarm, to stop any alarm that may be playing, and/or to send an all clear indication to an external system such as the dispatch system 1415, or the like). If no input is provided by the user to the terminal 1465 within a threshold amount of time (e.g., 10 seconds) from when the call to the terminal 1465 is answered, then the terminal 1465 can notify the alarm trigger system 1435 accordingly. The alarm trigger system 1435 can then transmit an automated message to the speaker 1445 and/or the PA system 1470 speaker, transmit an instruction to the display 1450 to display an image or video (e.g., a message indicating to the suspect that help is on the way), transmit a message to the dispatch system 1415 that a potential theft event is occurring, and/or transmit a message to the user device 1402 (e.g., a snapshot of the potential theft event, video of the potential theft event, audio of the potential theft event, etc.). Thus, if store personnel do not provide any indication of whether a potential theft event is happening (and such confirmation is required by the system 1400), the system 1400 can still perform a default responsive action.

If a user does not answer the call initiated by the camera 1440, the camera 1440 may inform the alarm trigger system 1435 via the network switch 1425 accordingly. In response, the alarm trigger system 1435 can initiate a call with or transmit a message to the dispatch system 1415 such as via the network switch 1425, the network interface 1420, and the network 1410. The call, when answered, may result in a dispatcher using the dispatch system 1415 to hear an automated message that provides information on the potential theft event, such as the time and location (e.g., building and zone in building) of the potential theft event. Similarly, the transmitted message can include the same potential theft event information. As described herein, the alarm trigger system 1435 can further retrieve video and/or audio of the potential theft event (e.g., based on matching a timestamp of a time when a potential theft event is detected to timestamp(s) of images, video, and/or audio from the video data store

1468 and transmit the video and/or audio to the dispatch system 1415. The alarm trigger system 1435 can further trigger an audible alarm via the PA system 1470 and/or via the one or more speakers 1445. Thus, if store personnel are not available at the terminal 1465 when the theft event is identified, the system 1400 can still perform a default responsive action. In further embodiments, the alarm trigger system 1435 transmits the potential theft event information and/or the video and/or audio to the dispatch system 1415 simultaneously with transmitting the signal to the camera 1440 and/or regardless of whether a user answers the terminal 1465. In some embodiments, the system 1400 can take automated actions without waiting for user input (e.g., from the terminal 1465). For example, the speaker(s) 1445 can play an automated message. The system can have a plurality of stored automated messages, and the alarm controller 1430 can determine which automated message to use based on the parameters that triggered the potential theft event (e.g., where is the potential theft event, how many people involved, whether other shoppers are present, a determined score indicating how confident the system is that a true theft event is occurring, etc.) Additional messages (which can be different than an initial message) can be provided later, such as once input is received via the terminal 1465. By way of example, the process can start (e.g., without waiting for user response) with an automated initial message that is relatively not threatening, and can escalate to a more direct or accusatory message (e.g., if the user confirms the theft event via the terminal).

In alternate embodiments, not shown, the terminal 1465 is located off-site at a location remote from the store or building. For example, a centralized monitoring station or service company can be used to monitor multiple stores and have access to the network 1410. The components of the system 1400 can then communicate with the terminal 1465 via the network switch 1425, the network interface 1420, and the network 1410.

In some embodiments, in response to receiving the message from the alarm controller 1430 of a potential theft event, the alarm trigger system 1435 transmits an automated message to the speaker 1445 in the building that is associated with the zone or area within the building in which the potential theft event is detected via the network switch 1425 and/or to a speaker of the PA system 1470 that is associated with at least the zone or area within the building in which the potential theft event is detected. Reception of the automated message may cause the speaker 1445 or the PA system 1470 speaker to output audio corresponding to the automated message. For example, the speaker 1445 or the PA system 1470 can broadcast a message like the following: "All associates to the liquor isle. All associates to the liquor isle immediately."

The alarm panel that includes the alarm trigger system 1435 and/or the enclosure that houses the alarm controller 1430 may itself be secured with an alarm. If the alarm panel or enclosure is tampered with (e.g., opened, or opened without a proper code being supplied to disable the alarm), the alarm coupled to the alarm panel or enclosure can notify the alarm trigger system 1435 that an alarm should be triggered. In response, the alarm trigger system 1435 and/or alarm controller 1430 can cause the speaker(s) 1445 and/or the PA system 1470 speaker(s) to output an audible alarm, transmit an instruction to a display 1450 to display an image or video (e.g., a message informing store personnel that the alarm panel or enclosure is being tampered with, video of a room in which the alarm panel or enclosure is located, etc.), transmit a message to the dispatch system 1415 that a potential theft event is occurring or will occur, and/or transmit a message to the user device 1402 (e.g., indicating that the alarm panel or enclosure is being tampered with). Thus, the alarm controller 1430 and/or alarm trigger system 1435 can be secured from unauthorized access that may affect the triggering of alarms and/or messages.

As described above, the alarm controller 1430 and/or the alarm trigger system 1435 can receive AC power from a main power line accessible via the building. The alarm controller 1430 and/or alarm trigger system 1435 may further include a battery back-up. If the alarm controller 1430 detects that the type of power received has transitioned from AC to DC (e.g., indicating that AC power has been lost and the battery back-up is now supplying power to the alarm controller 1430), then the alarm controller 1430 can instruct the alarm trigger system 1435 to trigger an alarm, transmit an alert to the user device 1402, transmit an alert to the dispatch system 1415, etc. Similarly, if the alarm trigger system 1435 detects that the type of power received has transitioned from AC to DC (e.g., indicating that AC power has been lost and the battery back-up is now supplying power to the alarm trigger system 1435), then the alarm trigger system 1435 can trigger an alarm, transmit an alert to the user device 1402, transmit an alert to the dispatch system 1415, etc.

The camera(s) 1440 can be hemispheric cameras, infrared cameras, thermal imaging cameras, high-resolution cameras, and/or the like. The camera(s) 1440 may include microphones and/or speakers such that two-way audio features can be provided (e.g., two-way with the terminal 1465). The camera(s) 1440 may further include a display such that two-way video features can be provided (e.g., two-way with the terminal 1465).

The cameras 1440 can be positioned such that one or more shelves are visible. For example, each camera 1440 can be positioned above an aisle (e.g., within a vertical plane extending up from the aisle) and a lens of the camera 1440 can face downward toward the aisle. The camera(s) 1440 can be positioned at any point above an aisle. For example, an aisle may be the area in front of a single shelf (and optionally surrounded on the opposite side by a wall or other structure) or the area between two or more shelves. If the aisle is the area in front of a single shelf, then the camera 1440 may be positioned at any point above the aisle between the shelf and the wall or other structure that defines the boundary of the aisle opposite from the shelf. If the aisle is an area between two or more shelves (e.g., two or more shelves define the boundary of the aisle), then the camera 1440 may be positioned at any point above the aisle between the shelves that border the aisle. In addition, the cameras 1440 may be positioned such that obstructions are minimized. For example, the cameras 1440 may be positioned such that the area between the camera lens and shelves and/or aisles include as few objects as possible such that a user can see and define a mask that fully or almost fully covers a portion of a shelf, aisle, etc. and/or that does not cover other objects, such as beams, rods, shadows over shelves and/or aisles caused by other objects, etc.

As described above, the display(s) 1450 can have a first operating mode when no theft event is detected. For example, the display(s) 1450 can be used to display advertising information, such as specifically related to the high-value merchandise in the associated zone or area. When a theft event is detected, the alarm trigger system 1435 can cause the display 1450 associated with the zone or area in which the theft event is detected to transition from the first operating mode to a second operating mode to display an image or video configured to deter theft (e.g., an automated message indicating help is on the way, an alert like a flashing red screen, a live video of the user of the terminal 1465, a live video of the monitored area, etc.). The other display(s) 1450 may remain in the first operating mode unless, for example, the alarm trigger system 1435 specifically instructs such display(s) 1450 to transition to the second operation mode either via direct messages transmitted through the network switch 1425 or via a broadcast message directed at all display(s) 1450.

The motion detector(s) 1455 can be passive infrared (PIR) motion detectors configured to detect motion of an object (e.g., a human) in a surrounding environment, where the motion detector(s) 1455 are not necessarily coupled to the object. Signals generated by a motion detector 1455 (e.g., indicating detected motion) are transmitted to the alarm controller 1430 via the network switch 1425. The sensitivity of the motion detector(s) 1455 can be set when the motion detector(s) 1455 are installed or while the motion detector(s) 1455 are in use. For example, the alarm controller 1430 can adjust the sensitivity of the motion detector(s) 1455, via the network switch 1425, based on user inputs.

Furthermore, as described above, the seismic sensor(s) 1460 can be physical devices configured to detect low or high amplitude vibrations (e.g., seismometers). The seismic sensor(s) 1460 can be placed on shelves, racks, cabinet doors, items, and/or the like to detect vibrations in the components on which the seismic sensor(s) 1460 are placed. Signals generated by a seismic sensor 1460 (e.g., indicating detected vibrations) are transmitted to the alarm controller 1430 via the network switch 1425.

Various example user devices 1402 are shown in FIG. 14, including a desktop computer, laptop, and a mobile phone, each provided by way of illustration. In general, the user devices 1402 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like.

While FIG. 14 depicts the system 1400 as including the alarm controller 1430, the facial recognition data store 1432, the alarm trigger system 1435, the camera(s) 1440, the speaker(s) 1445, the display(s) 1450, the motion detector(s) 1455, the seismic sensor(s) 1460, the terminal 1465, and the video data store 1468, this is not meant to be limiting. For example, any one or more of these components can be removed from the system 1400 and/or located external to the system 1400. In addition, other security-related components, not shown, can be included within the system 1400. Various components of the system 1400 can be combined into a single element. For example, a single storage device can provide the video data store 1468, the facial recognition data store 1432, and other information (e.g., machine executable instructions for implementing the features discussed herein). An integrated device can include the camera 1440 and speaker 1445. A single computing system can implement the alarm controller 1430 and the alarm trigger system 1435, as well as other element of the system 1400. Elements described as being part of the system 1400 can be remove to the area being monitored. For example, a facial recognition data store 1432 can be located on a remote server, which the system 1400 can access, such as via the network 1410. Furthermore, while the present disclosure describes the system 1400 as monitoring locations within a building or store, this is not meant to be limiting. The system 1400 can be implemented inside or outside to detect potential theft events in an indoor or outdoor environment. Various features show of the system 1400 are optional and can be omitted. For example, the motion detector 1455 and seismic sensor 1460 can be optional features. In some implementations, not store/site terminal 1465 is used. The system can detect a potential theft event and provide an automated message via the speaker 1445 or PA system 1470, or display 1450. In some cases, the speaker 1445 and/or the PA system 1470 can be omitted. A message can be provided to the area that is being monitored using the display 1450 with or without an audio component. In some cases, the alarm trigger system 1435 can be omitted, and in some embodiments, the system does not have connection to outside systems (e.g., dispatch system 1415 or user devices 1402) via the network 1410. In some cases, the facial recognition data store 1432 and associated functionality can be omitted. Components of the system 1400 can communication with each other without the network switch 1425. In some cases, the video data is not stored, and the video data store 1468 can be omitted. Many variations are possible.

In further embodiments, the system 1400, or systems similar thereto, can simultaneously serve one or more purposes. For example, the system 1400 can be used to detect a theft event as described herein. Alternatively or in addition, the system 1400, or a system similar thereto, can be used for inventory management purposes. As an illustrative example, the system 1400 (e.g., the alarm controller 1430) can use the techniques described herein (e.g., to detect breaches) to determine the number of times an item has been retrieved from a counter, shelf, cabinet, rack, safe, box, etc. For example, if ten breaches are detected, the system 1400 may determine that ten of the items have been retrieved from a particular location. The system 1400 can then perform one or more additional actions once the number of times an item has been retrieved is determined. For example, the system 1400 can be configured to monitor a retail store or a distribution center. The system 1400 (e.g., the alarm controller 1430) can detect that a certain number of items have been retrieved. The system 1400 can update an inventory database to reflect the number of items remaining at the retail store or the distribution center after the detected number of items have been retrieved. Alternatively or in addition, detection of the retrieval of items may indicate that the retail store or distribution center is running low on that particular item. Thus, the system 1400 (e.g., the alarm controller 1430 or an inventory management device, not shown) can manage inventory by automatically ordering additional items, causing the shipment of additional items to the retail store or distribution center, transmitting an instruction to a delivery vehicle to re-route items being carried by the delivery vehicle to the retail store or distribution center, etc. to replenish the items that have been retrieved from the retail store or distribution center. The location of the detected breaches can be correlated to specific items (e.g., based on the positions of items on the shelves).

As another example, the system can manage inventory as described in the example above. In addition or alternatively, the system can detect possible crime if certain conditions are present and take appropriate action. For example, if the number of breaches detected in a defined area and within a certain timeframe are greater than a threshold value, this may indicate that a person is attempting to steal an item rather than attempting to retrieve an item for purchase and/or to give to a customer. Thus, the system (e.g., the alarm controller 1430 or an inventory management device, not shown) can manage inventory, selectively instructing the alarm trigger system 1435 to take any of the action described herein if the volume and/or frequency of breaches exceeds a threshold.

As another example, the system can obtain an invoice or sales data indicating the number of items that have been ordered prior to any detected breaches. If the system (e.g., the alarm controller 1430) determines that the number of items that have been ordered does not correlate with the number of breaches that are subsequently detected with respect to a particular item (e.g., the number of items that have been ordered is a threshold value less than the number of detected breaches), then this may indicate possible theft or other criminal activity (e.g., more items have been retrieved than are needed to fulfill the orders). Thus, the alarm controller 1430 can then instruct the alarm trigger system 1435 to take any of the actions described herein. The system can be used in a distribution center, to confirm that orders are correctly fulfilled. If the number of breaches (e.g., within a timeframe) is less than or higher than a number of expected breaches based on an order, then the system can indicate that a crime event or malfunction may have occurred (e.g., using an alarm, notification, etc.). Various video analytic algorithms, such as the based on the number of breaches within a timeframe, can be used for determining an event.

As another example, the system can detect the number of breaches corresponding to a particular item as described herein (e.g., in a retail store or other suitable location). The system can then obtain sales data indicating the number of these items that have been purchased subsequent to any detected breaches (e.g., where the sales data can be obtained at any time frame, such as at the end of the work day, within an hour of a detected breach, within 2 hours of a detected breach, etc.). If the system 1400 (e.g., the alarm controller 1430) determines that the number of items that have been purchased does not correlate with the number of breaches that were detected with respect to a particular item prior to the purchases of those items (e.g., the number of items that have been ordered is a threshold value less than the number of detected breaches), then this may indicate possible theft or other criminal activity (e.g., more items have been retrieved than were purchased). Thus, the alarm controller 1430 can then instruct the alarm trigger system 1435 to take any of the actions described herein. In some cases, one or more thresholds for the discrepancy between the detected breaches can the sales data can be applied, where the action depends whether the one or more thresholds are met. For example, in some cases a shopper may pick an item out of a shelf and then return it without purchasing the item. In this example, the system would detect more breaches than items purchased in the sales data. In some cases, a threshold number of breaches is applied, where the system will not count breaches below a threshold (e.g., 2 breaches or fewer within 30 seconds) towards the comparison with sales data. In some cases, the system does not trigger an alarm or notification if the sales data and the detected breaches are within a threshold amount of each other (e.g., discrepancy of 6 or less, so that the system would not trigger an alarm or notification if there are 12 breaches and only 6 items purchased). In some cases, different actions can be taken depending on how much disparity there is between the detected number of breaches and the sales data for the corresponding item. For example, below a first threshold, not action is taken, between the first threshold and a second threshold an email is sent to a manager at the end of the day, above the second threshold an automated call is made to a manager's phone number, etc. The system can have access to a database with sales data, such as received from cash registers, or other point of sale devices, such as in a retail store.

In addition to any of the outputs described herein that may occur in response to detection of a crime event, the system 1400 can produce other outputs in response to detection of a crime event. For example, in response to detection of a crime event, the system 1400 (e.g., the alarm trigger system 1435) can power a motor that causes a door to close (e.g., to prevent a perpetrator from leaving the premises), can trigger a mechanical component (e.g., bolt, latch, etc.) via an electrical signal that causes a door to lock (e.g., to prevent a perpetrator from leaving the premises), can sound an audible alarm or message or trigger a silent alarm, can trigger a visual display (e.g., cause a display 1450 displaying advertisement to instead display a warning message or other message to deter criminal activity), can transmit an email (e.g., to an email server accessible by a user device 1402) that includes information identifying why a theft event was detected, where the theft event was detected, and/or any other information describing the theft event (e.g., images, video, etc.), can transmit a text message that includes information identifying why a theft event was detected, where the theft event was detected, and/or any other information describing the theft event (e.g., images, video, etc.), can notify authorities of a potential theft event (e.g., via a phone call, electronic message, etc.), can active sprinklers of an indoor and/or outdoor sprinkler system located at or near the location at which the crime event is detect, can transmit live and/or previously-captured images, video, and/or audio of the theft event and/or the location where the crime event was detected (e.g., to the terminal 1465), cause a display or video wall (e.g., a set of displays placed side-by-side, such as in a 1×2 configuration, a 2×1 configuration, a 2×2 configuration, a 3×2 configuration, a 3×3 configuration, a 4×4 configuration, etc.) to prioritize the display of an image or video feed originating from the camera 1440 used to detect the crime event over other images or video feeds captured by other cameras 1440 that did not produce images or video used to detect the crime event. For example, a system can include more cameras than displays (e.g., for monitoring a border, a perimeter, a number of shelves, etc.), and the system can determine which cameras to use for the displays based at least in part on the potential crime event determinations discussed herein. In some systems, the intrusions within a timeframe analytic can be applied outside of the crime detection context, such as for inventory management (as discussed herein), and for safety systems. In an industrial setting, for example, detecting a threshold number of breaches into a monitored area within a timeframe can indicate a safety risk event, and the system can take appropriate action, such as to trigger an alarm, cause a ventilation system to evacuate gas from an area where the event is detected (e.g., in situations in which accessing a particular item or area one or more times can create a toxic or hazardous environment and the area needs to be aired out), cause a ventilation system to prevent gas from an area where the theft event is detected to reach other nearby areas (e.g., in situations in which accessing a particular item or area one or more times can create a toxic or hazardous environment and it is desired to shield other nearby areas from being exposed to the toxic or hazardous environment), and/or the like.

Alarm Detection Setup

Figure 15A:
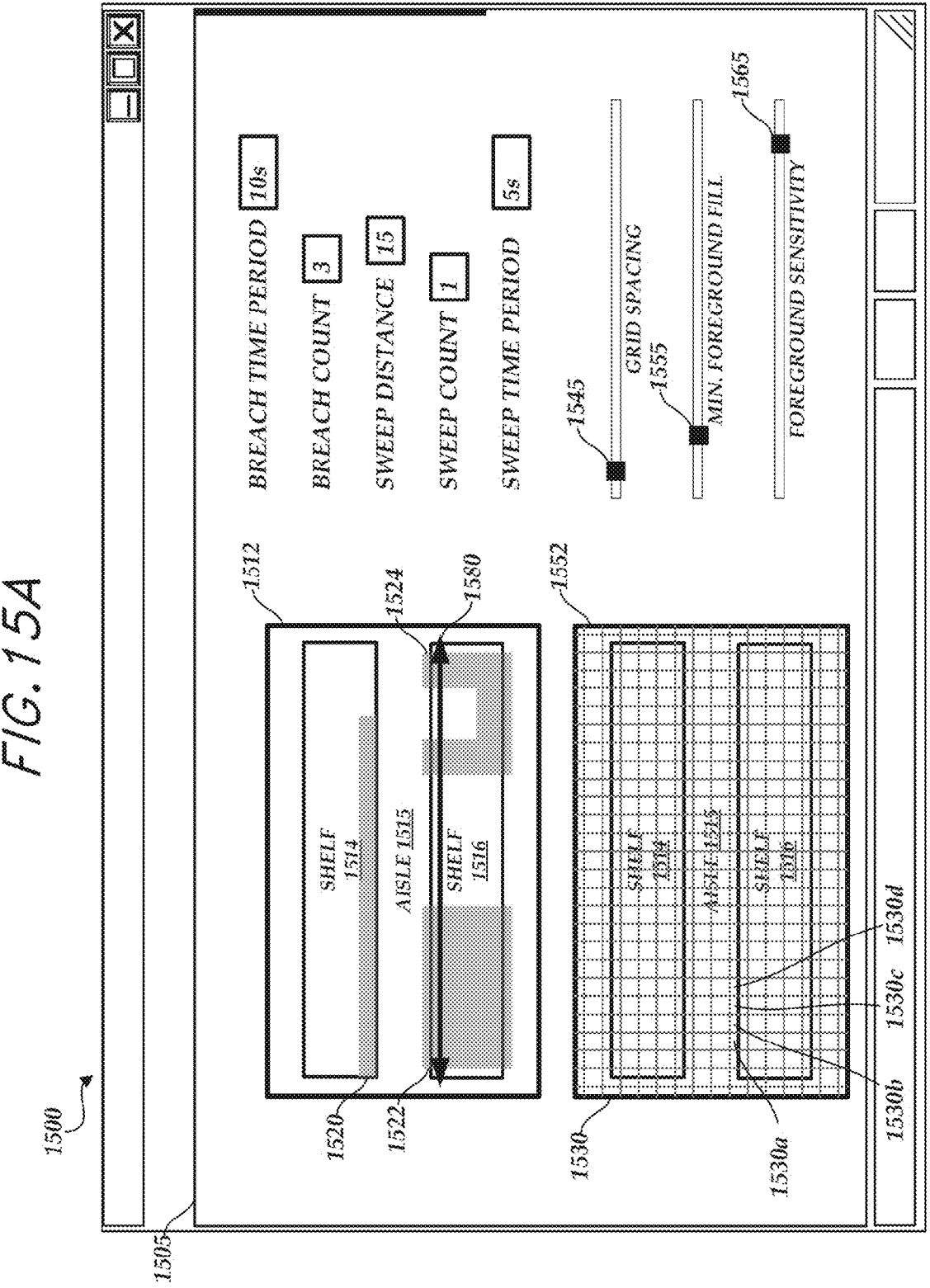

FIGS. 15A-15B illustrate a user interface 1500 for configuring the theft event detection functionality of the alarm controller 1430. The user interface 1500 can be generated in response to information provided by the alarm controller 1430 to allow a user (e.g., using a user device 1402, a physical computing device comprised within the dispatch system 1415, or another computing device located within the building) to configure or calibrate the alarm detection capabilities of the system 1400. For example, the alarm controller 1430 can generate user interface data that, when executed by a computing device (e.g., using a user device 1402, a physical computing device comprised within the dispatch system 1415, or another computing device located within the building) operated by a user, causes the computing device to generate the user interface 1500.

As illustrated in FIG. 15A, the user interface 1500 includes a window 1505. The window 1505 depicts an image 1512 of a portion of a store and a second image 1552 of the same portion of the store. The images 1512 and 1552 may be captured by a camera 1440 associated with a particular area or zone of a building. For example, the images 1512 and 1552 can depict a shelf 1514, a shelf 1516, and an aisle 1515 between the shelves 1514 and 1516 in the zone or area.

A user can use the image 1512 to identify portions of the zone that should be monitored for potential theft events. For example, the user interface 1500 provides a mask tool that allows a user to overlay one or more masks 1520, 1522, and 1524 onto the image 1512 to mark areas in the zone that are to be monitored. The masks 1520, 1522, and 1524 can be any shape and can be formed via a mask add tool that places a pre-formed mask onto the image 1512, an erase tool that allows a user to remove portions of the pre-formed mask, and a pencil tool that allows a user to add portions to the pre-formed mask. As an illustrative example, a user may place masks over locations at which high-value items are shelved.

The masks 1520, 1522, and 1524 may be virtual tripwire or fence masks, where a theft event is detected if a person in the depicted zone breaches (e.g., with an arm, foot, head, etc.) any portion of the shelf 1514, shelf 1516, and/or aisle 1515 covered by one of the masks 1520, 1522, or 1524 a threshold number of times within a certain time period. The user interface 1500 further includes fields to set the threshold number of times (e.g., referred to as the "breach count") and the time period (e.g., referred to as the "breach time period"). A breach can be detected when an object (e.g., a hand, arm, leg, or head) crosses a threshold, even if the object later retracts back across the threshold. This can be different from a counting function that would count a number of objects that pass completely through the threshold.

A theft event may also be detected if a person in the depicted zone performs a sweep action within any portion of the shelf 1514, shelf 1516, and/or aisle 1515 covered by one of the masks 1520, 1522, or 1524 once or a threshold number of times within a certain time period. For example, a sweep action may occur if a person reaches into a shelf at a first location, grabs one or more items between the first location and a second location, and pulls those item(s) from the shelf at the second location. The alarm controller 1430 may not receive video frames that indicate whether a person has grabbed any items in a shelf, but the alarm controller 1430 may identify a sweep action if activity is detected at the first location, at the second location, and/or at locations between the first and second locations. The user interface 1500 includes fields to set the sweep distance (e.g., a distance between a point at which a person reaches into a shelf and a point at which a person ceases reaching into the shelf that would constitute a "sweep" action or a distance between a point at which a person reaches into a shelf and a point at which a person is still reaching into the shelf after moving laterally along the shelf, which can indicate a "sweep" action is still occurring), the sweep direction (e.g., represented by line 1580, which can be drawn by a user over image 1512, and/or a user-provided numerical angle value that indicates a direction that a sweep would have to occur, where the alarm controller 1430 may detect a sweep if the detected activity indicates a sweep within a threshold angle of the sweep direction (e.g., represented by line 1580), where the threshold angle can also be user-defined or modified), the sweep count (e.g., a number of sweep actions or events that would have to occur within a certain time period to trigger a potential theft event), and the sweep time period (e.g., the time period in which the number of sweep actions would have to occur to trigger the potential theft event). As an example, the alarm controller 1430 may detect a sweep event if the sweep direction indicated by the user is at a 10° angle, the threshold angle is 5°, and the detected sweep direction is 12.5°. As an illustrative example, the alarm controller 1430 determines the sweep direction by identifying a first location at which a person reaches into a shelf (e.g., based at least in part on comparing a pair of image frames and identifying a difference in groups of pixels at the first location), a second location at which the person ceases reaching into the shelf or is still reaching into the shelf (e.g., based at least in part on comparing another pair of image frames and identifying a difference in groups of pixels at the second location) and the second location is within the threshold distance from the first location, and determining an angle or a slope of a line from the first location to the second location, where the angle can be calculated using a line with a slope of 0 (e.g., a horizontal line) as a point of reference. In further embodiments, the user interface 1500 allows a user to specify a curvature in the sweep direction (e.g., the line 1580 could be an arc) such that the alarm controller 1430 can detect sweep events even if a shelve curves or otherwise does not have a straight edge facing an aisle.

In some embodiments, the alarm controller 1430 detects a theft event if at least one of a breach event or a sweep event is detected. Alternatively, the alarm controller 1430 detects a theft event if both a breach event and a sweep event are detected.

A user can use the image 1552 to set parameters that define at what granularity the alarm controller 1430 detects activity (e.g., a breach or sweep) that may constitute a theft event. For example, a grid 1530 overlays the image 1552. The alarm controller 1430 detects activity if a threshold number or percentage of pixels in one or more boxes of the grid 1530 that are co-located with at least one of the masks 1520, 1522, or 1524 each change by at least a threshold value (e.g., by a threshold number of color values, by a threshold number of brightness values, by a threshold number of saturation values, and/or by a threshold number of hue values, by a threshold percentage, etc.). In other words, the alarm controller 1430 detects activity only in boxes of the grid 1530 that overlay a portion of the image 1552 that depicts the same area as a portion of the image 1512 overlaid by at least one of the masks 1520, 1522, and/or 1524. The alarm controller 1430, therefore, may ignore any activity that would otherwise be detected in boxes of the grid 1530 that overlay a portion of the image 1552 that depicts a different area than the portion of the image 1512 overlaid by at least one of the masks 1520, 1522, and/or 1524.

In some embodiments, the alarm controller 1430 can detect activity if a person in the depicted zone breaches (e.g., with an arm, foot, head, etc.) any portion of the shelf 1514, shelf 1516, and/or aisle 1515 covered by any one of the masks 1520, 1522, or 1524 a threshold number of times within a certain time period or if a person in the depicted zone performs a sweep action within any portion of the shelf 1514, shelf 1516, and/or aisle 1515 covered by any one of the masks 1520, 1522, or 1524 once or a threshold number of times within a certain time period. In other embodiments, the alarm controller 1430 detects activity if the activity occurs within the shelf 1514, shelf 1516, and/or aisle 1515 covered by one mask 1520, 1522, or 1524. For example, the alarm controller 1430 can detect activity if a person in the depicted zone breaches (e.g., with an arm, foot, head, etc.) any portion of the shelf 1514, shelf 1516, and/or aisle 1515 covered by one mask 1520, 1522, or 1524 a threshold number of times within a certain time period or if a person in the depicted zone performs a sweep action within any portion of the shelf 1514, shelf 1516, and/or aisle 1515 covered one mask 1520, 1522, or 1524 once or a threshold number of times within a certain time period. Thus, the alarm controller 1430 may not detect a breach event if, for example, the breach count is 4 and 2 breaches occur in a portion of the shelf 1514, shelf 1516, and/or aisle 1515 covered by mask 1520 and 2 breaches occur in a portion of the shelf 1514, shelf 1516, and/or aisle 1515 covered by mask 1522. In this embodiment, a user may create different masks for different shelves, different sides of a shelf, different aisles, etc. such that shelves, aisles, etc. can be individually monitored.

In other embodiments, the alarm controller 1430 detects activity if the activity occurs within the shelf 1514, shelf 1516, and/or aisle 1515 covered by any one of the masks 1520, 1522, or 1524 as long as the activity is performed by the same person. For example, the alarm controller 1430 can use video analysis to identify and/or track one or more persons. The alarm controller 1430 can identify a person moving in the aisle such as by changes in groups of pixels between image frames of the video footage (e.g., which can be compared to a user-specified person size). A person can be identified and can be tracked based on changes in successive groups of pixels in the image frames. In some cases, facial recognition can be used (e.g., by creating face information from previous frames and/or retrieving face information from the facial recognition data store 1432) to identify individual persons. The alarm controller 1430 can then track the activity of individual persons to identify breach or sweep events performed by the person, regardless of whether the breach or sweep events occur in the same shelf, aisle, etc. or different shelves, aisles, etc. Thus, the alarm controller 1430 can track individual persons and identify a potential theft event regardless of the location of the different breach or sweep events. In this embodiment, the alarm controller 1430 may then detect a breach potential theft event if the breach count is 3, the breach time period is 30 seconds, a first breach by a first person is detected in a first location of a store (e.g., a first shelf in a first aisle), a second breach by the first person is detected in a second location of the store (e.g., a second shelf in the first aisle), a third breach by the first person is detected in a third location of the store (e.g., a third shelf in the first aisle), and the first, second, and third breaches occur within 30 seconds of each other. In some cases, the breaches are grouped together if associated with the same detected person. Thus, if two separate people are reaching into opposing shelves in the same aisle, those breaches would not be grouped. But if a single person reaches into a shelf on one side and then quickly reaches into an opposing shelf on the other side of the aisle, then those breaches would be grouped.

The size (e.g., height and/or width) of the boxes in the grid 1530 (e.g., in pixels) may then determine how sensitive the processing performed by the alarm controller 1430 is in determining whether activity occurred. For example, the smaller the grid 1530 box, the fewer pixels that may need to change in order for the alarm controller 1430 to detect activity. Likewise, the larger the grid 1530 box, the more pixels that may need to change in order for the alarm controller 1430 to detect activity. The user interface 1500 includes a slider 1545 that allows a user to adjust the grid size (e.g., where the height and/or width of a grid 1530 box becomes smaller if the slider 1545 is moved to the left and becomes larger if the slider 1545 is moved to the right) (e.g., referred to as "grid spacing"). Movement of the slider 1545 causes a corresponding change to the grid 1530 overlaying the image 1552. As an illustrative example, the slider 1545 is moved from the initial position depicted in FIG. 15A to the right, as illustrated in FIG. 15B. In response, the height and width of the boxes in the grid 1530 overlaying the image 1552 have become larger.

The user interface 1500 further includes a slider 1555 that allows a user to adjust by how much each pixel should change in order for the alarm controller 1430 to detect activity (e.g., referred to as "minimum foreground fill" or "pixel change amount"). For example, moving the slider 1555 to the left may reduce the amount or percent by which a pixel needs to change and moving the slider 1555 to the right may increase the amount or percent by which a pixel needs to change. The user interface 1500 can also include a slider 1565 that allows a user to adjust the number or percentage of pixels in a grid 1530 box that should change in order for the alarm controller 1430 to detect activity (e.g., referred to as "foreground sensitivity" or "threshold amount of pixels"). For example, moving the slider 1565 to the left may reduce the number or percent of pixels that need to change and moving the slider 1565 to the right may increase the number or percent of pixels that need to change.

The interface 1500 can enable the user to specify or adjust one or more values for threshold amounts of changed pixel groups or blocks that trigger and event, such as a breach or sweep. The grid spacing 1545 can control the size of the grid boxes, or groups of pixels, or blocks, as discussed herein. A block or group of pixels can be triggered (e.g., by a sufficient amount or percentage of the pixels in that block changing by a sufficient degree), as discussed herein. In some cases, an event such as a breach or sweep, can be determined when a single block or group of pixels is triggered. In some cases, an event such as a breach or sweep can be determined when multiple blocks or groups of pixels are triggered. For example, a minimum threshold number of blocks 1567 can be specified by the user via a slider or other user input element on the interface. The minimum threshold number of blocks or pixel groups can be stored in memory of the system, for example along with the other parameters discussed herein. If a number of blocks below the threshold are triggered, the system would not determine a breach, or other event. However, if a number of blocks that satisfies the threshold (e.g., at or above the threshold) are triggered, then the system can determine the breach, or other event. By way of example, this can enable the user to specify a smaller grid size and smaller groups of pixels, which can result in improved sensitivity, while still impeding false positives that could result from smaller pixel groups.

In some embodiments, only adjacent pixel groups are aggregated to determine if the threshold number of pixel groups or blocks is satisfied. For example, if one or more blocks are triggered in a first area of the image while one or more blocks are triggered in a second, separate area of the image, those sets of triggered blocks can be compared against the threshold separately. For example, if the minimum block threshold were 4, and a first small object moved in the first area to trigger 2 blocks while a second small object moved in the second area to trigger 3 blocks, the system would not count a breach so long as none 3 triggered blocks are adjacent to the 2 triggered blocks. However, if a person reaching into a shelf (or other object motion) were to trigger 5 blocks in one area (e.g., with each of the 5 blocks being adjacent to at least one of the other triggered blocks), then the system would count a breach, for example. In some embodiments, the system can have a proximity threshold, where triggered blocks can be grouped together if they are within that threshold proximity (e.g., regardless of whether they are adjacent). This proximity threshold can be the same as, related to (e.g., a percentage of), or different than the threshold distance between breaches (e.g., for determining whether to group multiple breaches together). Accordingly, the proximity threshold and the breach distance threshold can be adjusted together or independently. In some cases, simultaneous triggered blocks can be grouped together regardless of their proximity or adjacency.

In some embodiments, the system can have a maximum threshold number of pixel groups or blocks 1569. For example, a maximum threshold number of blocks 1569 can be specified by the user via a slider or other user input element on the interface. The maximum threshold number of blocks or pixel groups can be stored in memory of the system. If a number of blocks above the maximum threshold are triggered, the system would not determine a breach, or other event. However, if a number of blocks that satisfies the maximum threshold (e.g., at or below the threshold) are triggered, then the system can determine the breach, or other event. The maximum threshold of triggered blocks 1569 can impede false positives. For example, if one or more lights are turned on or turned off, the resulting change in lighting can trigger a relatively large number of pixel groups, in some cases covering the entire monitored area. The system can avoid falsely determining a breach, or other event, because the number of triggered pixel groups is over the maximum threshold. Other examples that could trigger a relatively large number of pixel groups include an earthquake, a bird or other object passing close to the camera, etc. In some cases, a separate warning or alert can be issued when a number of pixel groups over the maximum threshold are triggered. By way of example, the minimum block threshold 1567 or the maximum block threshold 1569 can be 2 blocks, 3 blocks, 4 blocks, 5 blocks, 7 blocks, 10 blocks, 12 blocks, 15 blocks, 20 blocks, 25 blocks, 30 blocks, 40 blocks, 50 blocks, or more, or any values or ranges therebetween, although other values could be also be used.

Figure 15C:
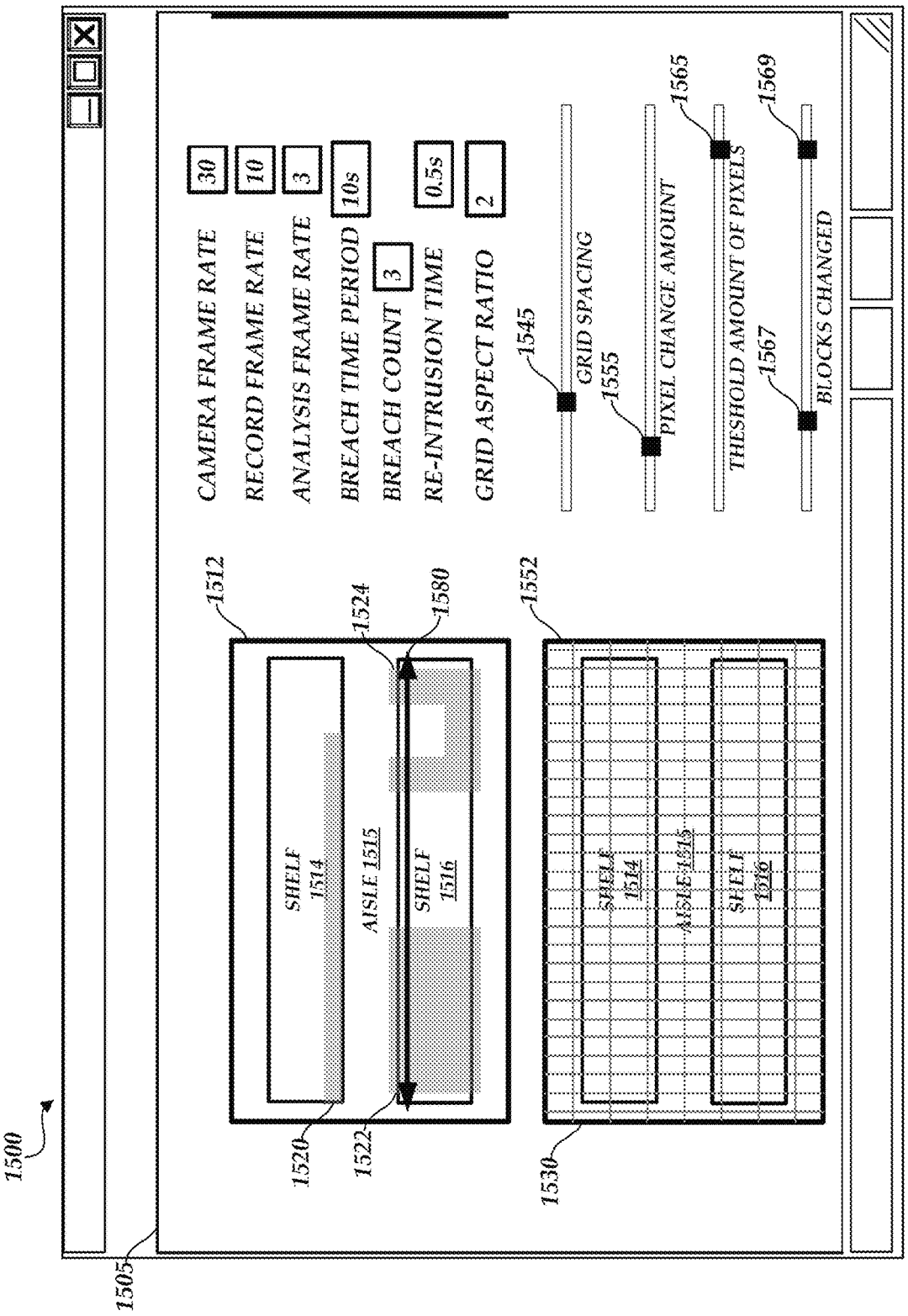

The user interface 1500 can further include other adjustable parameters, not shown. For example, the user interface 1500 can allow a user to adjust the frame rate at which the alarm controller 1430 processes video frames, the resolution at which video is recorded by the camera 1440, and/or the resolution used by the alarm controller 1430 to analyze video frames. With reference to FIG. 15C, the camera can be configured to produce or capture or provide video footage at a first frame rate (e.g., sometimes referred to as the "camera frame rate" or "capture frame rate" or "streaming frame rate"), such as at about 24 frames-per-second (FPS), about 30 FPS, about 60 FPS, about 120 FPS, about 240 FPS, about 480 FPS, about 960 FPS, or more, or any values or ranges therebetween, although any suitable frame rate can be used, which may be lower or higher than the specific ranges and values listed herein. In some systems the controller can receive video footage from the camera at the first frame rate (e.g., as a "streaming frame rate"), which can be the same as, or different from, the native frame rate captured by the camera. The system can be configured to record video footage at a second frame rate (e.g., sometimes referred to as the "record frame rate"), which can be different (e.g., lower) from the first frame rate (e.g., the native camera frame rate). For example, the system can record video footage at about 30 FPS, about 25 FPS, about 20 FPS, about 15 FPS, about 10 FPS, about 7 FPS, about 5 FPS, or any values or ranges therebetween, although any other suitable record frame rate could be used. The system can be configured to perform the video analysis on the video footage at a third frame (e.g., sometimes referred to as the "analysis frame rate"), which can be the same as or different (e.g., lower) than one or both of the camera frame rate and the record frame rate. For example, the analysis frame rate can be about 30 FPS, about 20 FPS, about 15 FPS, about 10 FPS, about 7 FPS, about 5 FPS, about 4 FPS, about 3 FPS, about 2 FPS, about 1 FPS, or any values or ranges therebetween, although any suitable analysis frame rate be used, even outside these ranges in some cases. In some implementations, higher frame rates can be used for video analysis, such as about 30 FPS, about 60 FPS, about 120 FPS, about 240 FPS, about 480 FPS, about 960 FPS, or more, or any values or ranges therebetween, although any suitable frame rate can be used. In some cases, a higher frame rate for video analytics can be used to identify events or objects with increased precision. For example, a sufficiently high frame rate of video analysis can observe and recognize the gradually dimming frame by frame after one or more lights are turned off. In response to recognition of that event, the system can take appropriate action, such as to ignore potential breaches (which could be false positives triggered by the change in lighting), suspend video analysis, change pixel sensitivity parameters to compensate for the change in lighting, trigger an alert if the lighting changed unexpectedly, etc. Various other types of events or objects can be recognized using video analysis at relatively high frame rates. By way of example, a higher analysis frame rate can be used together with a smaller grid size and a larger number for the minimum triggered blocks threshold, such as to provide sensitivity while also impeding false positives. The parameters and tools discussed herein can be used by a security practitioner when setting up the system to optimize the video analytics for the particular application or location.

In some embodiments, triggered blocks or pixel groups can be aggregated across multiple frames to count towards the changed blocks threshold(s). This feature can be used, for example, together with the relatively high analysis frame rates. For example, for a minimum changed blocks threshold of 12, at a first frame 2 blocks can be triggered, at a second frame 4 blocks can be triggered, at a third frame 4 blocks can be triggered, and at a fourth frame 3 blocks can be triggered. After the fourth frame, the threshold of 12 changed blocks can be satisfied and an event (e.g., a breach) can be determined. In some cases, a number of frames can be specified or adjusted (e.g., using the interface). The total number of triggered blocks can be a running total that includes the previous number of frames according to the specified number of frames to consider. For example, if the number of frames were 3, the above example would not trigger a breach. After 3 frames, only 10 blocks would be triggered. After 4 frames, 11 blocks would be triggered because the 2 blocks from the first frame would no longer be considered in the total. But if a fifth frame had 6 triggered blocks, the 4 triggered blocks from frame 2 would not be counted, but the total would be still be 13 blocks, which would satisfy the threshold and the breach would be determined. The user can adjust the threshold number of changed blocks, and the number of frames to consider, and the analysis frame rate for particular applications and locations.

In some embodiments, the system can use different video analysis parameters at different times, for example at day vs. at night, or during peak shopping hours vs. during typically slow shopping times. In some cases, a clock or timer can be used for the system to determine which parameters to use. For example, the interface can enable the user to define multiple (e.g., 2, 3, 4, or more) sets of parameters and to assign time ranges for the different sets of parameters. In some embodiments, the system can enable the user to manually transition between the different sets of parameters, such as by providing user input through the interface or other user input device. Different pixel change sensitivity thresholds can be used during the day and night. Different number of breaches can trigger a determination of an event depending on the time (e.g., whether it is day or night). Various other parameters discussed herein can be changed so that an event or alarm can be triggered under different circumstances at different times (e.g., day vs. night). The system can be configured to be more sensitive during night, for example. In some cases, the system can change one or more of the parameters based on analysis of the video footage. For example, if the aggregate video is relatively dark (e.g., below a brightness threshold) a first set of parameters can be used (e.g., a night set of analytics parameters), and if the aggregate video is relatively bright (e.g., above a brightness threshold) a second set of parameters can be used (e.g., a day set of analytics parameters). In some cases, one or more parameters can be adjusted on a sliding scale according to one or more video features, such as aggregate brightness. Thus, as the monitored area darkens one or more video analytic parameters can transition gradually between values.

Although first, second, and third frame rates are discussed in some examples, other examples could have fewer distinct frame rates. For example, the system could record at the same frame rate as the native camera capture, or the system could omit video recording entirely, or the video analysis could be performed at the same frame rate as the recording or as the native camera capture.

With reference to FIG. 15C, the interface can show the camera frame rate (e.g., 30 FPS). In some cases, the camera frame rate can be set by the camera and is not user adjustable. In some cases, the user interface can be used to adjust the camera frame rate. The interface can show the record frame rate (e.g., 10 FPS). In some embodiments, the user interface can enable the user to provide input to change or specify the record frame rate. The user interface can show the analysis frame rate (e.g., 3 FPS). In some embodiments, the user interface can enable the user to provide input to change or specify the analysis frame rate. At least one slider, text box, button, or any other suitable user input elements can be used.

The record and/or analysis frame rate can be about 2%, about 5%, about 10%, about 20%, about 30%, about 40%, about 50%, about 60%, about 70%, about 80%, or more of the camera frame rate, or any values or ranges therebetween, although other percentages could also be used. The analysis frame rate can be about 2%, about 5%, about 10%, about 20%, about 30%, about 40%, about 50%, about 60%, about 70%, about 80%, or more of the recording frame rate, or any values or ranges therebetween, although other percentages could also be used.

In some embodiments, the record frame rate and/or the analysis frame rate can be based on the camera or streaming frame rate. The record frame rate and/or the analysis frame rate can be a fraction or derivative of the camera or streaming frame rate. Dividing the camera or streaming frame rate (e.g., by a whole number) can provide the record frame rate and/or the analysis frame rate (e.g., which can be a whole number). For example, if the camera frame rate is 30 FPS, dividing by 3 can provide a recording frame rate of 10 FPS, and dividing by 10 can provide an analysis frame rate of 3 FPS. The recording frame rate of 10 FPS could use every third frame and discard or otherwise not use the two intervening frames. The analysis frame rate of 3 FPS could use every tenth frame, and discard or otherwise not use the nine intervening frames. In some cases, the user interface can restrict selection of the analysis and/or recording frame rate(s) to values that can be obtained by dividing the camera or streaming frame rate by whole numbers, which can result in a consistent number of frames being omitted between recorded and/or analyzed frames. This can provide consistency and accuracy between the recorded and/or analyzed frames. In some cases, the system can permit other frame rates to be selected, which can result in different numbers of frames being discarded, or otherwise not used, between the recorded and/or analyzed frames. By way of example, if the camera frame rate is 30 FPS, and an analysis frame rate of 4 FPS were selected, the system could use a first frame for analysis, then omit 7 frames, then use the 9th frame for analysis, then omit 6 frames, then use the 16th frame for analysis, then omit 7 frames, then use the 24th frame for analysis, then omit 6 frames, then use the 31st frame for analysis, and so on. This approach can provide more flexibility to the user to select record or analysis frame rate. The analysis frame rate can be independent of the native (e.g., streaming) frame rate from each camera as well as independent of the recording frame rate. The analysis frame rate can be equal to or less than the native/streaming frame rate of the camera. The analysis frame rate could be different for different motion areas within the same camera image or stream.

In some embodiments, the analysis frame rate can be based on the recorded frame rate, instead of the camera or streaming frame rate. For example, the recorded frame rate can be divided by a number to provide the analysis frame rate. In some cases, a first recorded frame can be used for analysis, and one or more intermediate recorded frames can be omitted from analysis, and then a subsequent recorded frame can be used as the next frame for analysis, and so on. The number of omitted intermediate recorded frames can be consistent or varied between the analyzed frames, similar to the discussion herein. This can be useful if the video footage is first recorded, and then the recorded video footage is accessed for analysis. In some embodiments, the video footage is analyzed without being recorded before-hand. For example, in some cases, video footage is not recorded unless a triggering event prompts the recording to begin.

The system can have a re-intrusion time value, which can define the amount of time after a first breach or intrusion is detected before a second associated breach or intrusion can be detected. The system can ignore intrusions during the re-intrusion time after a first intrusion is detected (e.g., except that intrusions removed from the intrusion motion area of the first intrusion can still be recognized during the re-intrusion time because those could be associated with a different person). The re-intrusion time can impede the system from identifying several intrusions as a result of a person reaching only once into the shelf. The re-intrusion time could also impede the system from identifying an actual second intrusion, such as if the person reaches quickly into the shelf a second time (e.g., if the re-intrusion time were set too high). Also, if the person where to reach into the shelf very slowly, that could trigger multiple intrusions (e.g., if the re-intrusion time were set too low). Thus, it can be beneficial to specifically tailor the re-intrusion time for the particular application (e.g., based on the area, shelving layout, or merchandise being monitored, etc.). By way of example, a person can insert their arm into the shelf, which can cause the pixels in the frames of the video footage to change sufficiently to trigger a first intrusion detection. The person may move their arm while it is reaching into the shelf (e.g., to reach further into the shelf, to withdraw and item, etc.), and the system could register changes in the pixels because of this movement that could be sufficient to trigger a second intrusion detection. However, that second intrusion detection would be a false positive in this example, because the person reached into the shelf only once. The re-intrusion time can specify a dead time after an intrusion is detected. During that dead time the system does not count any intrusions that would otherwise be detected and/or associated with the first intrusion. In some cases, the system could detect one or more other intrusions within the dead time (e.g., before the re-intrusion time has lapsed after a first intrusion is detected) if the other intrusion(s) are spaced sufficiently far away from the first intrusion. Thus, the system can track separately the intrusions from different people in the same aisle or at the same shelf or area. Each unassociated intrusion can trigger a separate dead time period. The threshold distance between breaches can be specified by the user (e.g., using the user interface similar to FIG. 15C or others). In some cases, an aggregate intrusion count can be used that includes the identified intrusions from different locations (e.g., separated by the threshold distance value or more). Thus, the system could track and combine intrusions from multiple people in the aisle, shelf, or area. This can facilitate identification of theft events perpetrated by more than one person, such as if a group of three people were to work together to quickly fill a cart with merchandise from three different locations on a shelf (e.g., for shoplifting).

By way of example, when a second breach is detected after a first breach, if the distance between the first and second breach is over a distance threshold, the second breach can be unassociated with the first breach. Thus, they would both be counted as a first breach of different potential events (e.g., regardless of whether the second breach was before or after the re-intrusion time). They would not be counted together towards the threshold breach count, but they could each be the first breach of a series of breaches, which could eventually trigger the threshold breach count. If the distance between the first and second breaches is less than the threshold distance, and if the time between the first and second breaches was more than the re-intrusion time, then the second breach can be associated with the first breach (e.g., added together for counting towards the breach count threshold). If the distance between the first and second breaches is less than the threshold distance, and if the time between the first and second breaches was less than the re-intrusion time, then the second breach can be disregarded. The second breach would not count as a first breach of a separate potential series, but would not be counted at all. Other approaches could be used. For example, video analysis of the entire frames can be suspended until after the re-intrusion time has passed after an intrusion detection.

If the person were to keep their arm reached into the shelf for an extended period of time (e.g., longer than the re-intrusion time), the system could register a second intrusion even though the person has reached into the shelf only once (but for a relatively long time). The system may or may not identify the second intrusion when the person has reached their arm into the shelf for an extended period, depending on the other settings (e.g., pixel change sensitivity, grid size, etc.). In some cases, that second identified intrusion can be indicative of atypical shopping behavior, such as indicating a sweep action sometimes used by criminals to quickly sweep multiple items off of a shelf. In some cases, a sweep can be identified as a result of breaching an entire pre-set breach area, which may be larger or smaller based on the target protected zone, area, or products. If the detected intrusion moves along a defined protected area by more than a threshold distance, the system can identify a sweep action and/or potential theft event. In some cases, it can be desirable to avoid that second intrusion detection if the person has only reached once into the shelf. The system can be configured to only permit detection of a second breach if the object (e.g., an arm) that performed the first breach has been withdrawn. In some cases, withdrawal of the object can be determined at least in part by a comparison to pixels from a video frame taken before the breach. In some cases, withdrawal of the object can be determined based at least in part on a change of pixels being below a threshold. For example, while the user's arm is reached into the shelf the associate pixels would change as the arm moved into and out of the shelf. Then once the arm is withdrawn, pixels would show static objects on the shelf. The pixels of the static objects may or may not change, for example depending on the pixel change threshold. The pixel change threshold and/or the amount of changed pixels threshold can be set so that the static objects shown after the arm is withdrawn can be registered as non-activity. In some cases, different thresholds can be used for detecting a breach by changes in pixels and for detecting withdrawal of the object by relatively static pixels. Thus, if the pixels are relatively static for an amount of time or a number of frames (e.g., two or more frames after a breach, such as depending on the analysis frame rate, the recorded frame rate, or the camera or streaming frame rate), the system can use that information to determine that the object has been withdrawn. Both of these approaches could be used together to determine when an intruding object has been withdrawn.

The re-intrusion time can be specified and/or adjusted by a user, such as by using the user interface of FIG. 15C. The re-intrusion time can be about 0.1 seconds, about 0.2 seconds, about 0.3 seconds, about 0.4 seconds, about 0.5 seconds, about 0.6 seconds, about 0.7 seconds, about 0.8 seconds, about 0.9 seconds, about 1 second, about 1.25 seconds, about 1.5 seconds, about 1.75 seconds, about 2 seconds, or any value or ranges therebetween, although other values could be used in some cases. In some embodiments, the re-intrusion time can be a set amount of time. For example, a running clock can keep track of how much time has passed since a first intrusion before a second intrusion can be identified. In some cases, the re-intrusion time can be a number of frames that must pass before another intrusion can be identified. The number of frames can correspond to an amount of time, which can depend on the frame rate. For example, if the re-intrusion time were based on a number of analyzed frames and had a value of 2 frames, and the analysis frame rate were 4 FPS, then the re-intrusion time would be 0.5 seconds. If the re-intrusion time were based on the recorded frame rate, and the recorded frame rate were 24 FPS, then a value of 12 frames would correspond to the same 0.5 seconds for the intrusion time. If the re-intrusion time were based on the native or streaming frame rate of 30 FPS, then a value of 15 frames would correspond to the same 0.5 seconds for the intrusion time. The intrusion time can be a number of analysis frames, a number of recorded frames, or a number of camera or streaming frames, and in some cases the user interface can allow the user to select which type of frame rate the re-intrusion time is based on. The user can specify the re-intrusion time as a time value or as a number of frames. The various user-adjustable parameters shown in FIG. 15C, and disclosed in other portions of this disclosure, can have bounded ranges, where the user is permitted to adjust the parameter within the corresponding bounded range, but is not permitted to adjust the parameter outside the corresponding bounded range.

Figure 15D:
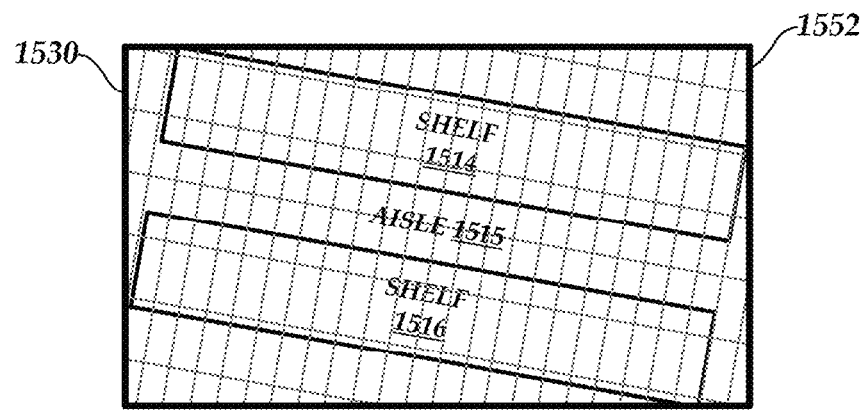
Figure 15E:
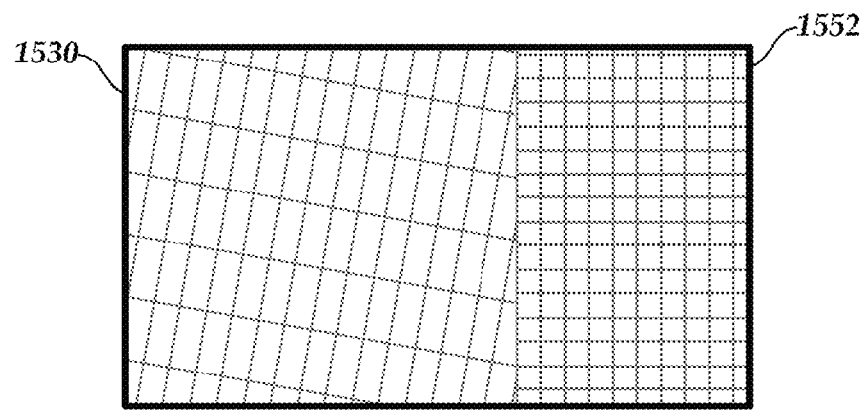

The user interface can be used to change various parameters of the pixel groups that are analyzed to make the intrusion determinations. The grid size or spacing can be specified and/or adjusted, as discussed herein. The grid (or pixel groups) shape can be specified and/or adjusted. For example, the user can specify an aspect ratio for the rectangular groups of pixels. If FIG. 15C the aspect ratio of 2 can specify that the pixel groups have a height that is 2 times the width. Although some examples are shown using rectangular grids and pixels groups, other shapes could be used, such as hexagons, triangle, etc., and the shape can be user specified. With reference to FIG. 15D, in some embodiments, the user can specify and/or adjust an orientation of the groups of pixels (or grid). For example, in FIG. 15D, the grid is angled relative to the image frame edges so that the grid better aligns with the shelves. With reference to FIG. 15E, in some embodiments, different portions of the image frame can have different parameters for the pixel groups (e.g., grid). For example, the size, shape, and/or orientation of the pixel groups can be different for two or more different areas in the image frame. In the example shown in FIG. 15E, the left portion of the image has a grid that is angled relative to the image frame edges, has a rectangular pixel group shape, and has a relatively large size. The right portion of the image has a grid that is aligned with the edges of the image frame, has a square shape, and has a relatively small size. The different types of pixel groups can be specified and/or adjusted by the user to accommodate the layout of the shelves or other structure in the area being monitored. In some embodiments, the camera can have a wide field of view (e.g., a fisheye lens), an example of which can be seen in FIG. 4. The grid can have a fisheye shape as well, for example, with pixel groups in the center larger than pixel groups closer to the edges of the image. The grid can have curved lines that define the boundaries between the pixel groups (e.g., creating the fisheye shape). The user interface can enable the user to adjust the amount of fisheye effect to apply to the grid, for example so that the user can match the fisheye grid to the camera image. Thus, straight lines or boundaries in the image can be shown as a curved line in the fisheye image, and corresponding curved grid lines can be oriented to align with those boundaries, which can facilitate accurately mashing of the monitored area in the image.

The user can adjust the sensitivity and/or effectiveness of the system by adjusting the various parameters discussed herein. Some of the parameters can interplay with each other to enable the user to make fine tuning and configuration adjustments. For example, setting a smaller grid size can make the system more sensitive to intrusions by smaller objects. Setting the amount (e.g., percentage) of pixels within a group that need to change for a determination of activity can also affect the sensitivity to smaller objects. However, the amount of pixels parameter can also affect how sensitive the system can be to false positives from shadows, etc. Various other parameters can have inter-related effects on the video analytics as well.

In some cases, if the video analytics were to use a fast frame rate like the full camera frame rate (e.g., analyzing frames at 30 FPS). The difference between pixels of two successive frames could be relatively small even if an intrusion is occurring. Thus, in order to reliably detect intrusions, the threshold amount of change needed to consider a pixel as changed could be lowered. However, lowering that threshold too far can result in false positives. For example, if a user reaches into a shelf, the system could count several intrusions for that one reach. With the pixel change threshold set low, movement of the arm in the shelf can be seen as an intrusion. Increasing the re-intrusion time could be used to address this concern, in some cases. However, setting the re-intrusion threshold too high can miss instances where a criminal reaches into the shelf several time in quick succession. By reducing the frame rate used for analysis of the video footage, the change between pixels of successive analyzed frames during an intrusion would be more significant. Thus, the threshold amount of change need to count a pixel as changed can be set to a higher value. This can avoid false positive and/or enable the re-intrusion time value to be set low enough to more reliably identify criminal behavior. As illustrated by this example, the analysis frame rate can be an important parameter in setting up a system, such as that uses the intrusions in time video analytics disclosed herein.

A user can set parameters for some or all of the cameras 1440 located in the system 1400, where the user interface 1500 is updated to depict an image captured by the camera 1440, view, or zone or area selected by the user to calibrate. Thus, each zone or area of a building can be calibrated differently based on the types of items located in a particular zone or area, the volume or types of people that frequent a particular zone or area, the visibility (or lack of visibility) provided by the camera 1440 located in a particular zone or area, etc.

Figure 16A:
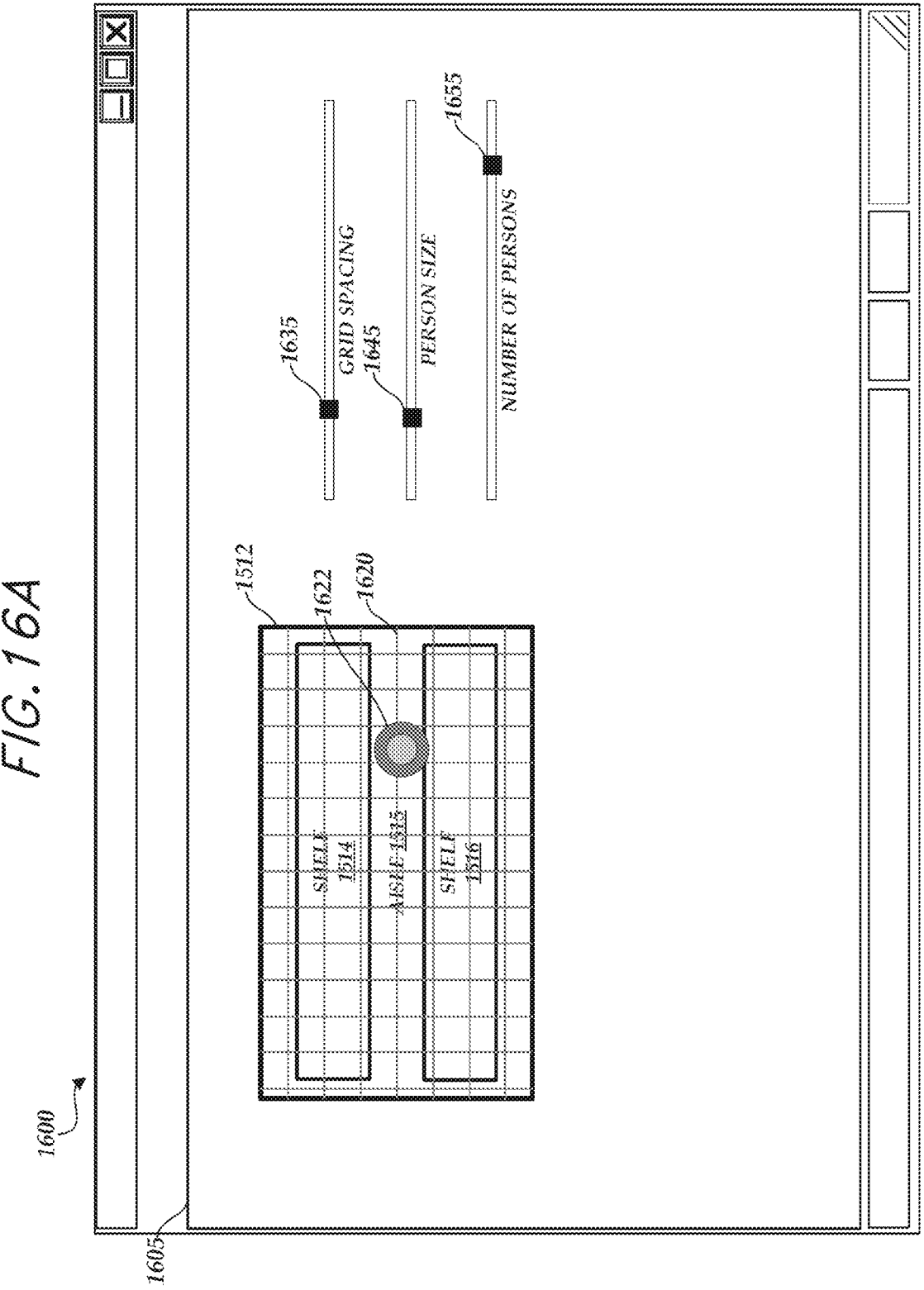
FIGS. 16A-16B illustrate another user interface for configuring the theft event detection functionality of the alarm controller.
Figure 16B:
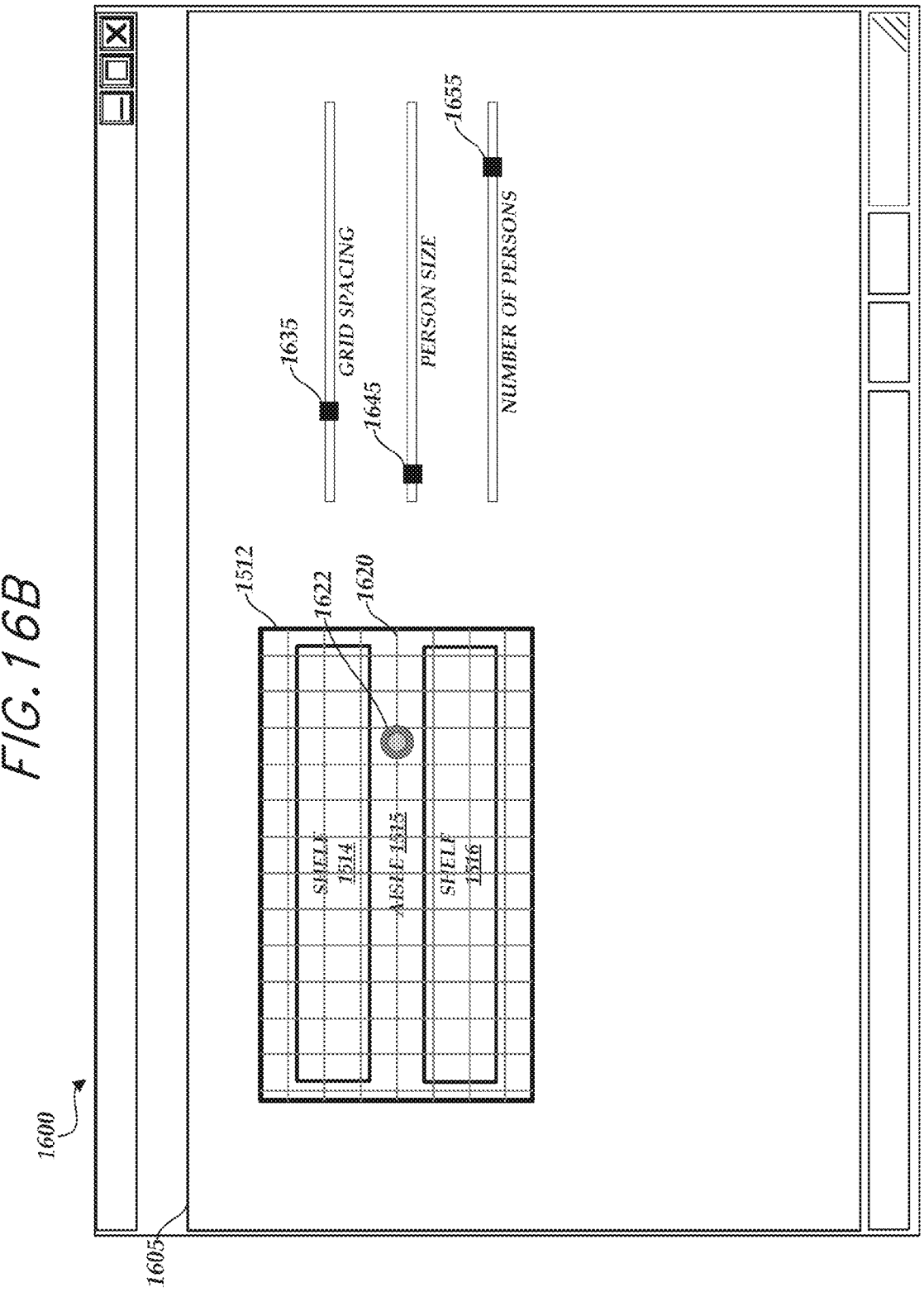

FIGS. 16A-16B illustrate another user interface 1600 for configuring the theft event detection functionality of the alarm controller 1430. The user interface 1600 can be generated in response to information provided by the alarm controller 1430 to allow a user (e.g., using a user device 1402, a physical computing device comprised within the dispatch system 1415, or another computing device located within the building) to configure or calibrate the alarm detection capabilities of the system 1400. For example, the alarm controller 1430 can generate user interface data that, when executed by a computing device (e.g., using a user device 1402, a physical computing device comprised within the dispatch system 1415, or another computing device located within the building) operated by a user, causes the computing device to generate the user interface 1600.

As illustrated in FIG. 16A, the user interface 1600 includes a window 1605. The window 1605 depicts the image 1512. A user can use the image 1512 to provide an average size of a person that can be used by the alarm controller 1430 to identify persons in the depicted zone and/or for crowd detection purposes. For example, the user interface 1600 overlays a grid 1620 and/or a shape 1622 over the image 1512. Like the grid 1530, the grid 1620 includes boxes that define how sensitive the alarm controller 1430 should be in detecting whether a person that is present in the depicted zone or area is moving. For example, the smaller a box, the fewer pixels that need to change for the alarm controller 1430 to detect that a person is moving. Likewise, the larger a box, the more pixels that need to change for the alarm controller 1430 to detect that a person is moving. Movement of a person may be used by the alarm controller 1430 to determine whether a person is loitering, as described in greater detail below. Slider 1635 allows a user to adjust the grid size (e.g., where the height and/or width of a grid 1620 box becomes smaller if the slider 1635 is moved to the left and becomes larger if the slider 1635 is moved to the right) (e.g., referred to as "grid spacing"). The user interface 1600, not shown, may further include sliders that allow a user to adjust by how much each pixel should change in order for the alarm controller 1430 to detect movement and/or that allow a user to adjust the number or percentage of pixels in a grid 1620 box that should change in order for the alarm controller 1430 to detect movement.

The shape 1622 represents an average size of a person. The alarm controller 1430 can use the selected average person size to detect persons in video captured by the camera 1440 as opposed to other objects (e.g., carts, animals, items, buckets, etc.). The user interface 1600 includes slider 1645 for adjusting the average size of a person (e.g., referred to as "person size"). For example, moving the slider 1645 to the left reduces the average size of a person and moving the slider 1645 to the right increases the average size of a person. Movement of the slider 1645 causes a corresponding change to the shape 1622 overlaying the image 1512. As an illustrative example, the slider 1645 is moved from the initial position depicted in FIG. 16A to the left, as illustrated in FIG. 16B. In response, the shape 1622 overlaying the image 1512 becomes smaller. The user interface 1600 may provide the user with the ability to adjust the average size of a person because video captured by the cameras 1440 may vary given that different cameras 1440 may capture video from different angles, elevations, etc.

The user interface 1600 may further include slider 1655, which allows a user to adjust the number of persons that may fit within the zone or area depicted by the image 1512 (e.g., the capacity of the depicted zone or area) (e.g., referred to as "number of persons"). Movement of the slider 1655 to the left may reduce the indicated number of persons that may fit within the zone or area and movement of the slider 1655 to the right may increase the indicated number of persons that may fit within the zone or area. The alarm controller 1430 can use this information for crowd detection purposes, and specifically for differentiating between two persons that may be located close to each other. The alarm controller 1430 can then reduce false positives by, for example, not counting one breach by a first person and another breach by a second person as two breaches by the same person (which could trigger the detection of a theft event if the breach count is 2). The user interface 1600 can further include other adjustable parameters, not shown.

A user can set these person parameters for some or all of the cameras 1440 located in the system 1400, where the user interface 1600 is updated to depict an image captured by the camera 1440, view, or zone or area selected by the user to calibrate. Thus, each zone or area of a building can be calibrated differently based on the angle, height, etc. of the camera 1440 associated therewith, the volume or types of people that frequent a particular zone or area, the visibility (or lack of visibility) provided by the camera 1440 located in a particular zone or area, etc.

Figure 17:
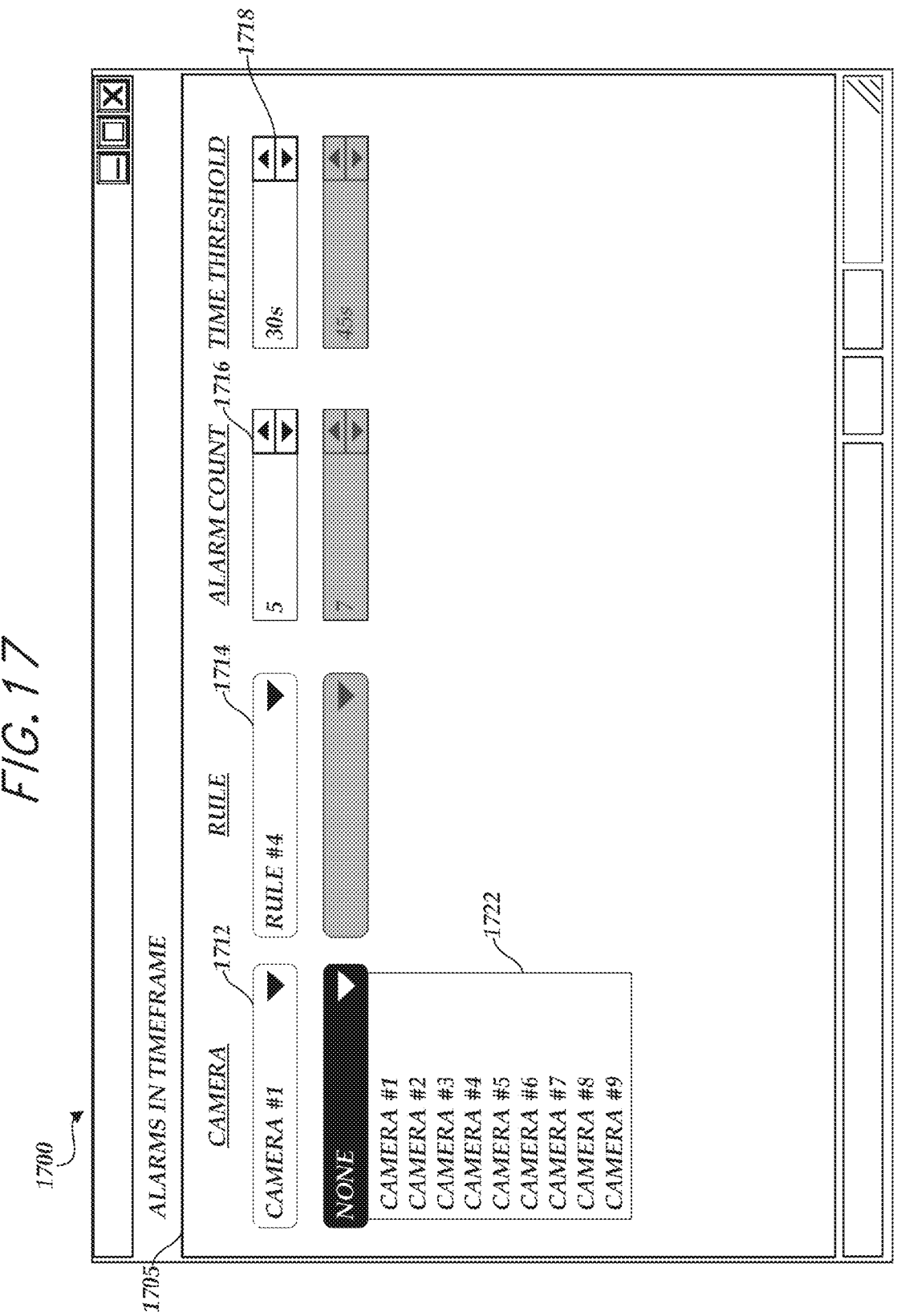
FIG. 17 illustrates another user interface for configuring the theft event detection functionality of the alarm controller.

FIG. 17 illustrates another user interface 1700 for configuring the theft event detection functionality of the alarm controller 1430. The user interface 1700 can be generated in response to information provided by the alarm controller 1430 to allow a user (e.g., using a user device 1402, a physical computing device comprised within the dispatch system 1415, or another computing device located within the building) to configure or calibrate the alarm detection capabilities of the system 1400. For example, the alarm controller 1430 can generate user interface data that, when executed by a computing device (e.g., using a user device 1402, a physical computing device comprised within the dispatch system 1415, or another computing device located within the building) operated by a user, causes the computing device to generate the user interface 1700.

The user interface 1700 can be used by a user to assign one or more rules to one or more cameras 1440, including alarm counts and/or time thresholds associated with such rule(s). For example, a rule can include an instruction to identify sweep actions, breach actions, and/or the like. As illustrated in FIG. 17, the user interface 1700 includes a window 1705, which can be a pop-up window, a window in a new tab, etc. The window 1705 includes one or more camera dropdown menu buttons 1712, one or more rule dropdown menu buttons 1714, one or more alarm count selectors 1716, and one or more time threshold selectors 1718.

A user can select a camera dropdown menu button 1712 to select a camera 1440 present in the system 1400. For example, selecting the camera dropdown menu button 1712 causes the user interface 1700 to display a list 1722 of available cameras 1440 in the system 1400.

Once a camera 1440 is selected, a user can select the rule dropdown menu button 1714 to select a rule to assign to the selected camera 1440. For example, FIG. 17 depicts that the user has assigned "Rule #4" (which could be a breach action rule, a sweep action rule, etc.) to "Camera #1."

Once the camera 1440 is selected, a user can also adjust the alarm count selector 1716 to adjust the alarm count associated with the camera 1440 and/or rule. For example, the alarm count may refer to a number of intrusions that would trigger an alarm. As an illustrative example, FIG. 17 depicts that the user has adjusted the alarm count to be 5 for Camera #1 and Rule #4. Thus, 5 breach actions, 5 sweep actions, etc. would have to occur to trigger an alarm.

Once the camera 1440 is selected, a user can also adjust the time threshold selector 1718 to adjust the time threshold associated with the camera 1440, rule, and/or alarm count. For example, the time threshold may refer to a time period within which the number of intrusions would have to occur to trigger an alarm. The time threshold can also be referred to as a "reset time" or "reset seconds." As an illustrative example, FIG. 17 depicts that the user has adjusted the time threshold to be 30 seconds for Camera #1 and Rule #4. Thus, 5 breach actions, 5 sweep actions, etc. would have to occur within 30 seconds to trigger an alarm.

Assigning a rule, an alarm count, and/or a time threshold to a camera 1440 may cause the alarm controller 1430 to process video captured by the camera 1440 to detect a potential theft event in a manner that is in accordance with the assigned rule, the selected alarm count, and/or the selected time threshold.

In addition to the settings described above with respect the user interfaces 1500, 1600, and 1700, the user interfaces 1500, 1600, and/or 1700 may depict other settings for configuring the alarm controller 1430. For example, another setting can include an angle of movement necessary for a breach or sweep event to be detected (where the angle setting can be applied similar to how an angle setting may be applied for a sweep event, as described above).

Video Analytics/Video Analytic Algorithms

As described herein, the alarm controller 1430 can process data received from one or more of the camera(s) 1440, the motion detector(s) 1455, and/or the seismic sensor(s) 1460 to detect a potential theft event. Once the various zones or areas are configured or calibrated using the user interfaces 1500, 1600, and/or 1700, the alarm controller 1430 can begin analyzing video footage captured by the camera(s) 1440. For example, as video is captured by a camera 1440, the camera 1440 can transmit the video to the alarm controller 1430 via the network switch 1425. Alternatively, the alarm controller 1430 can retrieve the video from the video data store 1468 via the network switch 1425.

The alarm controller 1430 can process one or more frames of the received video to detect a potential theft event. For example, the alarm controller 1430 can use the parameters set by the user via the user interface 1500 to determine which portion of the frames to process (e.g., the alarm controller 1430 processes the portion of the frames that corresponds to the location where a mask is placed). In some embodiments, the alarm controller 1430 can process portions of frames that correspond to locations where a mask is placed and can process portions of frames that correspond to locations where no mask is placed (e.g., no mask may be placed in aisles where person identification and/or tracking, facial recognition, crowd detection, etc. can be performed). The portion of the frames designated (e.g., by one or more masks) to process for detection of breach or sweep actions is sometimes referred to herein as the "monitored portion" or the "monitored area." The alarm controller 1430 can then compare a current video frame to one or more previous video frames to identify whether any pixels within the monitored portion have changed from the previous video frame(s) to the current video frame and, if so, the amount or percentage by which such pixels have changed. The grid 1530 set by the user and/or the other user-selected parameters may define how many pixels need to change and the extent by which the pixels have to change in order for the alarm controller 1430 to determine that activity is detected. In some cases, portions of the video footage outside of the "monitored portion" or "monitored area" can be analyzed, such as to identify and/or track a person in the aisle.

In further embodiments, the alarm controller 1430 processes the monitored portion to identify specific changes that could indicate a breach or a sweep action (e.g., an intrusion). For example, the alarm controller 1430 may detect a breach if the threshold number or percentage of pixels in a grid 1530 box within the monitored portion changed by the threshold amount or percentage between a previous video frame and a current video frame. The alarm controller 1430 may associate the detected breach with a time of the current video frame. The alarm controller 1430 may then process the video frame(s) to identify any person(s) present within the frame(s) (e.g., using the parameters selected in the user interface 1600). Once one or more persons are identified, the alarm controller 1430 can associate the detected breach and the time of the detected breach with an identified person (e.g., an identified person is associated with a detected breach if the location of the pixels representing the identified person are within a threshold distance or number of pixels as the pixels that changed to cause the breach detection). In some embodiments, the system can determine a breach based on information from the monitored area of the video frames (e.g., the shelves in the store) and also based on information outside the monitored area of the video frames (e.g., the aisle between the shelves). For example, when an object (e.g., a person's arm or hand) moves from outside the monitored area to inside the monitored area, a breach can be determined. In some cases, changes in pixels inside the monitored area do not trigger a breach unless there are changes in pixels at a corresponding area outside the monitored area. Thus, in some example implementations, if a product on the shelf falls over, it would not trigger a breach, if no person is in the aisle in front of the shelf. In some cases, changes in pixels inside the monitored area can trigger a breach regardless of what is happening outside the monitored area.

The alarm controller 1430 can then continue to process successive video frames in the same manner, detecting any further breaches. In some cases, the system can associate each breach with a person identified in the video footage, and only breaches associated with the same person are grouped together. Thus, an example threshold number of 4 breaches would not be reached if a first person reaches into a shelf 2 times, and a second person reaches into the shelf 2 times. In some cases, the system can group breaches if they are located within a threshold area or distance of each other. Thus, if one person reaches into the monitored area (e.g., a shelf) at a location that is more than the threshold distance away from another person who also reaches into the monitored area (e.g., the shelf), then those breaches would not be grouped together. Rather, each of those breaches can count as a first breach, and the system can count subsequent breaches made by each person separately. In some cases, the user can define the threshold area for grouping breaches, such as using a user interface like 1500 and/or 1600. For example a user can enter a value for "breach distance" in user interface 1500, which can define the size of the area for which multiple breaches will be grouped. A user interface can enable the user to visually define the size of the area, such as similar to the user adjustable shape 1622 of the user interface 1600. In some cases, the threshold area or distance can depend on the user-specified person size. Thus, if a person were defined to be of relatively smaller size in the video footage, then a smaller area of the video would be used for grouping breaches. If a person were defined to be of relatively larger size in the video footage, then a larger area of the video would be used for grouping breaches.

In some cases, a subsequent breach is only detected if the object (e.g., a person's hand or arm) is retracted out of the monitored area after the prior breach. Thus, in some cases, multiple breaches would not be identified if a person were to reach into a shelf and hold that position. For example, the person would need to retract their arm out of the shelf and then reinsert their arm into the shelf to register a second breach. In some cases, a breach can be determined each time an object enters the monitored area, regardless of what the object does before or after the breach.

If a threshold number of grouped breaches are detected within a threshold amount of time, the alarm controller 1430 can determine a potential theft event. If a threshold number of breaches (e.g., as set by the user in the user interfaces 1500 and/or 1700) are detected (e.g., associated with the same person or within the threshold area), the alarm controller 1430 can compare the times of the detected breaches to determine whether all of the detected breaches occurred within the user-set breach time period. If the detected breaches occurred within the user-set breach time period, then the alarm controller 1430 can determine a potential theft event, and can notify the alarm trigger system 1435 of the potential theft event, and take other actions as described herein. Otherwise, if the detected breaches did not all occur within the user-set breach time period, the alarm controller 1430 can discard any detected breaches that occurred before the current time minus the user-selected breach time period, and can repeat the process. In some cases, each breach can start a new time period that lasts for the defined period of time (e.g., set by the user) to watch for the additional breaches for triggering a potential theft event. Thus, if the setting requires 5 breaches within 30 seconds, a potential theft event would be triggered by a series of 7 breaches as follows (breach 1 at 0 seconds, breach 2 at 10 seconds, breach 3 at 30 seconds, breach 4 at 35 seconds, breach 5 at 40 seconds, breach 6 at 45 seconds, and breach 7 at 50 seconds).

As another example, the alarm controller 1430 may detect a sweep action if the threshold number or percentage of pixels within a series of one or more grid 1530 boxes within the monitored portion changed by the threshold amount or percentage between pairs of video frames, where the groups of pixels that changed span from one portion of the monitored portion to another portion of the monitored portion that is at least the sweep distance (e.g., which can be user defined) away from the one portion. In some cases, the determination of a sweep action can depend on the direction of the series of changes in pixel groups. For example, a sweep action can be determined if a direction (e.g., an angle or slope of a line or arc between the one portion and the other portion) is at least within a threshold angle of the sweep direction (which can be specified by the user). In particular, the alarm controller 1430 may detect the sweep action if (1) the threshold number or percentage of pixels within a first grid box (e.g., 1530*a* of FIG. 15A) at a first location of the monitored portion changed by the threshold amount or percentage between a first video frame and a second video frame; (2) the threshold number or percentage of pixels within one or more additional grid boxes (e.g., 1530*b* to 1530*d* of FIG. 15A) along a path between the first location and a second location of the monitored portion changed by the threshold amount or percentage between corresponding pairs of video frames; and (3) the distance between the first location of the monitored portion and the second location of the monitored portion is at least the user-selected sweep distance. In some embodiments, the system can determine a sweep action if (4) the direction between the first location of the monitored portion and the second location of the monitored portion is at least within a threshold angle of the sweep direction; and/or (5) the time between the video frames having the pixel changes that indicate the sweep from the first location to the second location (e.g., the difference between the timestamps of one video frame and a second video frame having the pixel changes that indicate the sweep from the first location to the second location) is less than or equal to a sweep time period, which can be user specified (e.g., via a user interface). In some embodiments, a sweep action can be determined independent of the direction of the sweep motion, and the sweep direction parameter can be omitted. In some cases a sweep action can be detected only if the object (e.g., a person's hand or arm) enters the monitored area at a first location, and then moves across the monitored area by the threshold amount to a second location without retracting from the monitored area. Thus, a sweep action would not be triggered if a user were to reach into the shelf a first location, then retract their arm, and then reach into the shelf at a second location that is beyond the threshold distance.

The alarm controller 1430 may process the video frame(s) to identify any persons present within the frame(s) (e.g., using the parameters selected in the user interface 1600). Once one or more persons are identified, the alarm controller 1430 can associate the detected action(s) (e.g., sweep action) and the time of the detected action (e.g., sweep action) with an identified person (e.g., an identified person is associated with a detected sweep action if the location of the pixels representing the identified person are within a threshold distance or number of pixels as the pixels that changed to cause the sweep action detection). In some cases a single sweep action can trigger a potential theft event. In some cases the settings can be set so that multiple sweep actions are detected (e.g., within a threshold amount of time, such as the sweep time period, which can be user specified) before a potential theft event is triggered. In some cases a combination of sweep and breach actions can trigger a potential theft event.

The alarm controller 1430 can continue to process successive video frames in the same manner, detecting any further actions (e.g., additional sweep actions). If a threshold number of actions (e.g., breach and/or sweep actions) (e.g., as set by the user in the user interfaces 1500 and/or 1700) associated with the same person is detected, the alarm controller 1430 can compare the times of the detected actions (e.g., breach and/or sweep actions) to determine whether the detected actions (e.g., breach and/or sweep actions) occurred within a user-set time period. If the detected sweep actions occurred within the user-set sweep time period, then the alarm controller 1430 notifies the alarm trigger system 1435 of a potential theft event, as described herein. Otherwise, if the detected actions (e.g., breach or sweep actions) did not all occur within the user-set sweep time period, the alarm controller 1430 can discard any detected actions (e.g., breach and/or sweep actions) that occurred before the current time minus the user-selected time period, and can repeat the process.

In some embodiments, an obstruction (e.g., an object, a shadow, etc.) may be present between the camera lens and the monitored portion of a store. Thus, a sweep action that occurred may not be detected by the alarm controller 1430 in some cases because the user performed the sweep action within the obstructed area and the alarm controller 1430 may determine that the user retracted his or her arm (given the obstruction) or otherwise determine that the user did not complete a full sweep motion (e.g., because no pixels changed in the area covered by the obstruction). Thus, the alarm controller 1430 may include a threshold gap distance value (that may or may not be set by a user), where the alarm controller 1430 may still detect a sweep action even if no pixels changed over a distance falling within the threshold gap distance value.

As described herein, the alarm controller 1430 can relax the user-set parameters under certain conditions. For example, the alarm controller 1430 can process the video frame(s) to identify one or more persons present in the depicted zone or area. If an identified person does not move for a threshold period of time (or a threshold number of video frames), the alarm controller 1430 can determine that the identified person is loitering. In response, the alarm controller 1430 can either immediately notify the alarm trigger system 1435 of a potential theft event or can reduce the requirements for detecting a potential theft event. Requirement reductions can include increasing the breach time period, reducing the breach count, reducing the sweep distance, reducing the sweep count, increasing the sweep time period, reducing the height and/or width of the grid 1530 boxes, reducing the minimum foreground fill, reducing the foreground sensitivity, and/or the like. The reduction in requirements can apply to any person present in the depicted zone or area, not just the detected loiterer. Thus, by identifying a loitering person, the alarm controller 1430 can relax the requirements for detecting a potential theft event given that a loitering individual increases the likelihood that a potential theft event is occurring or is about to occur.

As another example, the alarm controller 1430 can relax the user-set parameters if, for example, the alarm controller 1430 processes the video frame(s) and identifies a specific number of persons present in an aisle. For example, the alarm controller 1430 can relax the user-set parameters if two persons are present in the aisle. However, the alarm controller 1430 may not relax the user-set parameters if three persons, four persons, five persons, etc. are present in the aisle. In many instances, an organized retail crime (ORC) event involves two individuals working together, and it is less common for 3 or 4 or more people to work together to perpetrate an ORC. Also, it is not common for a thief to perform the theft while other shoppers are present. Thus, the number of people present at the monitored location can be used in the determination of whether to trigger the potential crime event.

The alarm controller 1430 can further use data from the motion detector(s) 1455 and/or the seismic sensor(s) 1460 to determine whether or not to notify the alarm trigger system 1435 that a potential theft event is detected. In some cases a motion sensor can be used together with a curtain lens to provide a threshold sensor that can determine when an object (e.g., a person's hand) crosses a threshold. The threshold sensor can be used to confirm breach actions that are identified using the video analytics (e.g., the video analysis performed by the alarm controller 1430). If the video analytics identify a breach action, but the threshold sensor does not detect a breach, an error can be identified. A message can be delivered to a user, which can indicate that remedial action may be needed. In some cases, a breach action that is identified by the video analytics or by the threshold sensor but that is not identified by the other of the threshold sensor or the video analytics can be ignored or discounted by the system, which can reduce false positives. Motion sensors can be used for other features as well. In some cases, the alarm controller 1430 may determine that a person is loitering based on processing the video frame(s). The alarm controller 1430 may further analyze data received from a motion detector 1455 located in or associated with the depicted zone or area to determine the motion detector 1455 detects any motion. If the motion detector 1455 detects motion in the vicinity of the identified loiterer, then the alarm controller 1430 may determine that detection of the loiterer is a false positive and therefore may not relax the user-set parameters. Thus, the motion detector 1455 data and the video frame processing data can be used by the alarm controller 1430 in conjunction to determine whether a potential theft event is detected.

Similarly, if the alarm controller 1430 receives data from a seismic sensor 1460 indicating that vibrations are detected in a depicted zone or area, the alarm controller 1430 may not notify the alarm trigger system 1435 that a potential theft event is occurring unless the alarm controller 1430 also identifies at least one person present in the depicted zone or area via the processing of the video frame(s). Thus, the seismic sensor 1460 data and the video frame processing data can be used by the alarm controller 1430 in conjunction to determine whether a potential theft event is detected.

In an embodiment, the techniques of the video analysis performed by the alarm controller 1430 as described herein can be integrated by a computing device that implements existing video management software. For example, existing video management software may generally analyze images and/or video for motion detection purposes. Such video management software may be improved by using the techniques performed by the alarm controller 1430 to detect not just motion, but also potential theft events. Various types of video analysis can be used, including masked areas, visual tripwire(s), etc. to identify breaches into a monitored area.

Restocking Mode

Periodically, a store employee may restock shelves. The actions performed by the store employee to restock the shelves may mirror breaches, sweeps, or other theft detection events. Thus, during this period, it may be desirable for the alarm controller 1430 to ignore such actions and/or to otherwise not detect a potential theft event to avoid false positives.

Accordingly, the alarm controller 1430 can be configured to enter a restocking mode for one or more monitored zones or areas to reduce the number of false positives. For example, the alarm controller 1430 can enter the restocking mode for a particular zone or area at a set time (e.g., a time that shelves in the zone or area are typically restocked, as set by a user) and/or for a set period of time, based on a user input (e.g., a user identifying a zone or area which should be monitored in the restocking mode) and/or for a set period of time, and/or the like. Thus, the alarm controller 1430 can have one zone or area in a restocking mode while continuing to monitor other zones or areas in a normal mode (e.g., using the techniques described herein).

In the restocking mode, in some embodiments, the alarm controller 1430 ceases processing video frames received from camera(s) 1440 in the zone or area until the zone or area is no longer in the restocking mode. In the restocking mode, in other embodiments, the alarm controller 1430 continues to process video frames received from camera(s) 1440 in the zone or area. However, the alarm controller 1430 may process the video frames to identify specific changes that could indicate a sweep action, but not specific changes that could indicate a breach action (e.g., because the act of restocking a shelf may be more likely to resemble a series of breach actions than a sweep action). Thus, the alarm controller 1430 may continue to process video frames in order to identify certain types of potential theft events, but not other types of potential theft events, while under the restocking mode.

Alternatively, the alarm controller 1430 may process the video frames to identify any type of potential theft event. However, the alarm controller 1430 may use facial recognition to differentiate between store employees and others (e.g., customers). For example, the facial recognition data store 1432 can store facial information of store employees (e.g., images of the faces of store employees). The alarm controller 1430 can use the facial information stored in the facial recognition data store 1432 to identify whether a person depicted in a video frame being processed is a store employee or another person (e.g., by comparing the pixels of the facial information stored in the facial recognition data store 1432 with pixels in the video frame being processed). If the identified person is determined to be a store employee, then the alarm controller 1430 may not identify a potential theft event if a change of pixels that would normally lead to an identification of a potential theft event are attributable to the store employee. If the identified person is determined not to be a store employee (e.g., there is no match between the pixels of the facial information stored in the facial recognition data store 1432 and the pixels in the video frame being processed), then the alarm controller 1430 processes the video frames to identify a potential theft event in a manner as described herein. In some cases, other types of video analysis can be used to identify a store employee, instead of facial recognition analysis. For example, video analysis can identify an employee based on clothing being worn, based on a badge or logo, etc.

Example Theft Event Detection Routine

Figure 18:
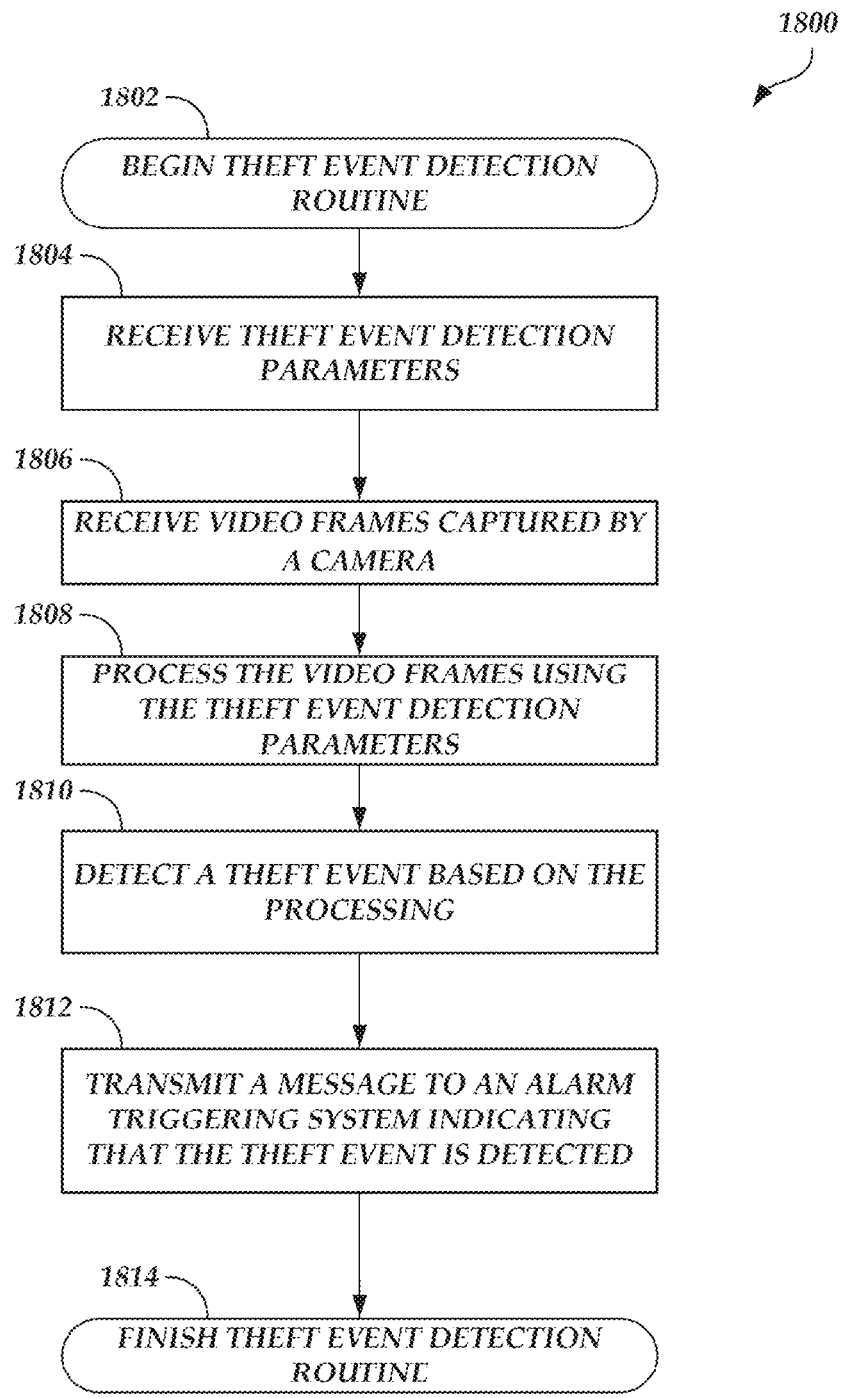
FIG. 18 is a flow diagram depicting a theft event detection routine illustratively implemented by an alarm controller.

FIG. 18 is a flow diagram depicting a theft event detection routine 1800 illustratively implemented by an alarm controller, according to one embodiment. As an example, the alarm controller 1430 of FIG. 14 can be configured to execute the theft event detection routine 1800. The theft event detection routine 1800 begins at block 1802.

At 1804, theft event detection parameters are received. The theft event detection parameters can include the user-set parameters depicted in and/or described with respect to the user interfaces 1500, 1600, and/or 1700.

At block 1806, video frames captured by a camera are received. The video frames may be received from a camera that is associated with a zone or area corresponding to the received theft event detection parameters. The method 1800 is discussed in the context of one camera, but it will be understood that the system can monitor information from multiple cameras (e.g., a multiple areas).

At block 1808, the video frames are processed using the theft event detection parameters. For example, the alarm controller 1430 processes the video frames to identify a threshold number or percentage of pixels in a monitored portion that have changed by a threshold amount or percentage.

At block 1810, a theft event is detected based on the processing. For example, the theft event may be detected based on detecting breach activity or sweep action(s).

At block 1812, a message is transmitted to an alarm triggering system indicating that the theft event is detected. In response, the alarm triggering system can cause the output of an audible message, trigger an alarm, cause a display 1450 to display information or store personnel, call a terminal 1465 and establish a communication link between the camera 1440 and the terminal 1465, cause a camera 1440 to call the terminal 1465 to initiate two-way communications, notify the dispatch system 1415, notify the user device 1402, etc. After the message is transmitted, the theft event detection routine 1800 ends, as shown at block 1814.

Example Use Cases

Figure 19:
FIG. 19 illustrates an example pharmacy at which the system of FIG. 14 can manage inventory and/or detect potential crime.

FIG. 19 illustrates an example pharmacy at which the system 1400 can manage inventory and/or detect potential crime. For example, a camera 1440 of the system 1400 can be located near the ceiling of the pharmacy, pointing at an area 1910 such that the alarm controller 1430 can monitor the area 1910 in a manner as described herein. In particular, the camera 1440 may be positioned such that the alarm controller 1430 can detect the retrieval of items from shelves, counters, cabinets, racks, etc. in the area 1910. Such detection may be used for inventory management purposes and/or to detect potential criminal or otherwise unauthorized activity (e.g., detect whether an item is being stolen, detect whether a particular item is accessed more than allowed by the law, by the premise's rules or regulations, etc.).

While FIG. 19 illustrates an example pharmacy, this is not meant to be limiting. The system 1400 can be set up in a similar manner to monitor shelves, counters, cabinets, racks, etc. at a distribution center, a manufacturing plant, a retail store, a storage facility, and/or any other type of premise at which items are available for retrieval.

Figure 20:

FIG. 20 illustrates the exterior of an example commercial or industrial building 2000 at which the system 1400 can detect potential crime, such as tagging, graffiti, forcible entry, and/or the like. For example, a camera 1440 of the system 1400 can located on the exterior of the building 2000, pointing at an area 2010 exterior to the building 2000 such that the alarm controller 1430 can monitor the area 2010 in a manner as described herein. In particular, the camera 1440 may be positioned such that the alarm controller 1430 can detect tagging or the application of graffiti, a break-in (e.g., via the breaking of locks, the hacking of doors, etc.), or other illegal or unauthorized activity occurring in the area 2010. Other cameras 1440, not shown, may be positioned at other areas external to the building 2000 such that some or all of the exterior of the building 2000 can be monitored by the alarm controller 1430.

While FIG. 20 illustrates an example commercial or industrial building 2000, this is not meant to be limiting. The system 1400 can be set up in a similar manner to monitor the exterior of any structure, such as a residential home, a government building, a vehicle (e.g., a car, a train car, a boat, a plane, etc.), a standalone wall (e.g., a wall of a highway), a bridge, and/or the like.

Figure 21:
FIG. 21 illustrates an example image from a camera monitoring a residential building.
Figure 22:
FIG. 22 illustrate the example image with two monitored areas identified.

FIG. 21 shows an example image from a camera positioned to monitor a front of a residential building. The camera can be a wide-angle camera as shown, although any suitable field of view can be used. The camera can be positioned to monitor a front door, other exterior door, a garage door, a window, a driveway, or various other features of the property. In some instances, the position of the camera can also capture areas outside the property, such as the public sidewalk, the street, neighboring houses, etc. In some cases, a video camera can be combined with a doorbell, which can limit the possible locations for the camera, and in some cases can result in capturing areas where monitoring is not needed or is less important. Even if the camera were positioned to exclude areas outside the property, some areas of the captured image can be more important for monitoring (e.g., external doors, windows) than other less important areas (e.g., driveway, or grass lawn). Some motion detection systems can produce a large number of false positives, which can result in frequent notifications to a home owner or resident or dispatcher or law enforcement. For example, motion outside the property or in less critical areas can trigger an alert, such as a car driving by, a person walking along the sidewalk, a bird flying in the sky, a tree swaying in the wind, etc. The system can enable the user to identify portions of the image for monitoring (e.g., professional motion detection). Other, unspecified areas can be ignored for at least some monitoring types, which can reduce false positives and needless notifications. For example, FIG. 22 shows an example with grid lines shown identifying the groups of pixels that are flagged for monitoring. A mask can be applied to identify the monitored area, such as using a user interface, as disclosed herein. In the example of FIG. 22, the front door and garage door are monitored. The system can show the grid of pixel groups, and the user can identify which groups of pixels to monitor and which to disregard (e.g., for monitoring analysis). In some cases, the user can draw a line around the area to be monitored (e.g., by drawing an outline on a touch screen, and the system can identify which groups of pixels would fall inside the outlined area and which fall outside.

The system can use the alarms in timeframe analysis to further reduce false positives. If a cat were to walk by the front door, for example, that could trigger a single intrusion into the monitored area associated with the front door. However, the system can have a threshold number of breaches within a threshold amount of time before an alert is triggered. However, if a criminal were to approach the front door and proceed to kick the door multiple times to bread into the house, or use tools to try to pick the door lock, those events could register as multiple intrusions into the monitored area associated with the door, which could trigger an event (e.g., an alarm, notification, recording of video footage). In some cases, a first motion detection system can monitor the whole image for a first purpose (e.g., recording video footage when general motion is detected), while a second motion detection system can monitor only the monitored area in the image for a second purpose (e.g., notifications, burglary alarm, etc.). Although FIGS. 21 and 22 show a residential home, other embodiments can apply these features to apartments, office buildings, factories, warehouses, or any other structure or area being monitored.

Figure 23:
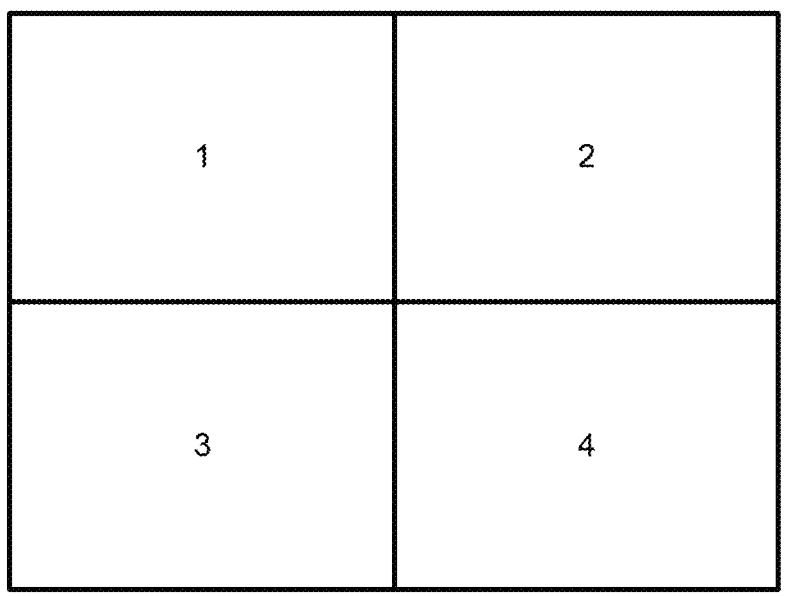
FIG. 23 shows an example embodiment with four motion areas.
Figure 24:
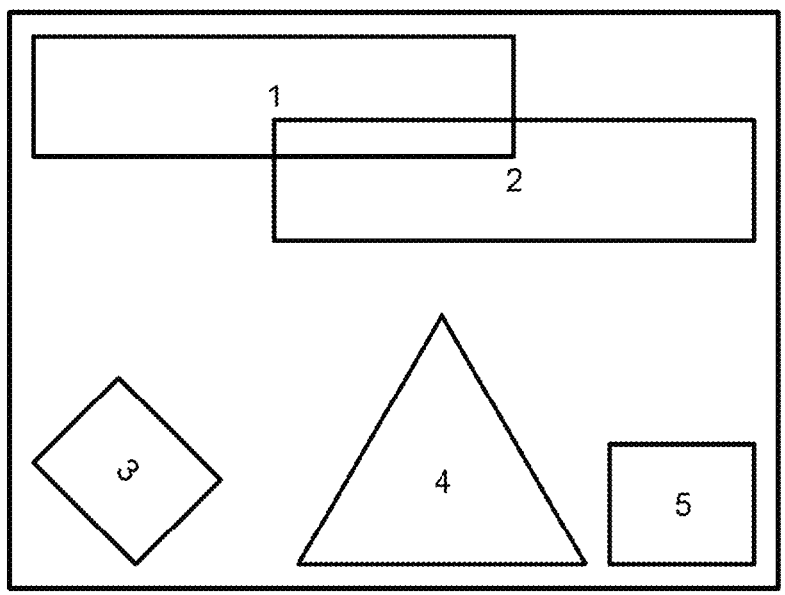
FIG. 24 shows an example embodiment with five motion areas with different user-specified parameters.

The system can have multiple monitored areas (sometimes referred to as motion areas). FIG. 23 shows an example image frame divided into four motion areas. The motion areas can be triggered separately, and each can have different analysis parameters. For example, motion area 1 can determine an event (e.g., trigger an alarm) if a first number of intrusions occur within a first timeframe, motion area 2 can determine an event if a second number of intrusions occur within a second timeframe, motion area 3 can determine an event if a third number of intrusions occur within a third timeframe, and motion area 4 can determine an event if a fourth number of intrusions occur within a fourth timeframe. One or more (or all) of the first through fourth numbers of intrusions and timeframes can be different, or can be the same, in any combination. The other parameters discussed herein (e.g., pixel group size and shape, pixel change threshold, amount of changed pixels threshold, analysis frame rate, intrusion distance threshold, etc.) can be different or the same for the different motion areas. The user interface can enable the user to specify and adjust the parameters for each of the motion areas independently. The user interface can also enable the user to specify or adjust the number of motion areas, and their size, shape, positions, and/or orientations, etc. FIG. 23 shows four motion areas defined as four quadrants in the image frame. FIG. 24 shows an example image frame with 5 motion areas having various different sizes, shapes, positions, and orientations. The image can have portions or areas that are not a part of any of the motion areas (e.g., see FIG. 24) or the motion areas can fill the image frame (e.g., see FIG. 23). In some cases, two or more motion areas can overlap. In the example of FIG. 24, motion areas 1 and 2 partially overlap. Accordingly, some pixels or pixel groups can be shared between multiple motion areas. Changes to the pixels in the shared area can be subjected to the video analytics parameters for each of the overlapping motion areas.

The different motion areas can determine triggering events independently in some embodiments. In some embodiments, the information from multiple motion areas can be used for making the trigger determinations. For example, an aggregate intrusion threshold value and/or time threshold can be specified, where intrusions into any of the motion areas can count towards the number of aggregate intrusions. This can be useful in determining when a group of people is taking items from a shelf for theft. A joint intrusion threshold value and/or time threshold can be specified for any combination of two or more of the motion areas in like manner.

Customer Rush Events and Occupancy Tracking

The customer service needs of a retail store can change depending on the number of customers in the store. For example, a retail store can have multiple point of sale systems (e.g., which can include cash registers, debit/credit card readers, scanners, computer terminals, conveyor belts, and/or bagging stations, etc.). Customer service representatives (e.g., a cashier) often operate the point of sale systems. At any given time, some of the point of sale systems can be open (e.g., operated by a customer service representative) while some of the point of sale system can be closed (e.g., without a customer service representative). If an insufficient number of point of sale system are open, customers may need to wait in line for an extended period of time. This can be frustrating to customers, especially when additional point of sale system are sitting idle nearby. If too many point of sale system are open, one or more customer service representatives may sit idle while waiting for customers, when they could be performing other tasks. It can be difficult to maintain an appropriate number of operating point of sale systems, because the number of customers that are ready for checkout can vary significantly over time.

In some cases, a customer service representative can observe that a significant line of customers has formed and can initiate a request for additional point of sale systems to be opened. Often a customer service representative can be focused on the task at hand and does not appreciate the need for additional open point of sale systems until the problematic line has persisted for enough time to frustrate customers. Also, even after the request, it can take some time for additional customer service representatives to stop or finish their other tasks, move to the point of sale area, and open additional point of sale system(s). Because the request is often made verbally in the presence of the customers, the delay can be emphasized, which can exasperate the problem. In some cases, by the time the additional point of sale systems are up and running, the need has already subsided at least in part. Also, sometimes when additional point of sale systems are opened after a long line has formed, the line is broken so that some customers can change to the new point of sale system. When this happens, some customers that were further back in the original line can be moved to the front of the new line. This can result in a sense of unfairness to the customers who had been ahead in line.

A video analysis system can have one or more cameras for monitoring the point of sale area to monitor the length of the one or more lines. If a line over a threshold size is detected by the video analysis, a request can be sent for additional point of sale systems to be opened. However, this system still relies on a feedback approach and only addresses the problem after the one or more long lines have already formed.

In some embodiments, a predictive or feedforward approach can be used to request additional point of sale systems to be opened before a problematic line has formed. The system can monitor people entering the retail store. When a sufficient number of customers enter the store within an amount of time, the system can determine that a customer rush event has occurred, and can submit a request for additional point of sale systems to be opened. The customer service representatives can open the additional point of sale systems while the customers are shopping so that a sufficient number of systems are available when the rush of customers is ready to check out. The long lines and customer frustration can be avoided. The system can operate "behind the scenes," without being readily apparent to the customers.

Figure 25:
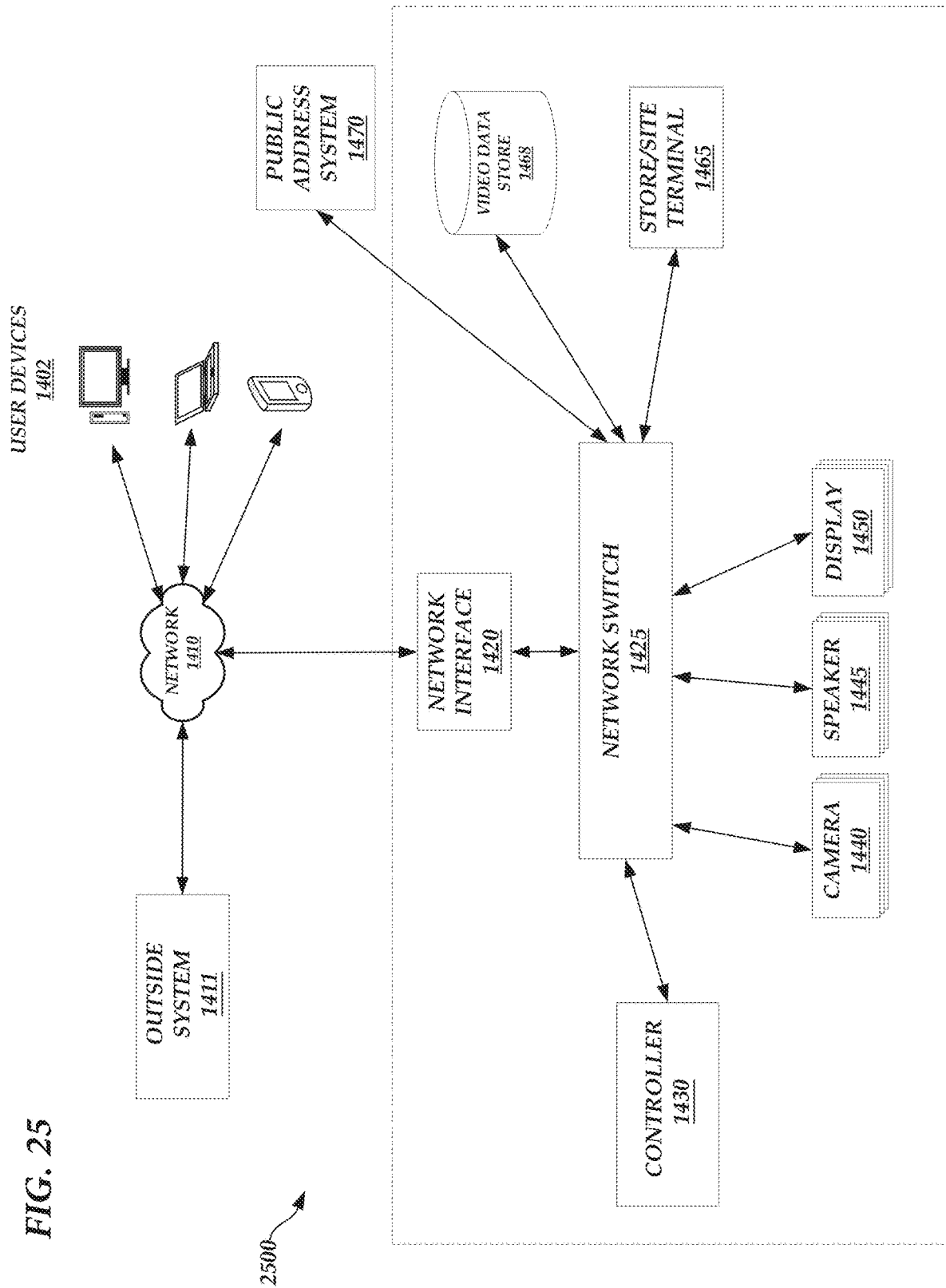
FIG. 25 shows an example monitoring system.

The system can include features that are the same as, or similar to, the other embodiments disclosed herein, and many of those details will not be repeated here, but can be applicable. Systems similar to, or the same as, the systems of FIGS. 13 and 14 can be used, for example. FIG. 25 schematically shows a block diagram depicting components of an example embodiment of a system 2500. The system 2500 can be a monitoring system, such as for monitoring customer traffic, monitoring people movement, monitoring occupancy of a store, building, or other area, monitoring point of sale needs, etc. Many of the components of system 2500 are the same as or similar to the corresponding components of system 1400, and some applicable details and features and alternatives for those components are not repeated here. The system 2500 can include a network interface 1420, a network switch 1425, a controller 1430, one or more cameras 1440, one or more speakers 1445, one or more displays 1450, a store/site terminal 1465, and/or a data store 1468. Some of these components can be omitted, in some embodiments, and additional features described in connection with other embodiments can be optionally included in the system 2500 even though not depicted in FIG. 25. Various types of communication between the components can be used. Wired or wireless communication, or a combination thereof, can be used. The network switch 1425 can interconnect various components, or in some cases the network switch 1425 can be omitted and other communication links can be used.

One or more cameras 1440 can be positioned to monitor one or more entrances or exits to a monitored area. In various examples herein, the monitored area is a retail store, but various other monitored areas can be used, such as a building, a room, an aisle, an area, etc. In some cases, a single camera 1440 can be used. However, in some cases, multiple cameras 1440 can be used, such as to monitor multiple entrances and/or exits. Entrance events and/or exit events detected by different cameras can be aggregated.

The one or more cameras can provide video footage to a controller 1430, which can perform video analysis on the video footage to identify entrance events (e.g., when persons enter the monitored area through an entrance) and/or exit events (e.g., when persons exit the monitored area through an exit). The controller 1430 can have one or more hardware processors (e.g., general purpose computer processor, or application specific integrated circuits, or other suitable circuitry). The controller 1430 can have computer-readable memory with instructions that can be executed by the one or more processors to perform the features and functionality disclosed herein. The controller 1430 can determine a customer rush event has occurred when a sufficient number of persons enter within a set amount of time (e.g., 10 customers within 2 minutes). The controller 1430 can take action in response to the determination of the customer rush event, such as to issue a notification that open additional point of sale systems, or to send more customer service representatives to the store floor, or to a particular area.

The notification can be provided via a public address system 1470, for example as an audio announcement. A pre-recorded audio message (e.g., "More cashiers needed.") can be stored in memory and can be played over one or more speakers 1445 in response to the customer rush event. In some cases, a visual message (e.g., "More cashiers needed" or "Customer Rush Event") can be displayed on a display 1450, such as can be part of a computer system. The display 1450 can be at a front desk, in a back room, at the point of sale area, on a mobile device, etc. In some cases, the notification can include additional information, such as the number of entering customers, the times of the entrance events, and/or picture or video footage of some or each of the entrance events. The additional information can help a user to decide whether or not to issue the request for additional point of sale systems to be opened. For example, a notification can be provided to a terminal 1465 or to a user device 1402 that is configured to receive user input. The notification can include photos of the entrance events. By reviewing the photos, the user can see that a threshold number of 6 entrances was satisfied by a family of 4 (father, mother, and two children), one employee returning from break, and 1 additional customer. The user can decide that no action is needed, and can provide input to disregard the notification or can provide no input so that the notification times out. In a different instance, by reviewing the photos, the user can see that the threshold number of 6 entrances was satisfied by 6 separate customers entered the store. In this instance, the user can decide that one or more additional point of sale system should be opened, and the user can provide input to make or confirm the request. In some cases, the request can be made by default unless the user intervenes to provide instruction to disregard the notification. In some cases, the system can provide multiple options, such as to open 1, 2, 3 or more additional point of sale systems. The terminal 1465 and/or user device 1402 can have one or more user input elements (e.g., buttons, dials, switches, touchscreen, etc.) for receiving user input, as discussed herein.

In some cases, the system 2500 can have data store 1468, which can store pictures of the entrance events and/or exit events, can store occupancy information, can store customer rush event information, etc. This data can be compiled and reviewed to facilitate staffing and hiring decisions, to review employees, to analyze sale conversion rate information, etc. In some cases, the information can be sent (e.g., via the network 1410) to an outside system 1411, such as a remote server, for storage and/or analysis. For example, a company can collect this information from multiple stores for comparison and analysis.

Figure 26:
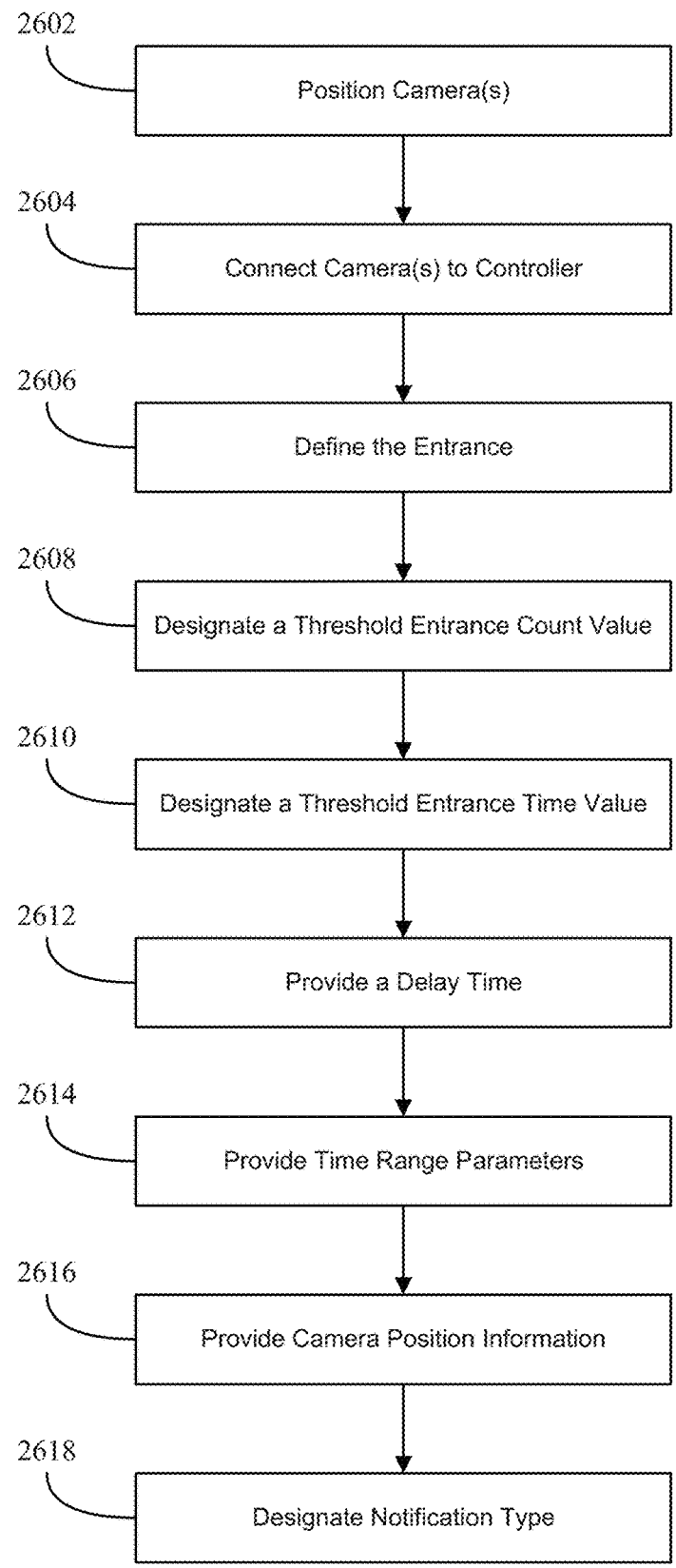
FIG. 26 is a flowchart of an example method for setting up a monitoring system.
Figure 28:
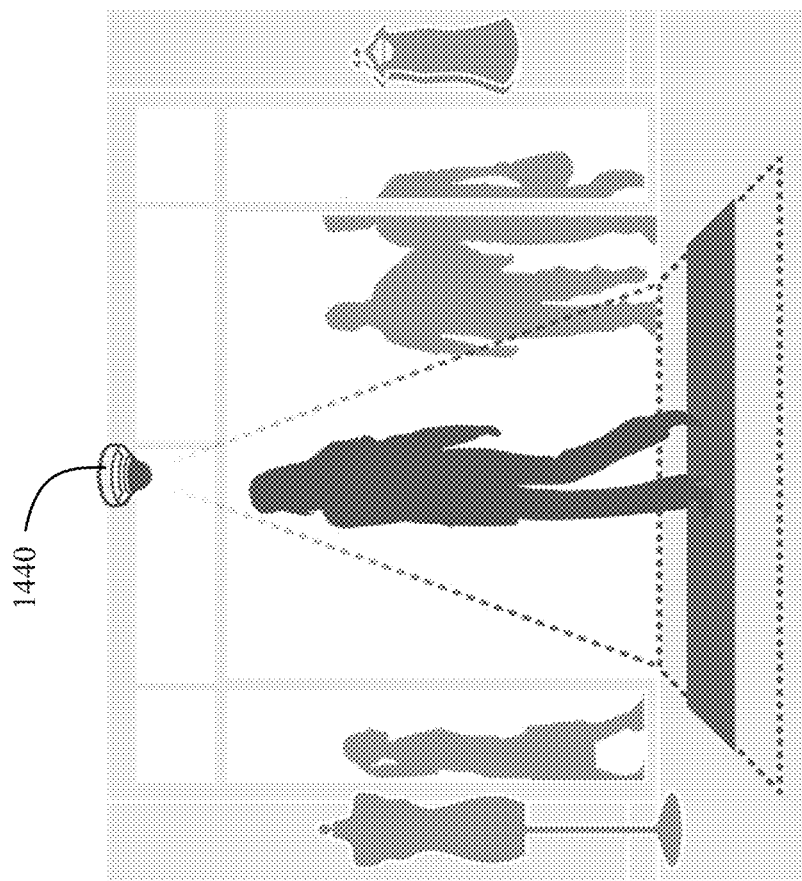
FIG. 28 shows another example embodiment of a camera positioned to monitor an entrance.
Figure 27:
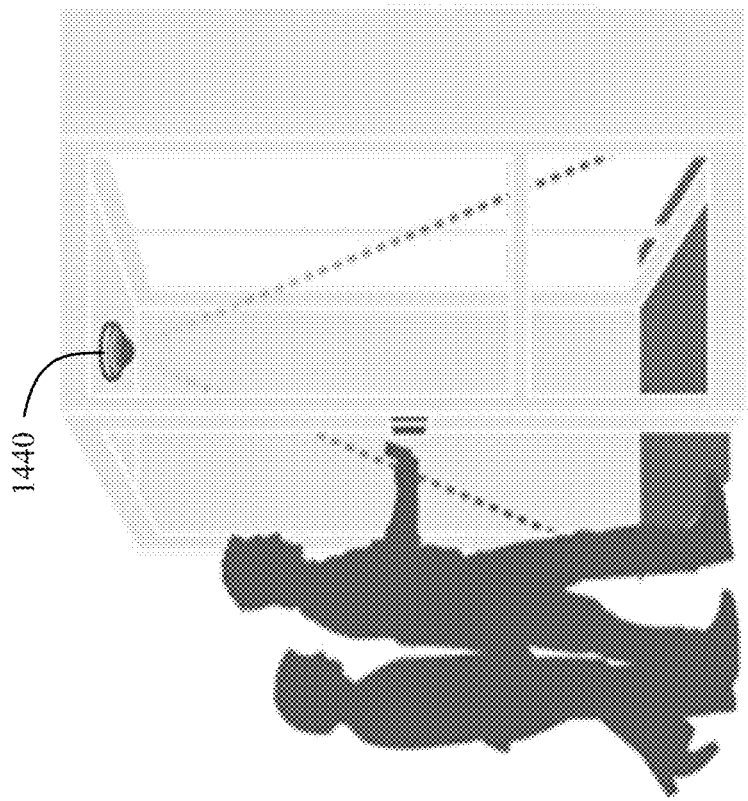
FIG. 27 shows an example embodiment of a camera positioned to monitor an entrance.

FIG. 26 is a flowchart of an example embodiment of a method for setting up a system for monitoring customer rush events. At block 2602, one or more cameras 1440 can be positioned. Any suitable type of camera can be used. The camera 1440 can be positioned generally or directly above an entrance or exit. The camera 1440 can be positioned inside the building or store, etc. facing the entrance or exit. In some cases, the camera 1440 can be positioned outside the building or store to observe people as they initially enter or exit the building or store. By way of example, FIGS. 11 and 12 both show cameras facing towards the "Front Entry," and these cameras could be used to capture video footage for use by the system to determine entrance events and/or exit events. FIGS. 27 and 28 shows example embodiments of a camera 1440 positioned above an entrance/exit of a store. The camera 1440 can be oriented so that people entering or exiting will be visible in the video footage. In some cases, one or more existing cameras that are part of another system (e.g., a security system) can be used.

At block 2604, the one or more cameras 1440 can be connected to the controller 1430. For example, a local network can be set up to transfer data from the camera(s) 1440 to the controller 1430. For example, a network switch 1425 can be installed, wires can be run, or other data transfer elements can be used. Wireless transmitters and receivers can be used. In some cases, video footage from the previously installed camera(s) can be provided to the controller 1430, such as by a wired or wireless connection.

Figure 29:
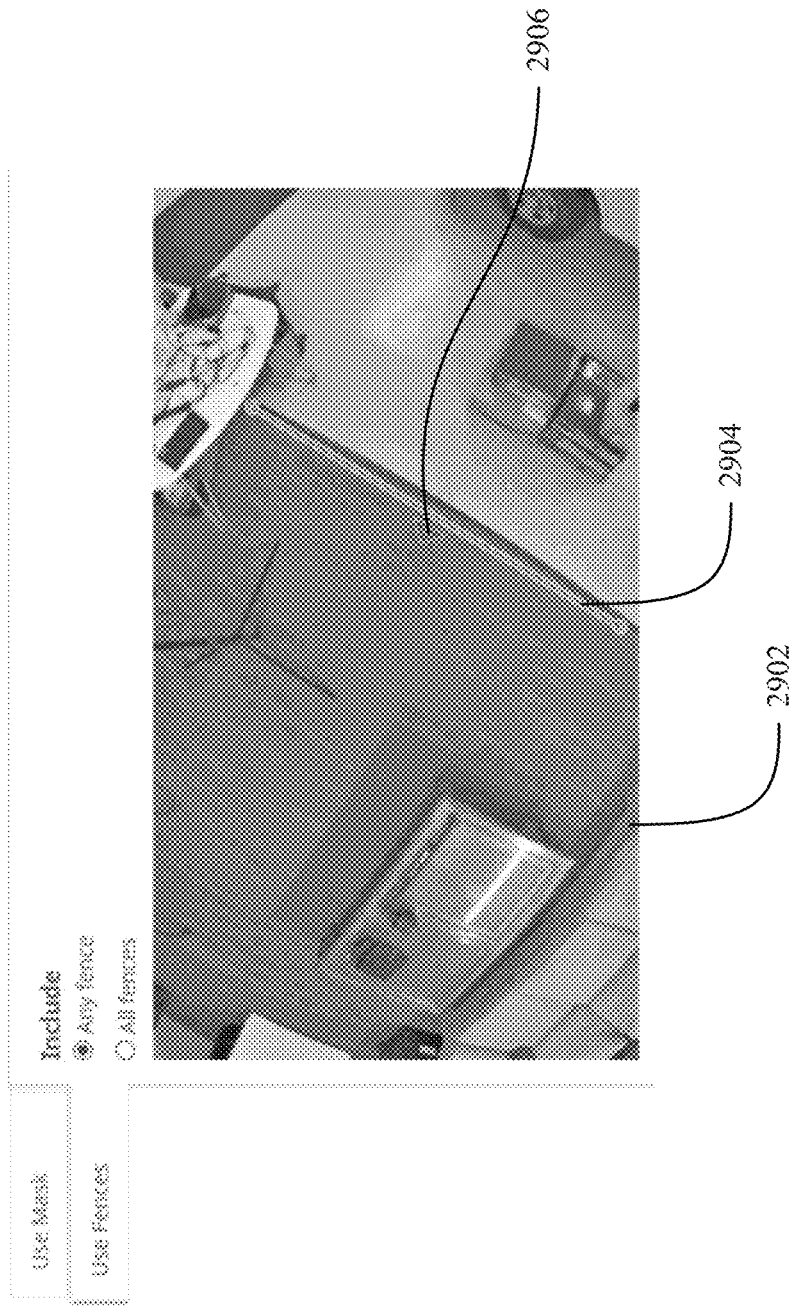
FIG. 29 shows an example user interface for positioning a tripwire to define an entrance in an image.

At block 2606, the entrance can be defined for the video footage. An image frame of the video footage from a camera 1440 can be displayed on a user interface. A user can provide input via the user interface to identify where the entrance is located in the image frame. In some cases, multiple image frames or a video feed can be shown for the entrance designation. User input can be provided using a mouse, touchscreen, electronic pen, keyboard, buttons, or any other suitable user input elements. In some cases, the user can draw a line to define a tripwire or fence across the entrance. FIG. 29 shows an example embodiment of a user interface for designating the entrance. An image frame 2902 from the camera is displayed and a tripwire line 2904 is drawn across the entrance to the monitored area. The user can designate which side of the tripwire is the monitored area, or which direction across the tripwire is an entrance, or which direction across the tripwire is an exit. In FIG. 29, arrow 2906 indicates the entrance direction. In some cases, an entrance direction can be selected by default, and the user can select the arrow 2906 to change the entrance direction to be opposite of the default. For example, by selecting the arrow 2906, the arrow 2906 would change direction to point in the opposite direction. The entrance direction indication can be especially beneficial when a door is used as both an entrance and an exit. In some cases, separate entrances and exits can be used, and the entrance direction can be omitted. For example, the tripwire could count crossings regardless of the direction, such as if a door is used only as an entrance. The controller can use tripwire video analysis to determine entrance events and/or exit events, as discussed herein.

Figure 30:
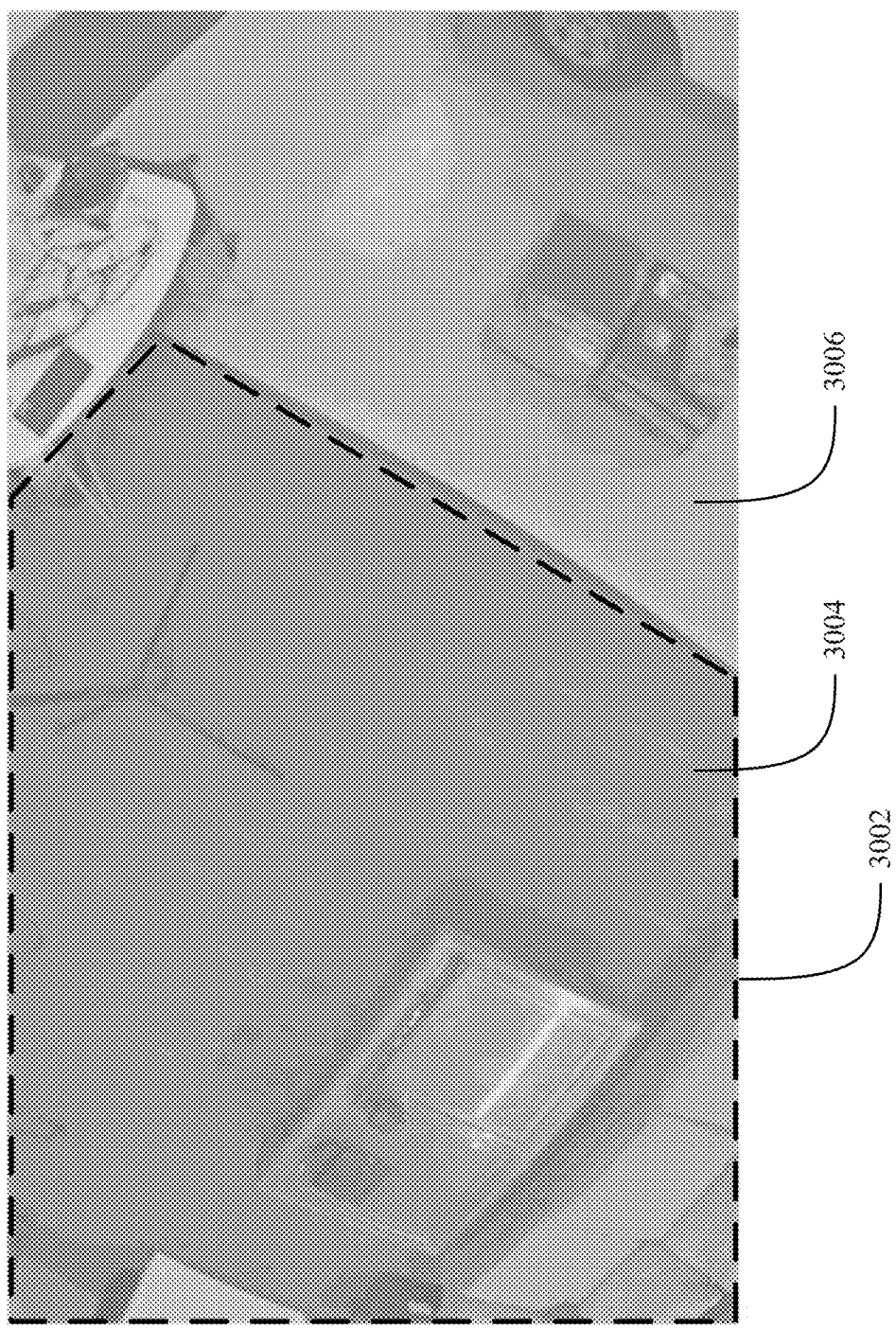
FIG. 30 shows an example user interface for defining a masked area to define an entrance in an image.

In some cases, a mask can be used to designate the entrance. In some cases, the system can use either a tripwire approach or a masked area approach for designating the entrance and monitoring entrances and/or exits. The user interface can receive user input to select between the tripwire or fence approach or the masked area approach, as can be seen in FIG. 29. FIG. 30 shows an example embodiment of a user interface used for designating a masked area 3004 that corresponds to the monitored area in an image frame 3002. The boarder between the masked area 3004 and the non-masked area 3006 can define the entrance and/or exit. The masked area 3004 can be designated using a mouse, touchscreen, electronic pen, keyboard, buttons, or any other suitable user input elements. When a person enters, the entrance can first cause pixel changes in the non-masked area 3006, and as the video frames progress, the pixel changes can move to the border and then cross into the masked area 3004. When a person exits, the exit can first cause pixel changes in the masked area 3004, and as the video frames progress, the pixel changes can move to the border and cross into the non-masked area 3006. The controller can analyze changes in pixels across image frames of the video footage, similar to other embodiments disclosed herein, to determine when a person has entered or exited the monitored area. The user can specify one or more of a grid size or pixel group size, a pixel change threshold, and amount of changed pixels threshold, an analysis frame rate, or other parameters discussed herein, which can be used by the controller for the video analysis. Many variations are possible. In some implementations, multiple masked areas can be used. For example, two masked areas can be arranged so that when pixel changes occur in the first masked area and then later in the second masked area, that can indicate an entrance. When pixel changes occur in the second masked area and then later in the first masked area, that can indicate an exit. The system can have a threshold distance and/or a threshold amount of time for associating the two sets of pixel changes, and in some implementations, a user interface can permit a user to specify or adjust the distance and/or time thresholds. By way of example, with thresholds of 5 seconds and 200 pixels (although other distance units could be used, such as inches, feet, meters, etc. based on the position of the camera), if pixel changes occur in a first location in the first masked area, and then pixel changes occur in a second location in the second masked area, the system can count that as an entrance if the two locations are 200 pixels apart or less, and/or if the two pixel change events happen within 5 seconds of each other. However, if the two pixel change events happen more than 5 seconds apart, in this example, that would not be considered an entrance. Or if the two pixel change locations are more than 200 pixels apart, that would not be considered an entrance. Rather, the two pixel change events could be caused by two different people or objects, etc. The two masked areas can abut each other, or be spaced apart.

At block 2608, the user can designate a threshold entrance count value. At block 2610, the user can designate a threshold entrance time value. The controller can use these parameters when determining whether an event, such as a customer rush event, has occurred. For example, the controller can determine an entrance event each time a person is determined to have entered the store. When a number of entrance events equal to or greater than the threshold entrance count value occur within a time equal to or less than the threshold entrance time value, the controller can determine that a customer rush event has occurred, and can take action in response to that determination, as discussed herein.

FIG. 31 is an example of a user interface configured to enable a user to input information including the threshold entrance count value and threshold entrance time value. The user interface can handle a single camera or multiple cameras. In the example of FIG. 31, four cameras are shown. The camera "Door 1" can be directed to a first door or entrance. The camera "Door 2" can be directed to a second door or entrance. The camera "Retail Shelf 1" can be directed to a first shelf in the store (e.g., containing cosmetics). The camera "Retail Shelf 2" can be directed to a second shelf in the store (e.g., containing liquor). The user can add or remove any number of cameras. The user can specify a rule for each camera, or for groups of cameras. In FIG. 31, the cameras "Door 1" and "Door 2" have the rule "Entry Count" and can be used to count entrance events, such as for monitoring the store for customer rush events. The cameras "Retail Shelf 1" and "Retail Shelf 2" can have the "Breach Count" rule, and can be used for detecting theft events, as discussed herein. A single system can be used to detect retail crime and to detect customer rush events, or separate systems can be used. In some cases, the system can be directed to a single type of analysis or monitoring, and the rule selection element can be omitted. Other rules could also be applied for different types of analysis. Such as occupancy tracking, monitoring entrances and exits, sweep motion detection, etc. The "Trigger Count" parameter can be used to designate the threshold entrance count value. The "Reset Seconds" parameter can be used to designate the threshold entrance time value. In the example of FIG. 31, if 30 or more customers enter the store in 180 seconds or less, the system can determine that a customer rush event has occurred.

At block 2612, the user can designate a delay time amount. In FIG. 31, a delay time amount of 300 seconds (5 minutes) is specified. When a customer rush event is determined to have occurred, the system can wait for the delay amount of time before requesting customer service action (e.g., opening one or more additional point of sale systems). The delay can account for the time that the customers take to shop or collect items for purchase before they proceed to the point of sale area. Different types of stores can have different average shopper times and shopper time variability. Also different stores can have different customer service responsiveness times when a request for additional point of sale systems is made. Accordingly, different amounts of delay time can be appropriate for different stores. In some cases, the delay can be omitted, and the request can be issued when the customer rush event is identified, without any imposed delay. In some cases, the delay can be about 30 seconds, about 1 minute, about 2 minutes, about 3 minutes, about 5 minutes, about 7 minutes, about 10 minutes, about 12 minutes, about 15 minutes, about 20 minutes, about 25 minutes, about 30 minutes, or more, or any values or ranges therebetween, although other delay times could also be used.

At block 614, the user can designate different parameters for different time ranges. In some cases, the number of customers entering a store at one time of day can be a customer rush event that would benefit from additional point of sale systems, while that same number of customers entering the store at a different time of day can be normal customer traffic that does not warrant any special action. FIG. 32 shows an example user interface for specifying different parameters for different time ranges. In this example, the store is open 24-hours. For a first time range from 7:00 am to 11:00 am, a threshold entrance count value of 10 and a threshold entrance time value of 180 seconds can be used. For a second time range from 11:00 am to 4:00 pm, a threshold entrance count value of 20 and a threshold entrance time value of 120 seconds can be used. For a third time range from 4:00 pm to 11:00 pm, a threshold entrance count value of 30 and a threshold entrance time value of 120 seconds can be used. For a fourth time range from 11:00 pm to 7:00 am, a threshold entrance count value of 2 and a threshold entrance time value of 240 seconds can be used. Different delay times can also be used, with the four time ranges having delays of 120 seconds, 260 seconds, 360 seconds, and 0 seconds, respectively. The delay can be omitted entirely in some embodiments. Although not shown in FIG. 32, any of the other parameters disclosed herein can have different values for different time ranges, for customer rush detection, theft detection, occupancy counting, etc.

At block 2616, the user can provide camera position information. The camera position information can be used by the controller for performing person identification. When the controller has information about the position of the camera relative to the area of people traffic, the controller can better understand what a person should look like in the video footage, and the controller can better identify people. For example, if the camera is placed closer to the traffic area, then persons will appear larger in the video footage, and if the camera is place further from the traffic area, then persons will appear smaller in the video footage. By setting the distance information, the controller can be impeded from confusing objects that are too big or too small as people. Similarly, a camera that is positioned directly above a traffic area can tend to view persons from a top-down orientation, whereas a camera positioned alongside the traffic area can tend to view people from a side profile orientation. By providing the controller with camera orientation information, the camera can better anticipate what visual signature people will have in the resulting video footage.

Figure 33:
FIG. 33 shows an example user interface for providing camera information.

FIG. 33 is an example of a user interface for providing the camera position information. The camera position information can include the height of the camera (e.g., 4 meters in this example), the pan angle (e.g., rotation about a vertical axis) of the camera (e.g., 0 degrees in this example), the twist angle (e.g., rotation about a camera axis) of the camera (e.g., 0 degrees in this example, since the camera is directed straight down), and/or the distance of the camera (e.g., how far the camera is offset from the location on the ground it is pointed at (e.g., 0 meters in this example since the camera is pointed straight down). The camera position information can include other parameters in addition to, or instead of, any of the parameters listed in FIG. 33. For example, pitch angle can specify the angle of rotation of the camera about a horizontal axis. The camera information can also include the field of view of the camera. In some embodiments, the user interface an show an image frame 3302 of the video footage (or multiple frames), with one or more models 3304 that approximate people superimposed over the image to show a general size and orientation that people would be expected to appear in the video footage based on the camera information. The user can view the image and superimposed models to assess whether the camera information is correct.

At block 2618, the user can specify a notification type. The notification type can control what action is performed when a customer rush event is identified. As discussed herein, a notification can be sent to various devices, such as a speaker, a display, a terminal a PA system, a mobile device or other user device, and/or an outside system. Various types of notifications can be sent, such as an audio message (e.g., words and/or sounds), a visual message (e.g., text or an icon), an email, a vibration of a user device, etc. When setting up the system, a communication link can be established between the control 1430 and any combination of devices that are configured to receive the notification. In some cases, the controller 1430 can use a computer system and the notification can be provided by the same computer system that is operating as the controller.

In some cases, a notification or other action can wait for confirmation before being completed. For example, a determined customer rush event can trigger a first stage of the notification but wait for confirmation before a second stage of the notification is performed. For example, a first stage of a notification can include a message that a potential customer rush event has been detected, with a query of whether the second stage of the notification should be performed. The user can provide confirmation and the system can proceed to the second stage of the notification, such as a request for more point of sale systems to be opened. The use can provide a denial, and the system would not proceed to the second stage of the notification. In some cases, the system can proceed to the second stage of the notification by default if not denial is received, such as within an amount of time (e.g., about 5 seconds to about 3 minutes, or any value s or ranges therebetween). The first stage of the notification can include additional information to facilitate evaluation or confirmation of the potential customer rush event. For example, the first stage of the notification can include one or more image frames for some or each of the entry events. The user can view the images to determine whether an actual customer rush event has occurred, and can either confirm or deny the event. For example, is a potential customer rush event was triggered because several employees walked into the store, such as for a shift change or after a break, they user can issue a denial. If a potential customer rush event was triggered because a mother entered the store with several young children and each child was counted as a separate shopper, the user can issue a denial.

In FIG. 31, the user interface can enable the user to specify whether the notification requires confirmation before taking action (e.g., requesting additional cashiers). In FIG. 31, the "Confirm" box is checked, so the system can send a first stage notification when a potential customer rush event is detected, and can wait for confirmation before proceeding the second stage of the notification. In some cases, the first and second stages of the notification can be sent to different devices or can be issued in different manners. For example, a first stage notification (e.g., that seeks confirmation) can be sent to a terminal or to a mobile user device that is with a manager. Once confirmation is received, the second stage of the notification can be issued over a PA system, or to mobile user devices that are with other employees (e.g., customer service representatives). Various other combinations of notification delivery devices and manners can be used. If a delay time is specified, in some cases the system can perform the first stage of the notification (e.g., to seek confirmation) without the delay, and the system can wait until after the delay time has passed before performing the second stage of the notification.

In some cases, different notification types or different actions can be performed when different thresholds are satisfied. For example, if 10 customers enter the store within a timeframe, the system can ask for confirmation before requesting 1 additional open point of sale system. For example, the instruction to open a new point of sale system can be sent to a single user device of a single employee. However, if 25 customers enter the store within a timeframe, the system could skip the confirmation step and/or could request more point of sale systems be opened. For example, the instruction to open an additional point of sale system could be sent to 3 user device of 3 separate employees. The user interface can be configured to receive user input to set up multiple threshold levels and different actions for each.

In some cases, the action taken in response to a rush customer event can depend on other parameters, such as the time of day or how many point of sale systems are already operating. In some cases, the system can be integrated with, or in communication with, a store management system, which can have information about how many point of sale systems are currently operating. The user interface can enable a user to specify different actions depending on these additional parameters. For example, the system can store information about how many point of sale system should be open for one or more tiers of customer traffic, occupancy, or rush events. Those values could also vary by time of day, as can be specified or adjusted by a user. The system can track occupancy or identify customer rush events, and if the associated number of desired point of sale systems is less than the number of currently open systems, then an action can be taken (e.g., to request additional open point of sale system(s)).

In FIG. 26, some of the operation blocks can be omitted. For example, in some embodiments, the time delay (block 2612), the time ranges (2614), the camera information (2616), and/or designating the notification type (block 2618) can be omitted. Additional operations or features can be added, as disclosed herein.

Figure 34:
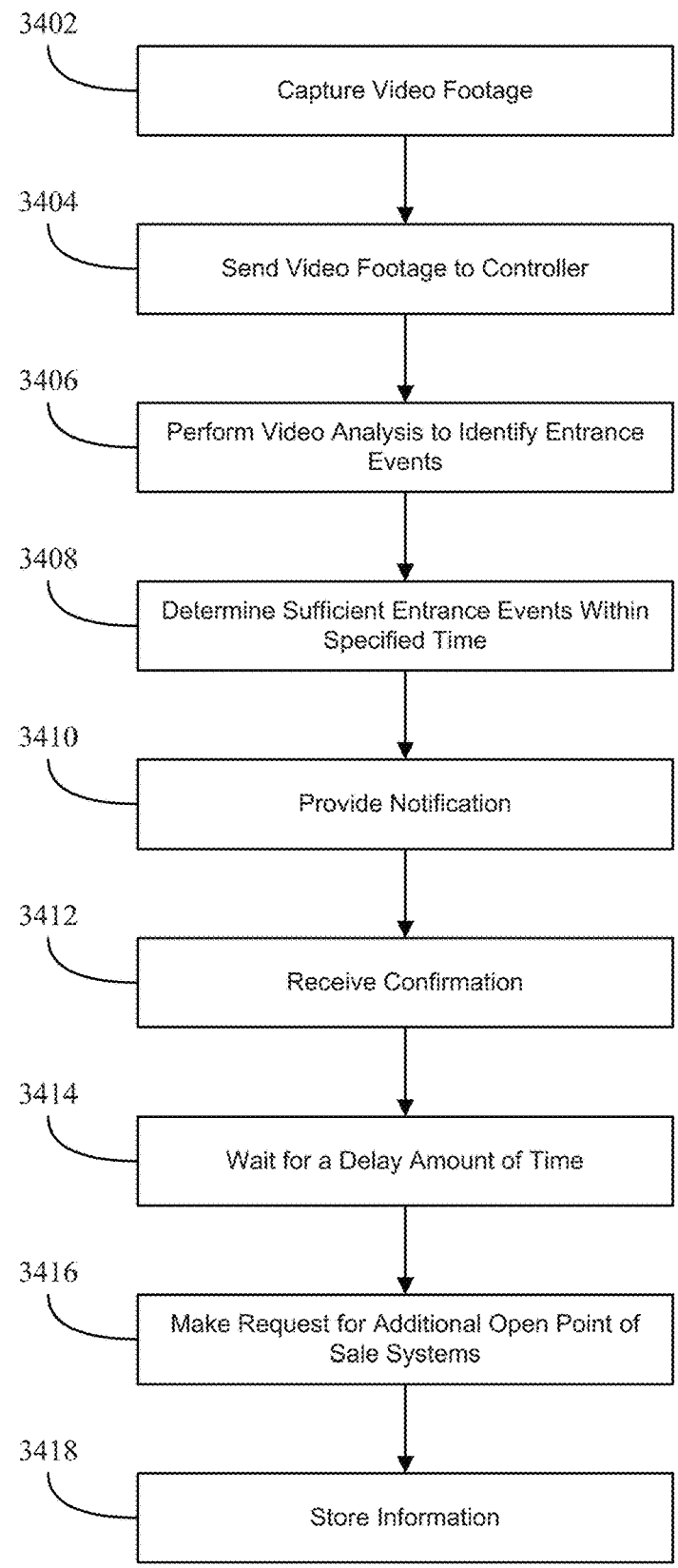
FIG. 34 is a flowchart of an example method for monitoring customer traffic in a store.

FIG. 34 is a flowchart of an example method of operation. At block 3402 video footage can be captured by one or more cameras for an area that includes an entrance. In some cases, multiple cameras can monitor multiple entrances. At block 3404, the video footage can be sent to a controller. At block 3406, the controller can perform video analysis on the video footage to identify entrance events when persons enter through a monitored entrance. In some cases, multiple cameras can monitor a single entrance. The entrance events determined based on the video footage from the multiple cameras can be compared to increase accuracy. For example, if two cameras are used, an entrance event can be counted only if video footage from both cameras identified the entrance event. Or in some cases, any one camera identifies an entrance event it can be counted, which can enable the system to operate even if a camera is blocked. The video analysis can perform person identification and tracking using any suitable techniques known to those of skill in the art. When a person is identified in the video footage and the path of travel of that person crosses a tripwire in the entrance direction, the system can register an entrance event.

At block 3408, the system can determine that a sufficient number of entrance events (e.g., satisfying the threshold entrance count value) has occurred within an amount of time (e.g., satisfying the threshold entrance time value). The system can keep track of how many entrance events have occurred. Various approaches can be used for tracking entrance events. In some cases, a rolling window timeframe can be used. In some cases, the system can track a value of active entrance events, and each entrance event can remain active for the threshold amount of time. By way of example, the threshold number of entrances can be 8 and the threshold amount of time can be 300 seconds. If 2 people enter at 0 seconds, then 2 people enter at 50 seconds, then 1 person enters at 180 seconds, then 2 people enter at 250 seconds, the total can be 7 entrances, which is below the threshold. Then at 300 seconds, the first two entrances of this example can timeout and the total active entrances can drop down to 5. Then if 3 people enter at 320 seconds, a customer rush event can be determined, because the total active entrances has risen to 8, which satisfies the threshold. If those 3 people were to enter the store at 360 seconds, the customer rush event would not be determined because the 2 entrances from 50 seconds would have already timed out.

In some cases, each entrance event can start a new timer that lasts for the threshold amount of time, and each later entrance event that occurs within that amount of time can be counted towards the threshold number. The system can simultaneously track multiple entrance counts. For example, 3 people can enter at 0 seconds, which can start a first 300-second timer and a first count of 3. Then 4 people can enter at 200 seconds, which can increment the first count to 7. This entrance event can also start a second 300-second timer and a second count of 4. Then at 300 seconds, the first timer can timeout. Then if 2 people enter at 320 seconds, the second count can increase to 6. This entrance event can start a third 300-second timer and a third count that starts at 2. Then if 2 people enter at 360 seconds, the second count can reach 8, which satisfies the threshold. Thus, each entrance event could be that first entrance of a series that eventually satisfies the threshold, and each entrance event can also be aggregated with previous entrances that are within the timeframe.

In some cases, one time window can start when a previous time window ends. For example, with a time threshold of 300 seconds (5 minutes), an entrance count can reset every 300 seconds. If the threshold number of entrances (e.g., 10 entrances) is satisfied during any one time window, then the customer rush event can be identified. However, in some cases, entrances that happen near the end of one window and near the beginning of a next window would ne be grouped together using this approach. For example, if a first time window started at 0 seconds, and then 5 people entered at 250 seconds, then the second time window started at 300 seconds, and then 5 more people entered at 350 seconds, the customer rush event would not be triggered using this approach, even though 10 people entered within 100 seconds of each other. In some cases, a rolling time window approach can more accurately identify customer rush events.

In some cases, the video analysis can track a person after they enter. If the person enters and triggers an entrance event, but then the same person exits, the entrance event can be canceled or removed from any applicable counts. If the person exits the field of view of the camera, then the entrance event would not be canceled even if that person turns around and exits. In some cases, a person can enter a store briefly and can remain at the entrance area before leaving the store. The system would be able to avoid counting that person as an active shopper.

In some embodiments, the system can access current time information, can determine which of multiple time ranges to apply, and can access the parameters associated with the time range that corresponds to the current time. A customer rush event can be determined at block 3408 at 7:30 am when 8 or more people enter a store, whereas a customer rush event at 5:45 pm would not be triggered unless 20 or more people enter the store within the same (or different) amount of time.

In some embodiments, the number of entrance events can be aggregated from two or more entrances, such as monitored by two or more cameras. For example, a threshold of 12 entrances can be satisfied if 8 people enter through a first entrance, as shown by video footage from a first camera, and 4 people enter through a second entrance, as shown by video footage from a second camera.

At block 3410 a notification can be provided. In some cases, the notification can be a request for additional point of sale systems to be opened. As discussed herein, the notification can be provided via any combination of devices or manners, such as an audio message, a visual or text message, SMS test message to a mobile device, an email, a radio communication, a pager, or any other suitable communication to a notification device. In some cases, the notification can request confirmation or input from a user before proceeding, and the notification can include information about the entrance events, such as one or more images. At block 3412, confirmation can be received. For example, a user can provide input (e.g., via a user input element on a user device) to confirm the identified customer rush event. If a user provides a denial rather than a confirmation, the method can stop without making a request for additional point of sale systems. At block 3414, the system can wait for the delay amount of time before making the request for additional open point of sale systems, at block 3416, as discussed herein. At block 3418, the system can store information regarding the customer rush event, the entrance events, the confirmation or denial, etc. in memory. That information can be used later to help in making decisions relating to staffing, or hiring, or operating hours.

In FIG. 34, some of the operation blocks can be omitted. For example, in some embodiments, the confirmation (block 3412), the delay time (block 3414), and/or the storing information (block 3418) can be omitted. Additional operations or features can be added, as disclosed herein. Many variations are possible. In some instances, one or more self-check-out stations can be activated in response to an identified customer rush event, in some cases with no user interaction. In some cases, the system can monitor an entrance to an area, such as an aisle in a store, or a section of a showroom, and the system can provide a notification to send additional customer service representatives to that area in response to a customer rush event in that specific area.

A system, such as system 2500 of FIG. 25 or other embodiments disclosed herein, can be used to track the occupancy of a store, a building, a room, or another type of area. The system can track entrances into the area and exits from the area, and can determine the occupancy such as by subtracting the exits from the entrances.

Figure 35:
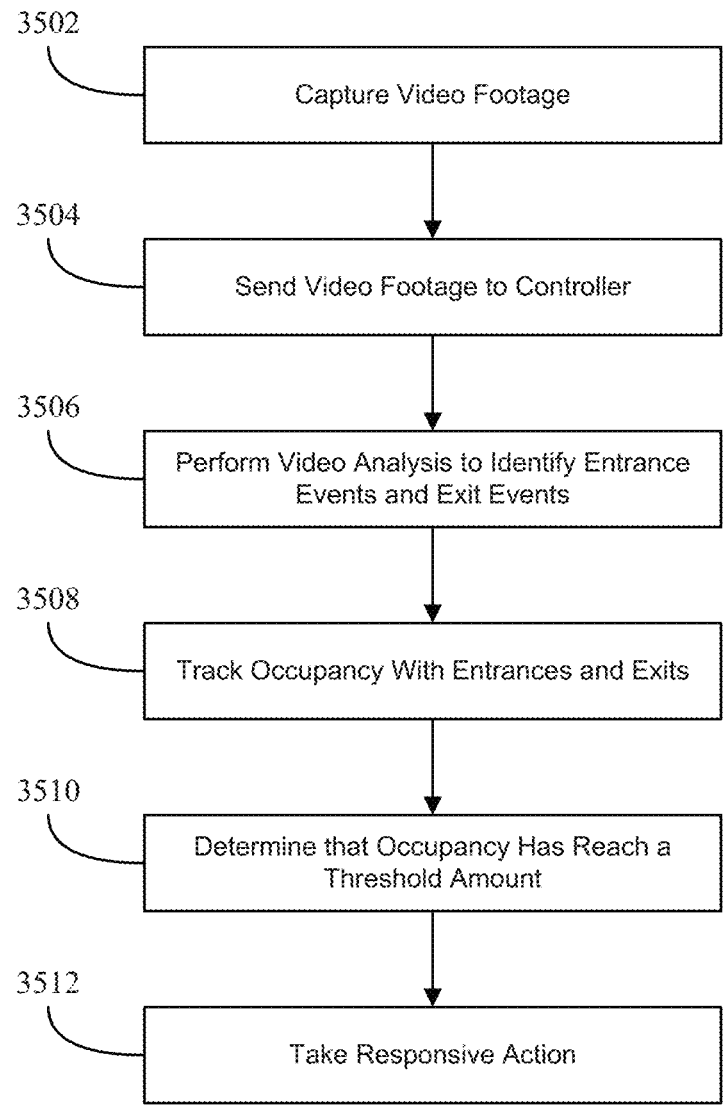
FIG. 35 is a flowchart of an example method for monitoring occupancy.

FIG. 35 is a flowchart of an example method for tracking occupancy. At block 3502 video footage can be captured for one or more entrances and exits for a store or other area. One or more cameras can be used to monitor the one or more entrances and exits. In some cases, a single door or other opening can serve as both an entrance and an exit, and a single camera can be used. In various embodiments herein, a single camera can monitor multiple doors or passageways if the camera is positioned to capture video footage for the multiple door or passageways. In some cases, separate cameras can be used to monitor separate doors or passageways (e.g., separate entrances and exits).

At block 3504 the video footage can be sent to a controller, as discussed herein. At block 3506, the controller can perform video analysis, as described herein, and can identify entrance events and exit events. The video analysis can include person identification and/or tracking. When an identified person moves across a tripwire or boundary in an entrance direction, an entrance event can be determined. When an identified person moves across a tripwire or boundary in an exit direction, an exit event can be determined. At block 3508, the controller can track the occupancy based on the entrance events and the exit events. For example, an entrance event can cause the occupancy value to increase (e.g., by one when a single person enters). An exit event can cause the occupancy value to decrease (e.g., by one when a single person exits). A running occupancy total can be maintained by incrementing and decrementing the occupancy based on the entrances and exits.

Figure 36:
FIG. 36 is an example image showing video analysis for occupancy monitoring.

FIG. 36 shows an example image frame from video footage for a camera monitoring a joint entrance and exit for a store. A tripwire has been positioned in the image to define the entrance and exit. The entrance direction in this image is from the top down, and the exit direction in this image is the from the bottom up. Rectangles are shown in the image for identified persons. In the image two persons have been identified. One person has recently crossed the tripwire resulting in an identified entrance event, and in this example causing the entrances value to increment from 11 to 12. FIG. 36 shows an "in:" value of 12. A second person is identified in the image of FIG. 36, with a rectangle place on the person. The second person has not yet reached the tripwire, and has not yet been counted as an entrance event. In FIG. 36, a third person is partially visible, and is also moving toward the tripwire. However, the system has not yet identified the third person, and no rectangle is present to highlight the third person. Once the third person is fully visible in the frame, the controller can identify the third person and track his movement as well. A few seconds after the image of Frame 36, the second and third persons will have crossed the tripwire as well, and the system will have registered two additional entrances, thereby incrementing the entrance count to 14. In the example of FIG. 36, the system had previously identified 8 exit events. FIG. 36 shows an "out:" value of 8. For example, in previous frames people were identified and those identified people moved upward in the image through the tripwire to trigger an exit event determination. At the moment of FIG. 36, the determined occupancy can be 4, with 12 entrances minus 8 exits. A few seconds after FIG. 36, when the second and third people discussed above cross the tripwire, the determined occupancy can increase to 6, with 14 entrances minus 8 exits.

At block 3510, the controller can determine when the occupancy has satisfied a threshold. For example, an occupancy threshold value can be stored in memory and compared to the current occupancy. If the current occupancy is equal to or greater than the occupancy threshold value then the system can take an action at block 3512. The occupancy threshold value can be set similar to the threshold entrance count value, or other threshold values discussed herein, such as by a user interface. In some cases, multiple occupancy thresholds can be used to trigger different actions. For example, for a first threshold (e.g., store occupancy of 18) the system can have a target number of 2 operating point of sale systems and can open a new point of sale system if needed. For a second threshold (e.g., store occupancy of 25) the system can have a target number of 3 operating point of sale systems and can open a new point of sale system if needed. Various additional thresholds can be used. In some cases, the occupancy tracking can be used to determine a customer rush event. For example, if the occupancy increases by a threshold amount (e.g., the threshold entrance count value) within a timeframe (e.g., the threshold entrance time value) then the system can identify a customer rush event and can take action as discussed herein. In some implementations, the occupancy can reset (e.g., to 0) periodically or at specified times, such as before opening, after closing, each day at 2:00 am, every 24 hours, every 6 hours, every 1 hour, or any other time interval, multiple times per day (e.g., before opening, after breakfast, after lunch, and/or after dinner for a restaurant).

Various other actions can be taken in response to the occupancy satisfying a threshold. For example, the occupancy threshold can be set to correspond to a safety code, such as the maximum occupancy for a building or store (e.g., set by a fire code or other safety system). If the determined occupancy were to reach the specified threshold, a safety notification can be issued. The safety notification can be a message to a manager, an announcement, an alarm, or any suitable message delivered to any suitable device. In some cases, the threshold can be set blow the safety code occupancy maximum, and when the threshold is reach a warning message can be sent (e.g., to a manager) to provide notice that the occupancy is approaching the maximum safety code occupancy, so that appropriate intervention or other action can be taken.

In FIG. 35 some of the operation blocks can be omitted, combined, or additional features and details can be added. For example, in some cases, no threshold determination (block 3510) or action (block 3512) is performed. The system can, for example, store the occupancy information, in computer readable memory or a data storage device. The occupancy information can be used to make decisions relating to staffing, hiring, operating hours, stocking schedules, etc. In some cases, notifications can be sent for requesting one or more additional point of sale systems to be opened. In some cases, the system can request confirmation before proceeding with the request, as discussed herein. In some cases, the system can delay the request or other action, similar to the discussion herein for other embodiments.

The occupancy threshold value can be the maximum occupancy for a building or room, such as according to a building code. In some cases, the system can use an occupancy threshold value that is lower than the maximum permissible occupancy, such as to facilitate social distancing. In some embodiments, an occupancy threshold can be set lower than the maximum or target occupancy, so that a notification can be issued before the occupancy reaches the maximum or target occupancy. In some cases, the system can issue multiple notifications or take multiple actions at multiple different occupancy thresholds. For example, an alert can be issued (e.g., to a cell phone or terminal device) when the occupancy reaches a first threshold, and an audible notice can be delivered (e.g., via a PA system or speaker) when the occupancy reaches a second (e.g., higher) threshold. In some cases, the system can issue a notification or take other action when the occupancy is approaching a threshold value. In some embodiments, the notification or other action can be initiated in response to the occupancy trend, or a predicted future occupancy value, or other information in combination with, or instead of, the current occupancy. For example, the system can determine a predicted future occupancy value, such as based on the current occupancy, a trend based on recent changes in occupancy (which can be stored in the system memory), and/or historical occupancy information (which can be stored in the system memory). For example, if the system predicts that the occupancy will reach an occupancy threshold within a specified amount of time, the system can issue a notification or take an action, as discussed herein. The user interface can enable a user to specify the occupancy threshold, the specified amount of time, and/or the manner of determining the predicted future occupancy. In some embodiments, a display can show the current or predicted occupancy. For example, a display at an entrance can show the current occupancy or vacancy. The system can be used in a retail store, in some embodiments, but various other applications are possible, such as for a parking garage or structure, a club, church, or social event, etc. The system can monitor multiple entrances and/or exits (e.g., using multiple cameras) and can aggregate the count of entrance events and/or exit events across the multiple entrances and/or exits. Where a door is a shared entrance and exit, the system can monitor the direction of travel to distinguish between entrance events and exit events. When a door is a dedicated entrance or exit, the system can merely identify the breaches and can count entrance events or exit events accordingly.

In some embodiments, the system can have different occupancy thresholds or other parameters for different times, such as for different times of day, or different days of the week, etc. By way of example, during a first time period a store might have a relatively large number of employees working, and a higher occupancy threshold can be used, such as for triggering events. During a second timer period a store might have a relatively small number of employees working, and a lower value for the occupancy threshold can be used, such as for triggering events. During off hours, for example, a store might have only 4 employees working or only one open point of sale station, and an occupancy of 10 can trigger a notification (e.g., an alert to open a point of sale station). During busy hours, for example, the store might have 10 employees working or 4 open point of sale stations, and an occupancy threshold of 50 can be used. Different thresholds for different times can be used for the embodiments that determine a rush event based on entrances within a time frame. For example, during a first time period 10 entrances within 5 minutes can trigger a rush event, whereas during a second time period 30 entrances within 3 minutes can trigger a rush event. Many variations are possible.

The rush or occupancy events can be used to trigger various actions, as discussed herein. An audio message can be delivered, and the audio message can be a public message (e.g., delivered via a PA system) or a private message (e.g., delivered to a store manager via a headset or speaker in a private office or other location). The system can interface with other components, such as other security system components. In some cases, a security alarm can be triggered. In some cases, an event can be flagged in a video recording system. The video recording system can store an amount of footage before and/or after the flagged event in the video footage (e.g., even if other non-flagged video footage is discarded). In some cases, the video recording system can enable a user to quickly view footage associated with one or more flagged events without going through the un-flagged footage. The system can display video footage in response to the determined event, such as on a public display, which can be visible at a store entrance, or at a merchandise location, or at a customer service terminal. Video footage of the rush event can be displayed. In some cases, a determined rush event can trigger a change in parameters for other security components, such as a breaches-in-time theft detection system, as described herein. For example, if a retail rush has occurred, the system can make the breaches-in-time system more sensitive (e.g., triggered more easily, such as by lowering the threshold number of breaches), or it can make the system less sensitive (e.g., by raising the threshold number of breaches).

In some embodiments, one or more components of the system (e.g., the systems of FIGS. 14 and/or 25) can be incorporated into the camera. The camera can include a controller or processor for performing video analysis on the camera itself. The camera can include computer-readable memory or storage, which can store video footage, and/or can store instructions that are executable to perform the functions described herein. The camera can communicate with other components of the system (e.g., to trigger an alarm, display a warning, transfer video footage, etc.) via a wired or wireless communication system. By performing video analysis on the camera, the amount of data transferred from the camera can be reduced. For example, the camera can perform video analysis on the video footage that it captures without transferring that video footage to a different device. When the camera determines that an event has occurred, the camera can send instructions, information, and/or video footage associated with that event to one or more other devices. During times when the camera determines that no event has occurred, the camera can perform monitoring without data communication with any external devices. The process of setting up the system can be simplified by using a camera with an integrated video analytics processor, or other integrated components. In some embodiments, the camera can be used as a stand-alone monitoring system.

Figure 37:
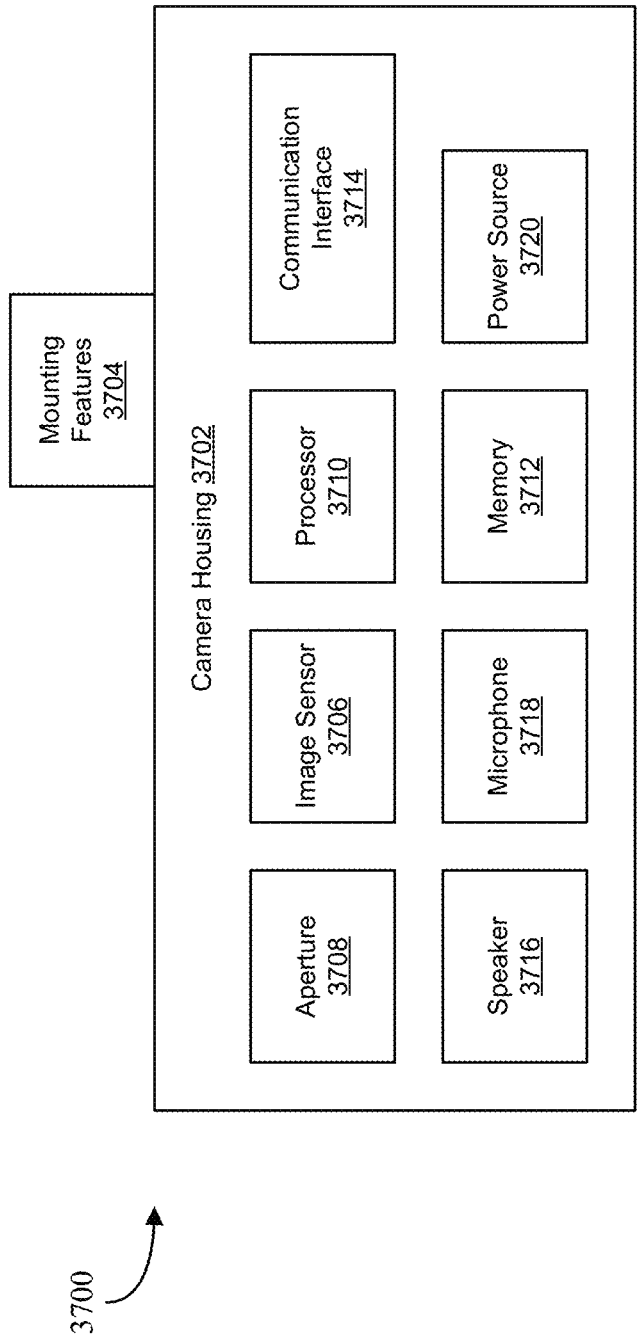
FIG. 37 is a block diagram of an example embodiment of a camera, which can include on-board video processing features.

With reference to FIG. 37, a camera 3700 can include a camera housing 3702. The camera 3700 can include one or more mounting features 3704, which can be configured to mount the camera housing 3702 to another structure, such as a ceiling, wall, frame, shelf, stand, etc. The one or more mounting features 3704 can include one or more clips, bolts, threaded holes, brackets, etc. In some cases, the mounting features 3704 can include one or more movable components, such as a ball and socket joint, a hinge, a telescoping arm, etc., so that the orientation of the camera 3700 can be adjusted. The camera 3700 can include optical and/or electrical components for capturing images, such as video footage. The camera 3700 can include an image sensor 3706, such as complementary metal-oxide-semiconductor (CMOS) or charge-coupled device (CCD) image sensor, although any suitable type of image sensor can be used. The image sensor 3706 can receive light and can produce electrical signals for producing digital images, such as video footage. The image sensor 3706 can be inside the housing 3702. The camera 3700 can include an aperture 3708 for directing light to the image sensor 3706. Although not shown in FIG. 37, the camera 3700 can include other optical components, such as a shutter, one or more lenses, one or more filters, etc. that can be used to control the light being directed to the image sensor 3706. These components can be inside the camera housing 3702. The aperture 3708 can include an opening in the housing 3702.

The camera 3700 can include a controller, which can be used to perform image processing or analysis of the images produced using the image sensor 3706. The controller can be inside the camera housing 3702. The camera 3700 can include a processor 3710, which can be a general or specialized hardware processor. The processor 3710 can execute instructions stored in computer-readable memory 3712, such as to perform video analysis and/or to perform the other functions disclosed herein. The memory 3712 can include parameters for the video analysis. For example, the memory on the camera can include data indicated a monitored area within the video footage (e.g., as a masked area), and a threshold breach count value, a threshold breach time value, a threshold breach distance, pixel difference criteria, threshold sweep distance value, threshold sweep time value, grid or pixel group size and/or shape, threshold amount of pixel change, threshold amount of changed pixels, analysis frame rate, re-intrusion time value, or any of the other parameters or values discussed herein. The memory 3712 can include a removable storage device, such as an SD card, or permanent on-board storage, or any other suitable type of computer memory.

The camera 3700 can include a communication interface 3714, which can be a wired or wireless communication interface. The communication interface 3714 can include a port for receiving a wired connection. The communication interface 3714 can include one or more antennas for receiving and/or transferring data wirelessly. The communication interface 3714 can be used to set or adjust the various parameters, which can be stored in memory 3712. For example, an external device (e.g., a computer, laptop, tablet, smartphone, or other computing device) can be used to present a user interface that enables a user to set or adjust various parameters, as discussed herein. In some embodiments, the memory 3712 on the camera 3700 can include instructions for implementing the user interface on the external device. The user can connect the external device to the camera 3700 (e.g., via a wired connection to a port), or can establish a wireless communication link between the external device and the camera 3700, and instructions on the camera memory 3712 and/or on the external device can implement the user interface on the external device, so that the user can set or adjust the parameters for the video analysis or other parameters stored in the camera memory 3712. The communication interface 3714 can also be used to communicate with other devices in the system, such as with an alarm system, an external controller, external data storage, a store terminal, a user device, a speaker, a display, etc., as discussed herein.

In some embodiments, the camera 3700 can include a user interface, which can be used to set or adjust the parameters (e.g., without using an external device). For example, the camera 3700 can include a display or other output element for conveying information to a user, and can include one or more user input elements, such as one or more buttons, dials, switches, or a touchscreen, etc., which can receive user input, such as for setting or adjusting the parameters.

The camera 3700 can include a speaker 3716, which can perform functions similar to those discussed in connection with speaker 1445, or other speakers discussed herein. The camera 3700 can use the speaker 3716 to output a prerecorded audio message or sound when the video analysis determines that an event has occurred. For example, when a potential crime event has been determined (e.g., by the video analysis identifying a threshold number of breaches within a threshold amount of time), the camera 3716 can play a voice recording configured to deter the crime. For example, in a retail store a voice recording can say "Security to aisle 3" or "Thank you for your interest in product X, a customer service representative has been requested to assist you." In some cases, an alarm or other sound can be used. In some embodiments, the camera 3700 can communicate with an external speaker (e.g., a PA system) to output a sound or audio recording.

In some embodiments, the camera 3700 can include a microphone 3718. The camera 3700 can record audio information that corresponds to the video footage. The audio can be sent to a terminal or user device (e.g., for 2-way communication, as discussed herein). The audio can be stored along with the corresponding video footage. The camera can include a power source 3720, such as a battery or wired connection to an external power supply.

The camera 3700 can store video footage in its local memory 3712 and/or in an external data store 1468. In some cases, the camera 3700 can store a running window of video footage, so that video footage is stored for a period of time and then deleted after the period of time (e.g., to make room for newer video footage). When an event is determined, the camera 3700 can store a section of video footage associated with the event, such as for a period before and after the event. That video footage that is associated with an event can be kept after the period of time when it would otherwise have been deleted. The camera 3700 can also send the video footage associated with an event to a data store 1468 that is external to the camera 3700. The video footage that is associated with an event can be stored in multiple locations, such as for redundancy.

The video analysis can be performed by the camera 1440 or 3700 or by an alarm controller 1430, or any other suitable device. Various edge devices could be used to perform the video analysis. A camera, camera server, terminal, routing device, etc. can include the processor 3710 and memory 3712, which can be used to perform video analysis, such as to identify events based on a threshold number of breaches within a threshold amount of time.

Terminology

In some embodiments, the methods, techniques, microprocessors, and/or controllers described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. The instructions can reside in RAM memory, flash memory, ROM memory, EPROM memory, EEPROM memory, registers, hard disk, a removable disk, a CD-ROM, or any other form of a non-transitory computer-readable storage medium. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques.

The microprocessors or controllers described herein can be coordinated by operating system software, such as iOS, Android, Chrome OS, Windows XP, Windows Vista, Windows 7, Windows 8, Windows 10, Windows Server, Windows CE, Unix, Linux, SunOS, Solaris, iOS, Blackberry OS, VxWorks, or other compatible operating systems. A universal media server (UMS) can be used in some instances. In other embodiments, the computing device may be controlled by a proprietary operating system. Conventional operating systems control and schedule computer processes for execution, perform memory management, provide file system, networking, I/O services, and provide a user interface functionality, such as a graphical user interface ("GUI"), among other things.

The microprocessors and/or controllers described herein may implement the techniques described herein using customized hard-wired logic, one or more ASICs or FPGAs, firmware and/or program logic which causes microprocessors and/or controllers to be a special-purpose machine. According to one embodiment, parts of the techniques disclosed herein are performed a controller in response to executing one or more sequences instructions contained in a memory. Such instructions may be read into the memory from another storage medium, such as storage device. Execution of the sequences of instructions contained in the memory causes the processor or controller to perform the process steps described herein. In alternative embodiments, hard-wired circuitry may be used in place of or in combination with software instructions.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the techniques described herein may be implemented in analog circuitry or mixed analog and digital circuitry.

Unless the context clearly requires otherwise, throughout the description and the claims, the words "comprise," "comprising," "include," "including," and the like are to be construed in an inclusive sense, as opposed to an exclusive or exhaustive sense; that is to say, in the sense of "including, but not limited to." The words "coupled" or connected," as generally used herein, refer to two or more elements that can be either directly connected, or connected by way of one or more intermediate elements. Additionally, the words "herein," "above," "below," and words of similar import, when used in this application, shall refer to this application as a whole and not to any particular portions of this application. Where the context permits, words in the Detailed Description using the singular or plural number can also include the plural or singular number, respectively. The words "or" in reference to a list of two or more items, is intended to cover all of the following interpretations of the word: any of the items in the list, all of the items in the list, and any combination of the items in the list. All numerical values provided herein are intended to include similar values within a range of measurement error.

Although this disclosure contains certain embodiments and examples, it will be understood by those skilled in the art that the scope extends beyond the specifically disclosed embodiments to other alternative embodiments and/or uses and obvious modifications and equivalents thereof. In addition, while several variations of the embodiments have been shown and described in detail, other modifications will be readily apparent to those of skill in the art based upon this disclosure. It is also contemplated that various combinations or sub-combinations of the specific features and aspects of the embodiments may be made and still fall within the scope of this disclosure. It should be understood that various features and aspects of the disclosed embodiments can be combined with, or substituted for, one another in order to form varying modes of the embodiments. Any methods disclosed herein need not be performed in the order recited. Thus, it is intended that the scope should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. Any headings used herein are for the convenience of the reader only and are not meant to limit the scope.

Further, while the devices, systems, and methods described herein may be susceptible to various modifications and alternative forms, specific examples thereof have been shown in the drawings and are herein described in detail. It should be understood, however, that the disclosure is not to be limited to the particular forms or methods disclosed, but, to the contrary, this disclosure covers all modifications, equivalents, and alternatives falling within the spirit and scope of the various implementations described. Further, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant." Unless stated otherwise, all measurements are at standard conditions including ambient temperature and pressure.

The invention claimed is:

1. A system comprising:
a camera positioned to produce video footage of a region that includes an entrance of a retail store;
a controller comprising:
a hardware processor; and
non-transitory computer-readable memory in communication with the hardware processor, the memory containing a threshold entrance count value, a threshold entrance time value, and instructions executable by the processor to cause the controller to:
receive the video footage from the camera;
analyze the video footage from the camera to identify entrance events when persons enter the retail store through the entrance;
analyze the video footage to identify a first entrance event;
start a timer for the threshold entrance time value in response to identifying the first entrance event;
analyze the video footage to identify additional entrance events that occur during the timer for the threshold entrance time value;
determine a total number of entrance events that occurred within an amount of time that satisfies the threshold entrance time value; and
determine a customer rush event when the total number of entrance events satisfies the threshold entrance count value within the amount of time that satisfies the threshold entrance time value; and
provide a notification in response to the determination of the customer rush event.

2. The system of claim 1, wherein the instructions are executable by the processor to cause the controller to wait a delay amount of time after determining the customer rush event and to provide the customer service notification after the delay amount of time.

3. The system of claim 2, wherein the delay amount of time is between about 1 minute and about 30 minutes.

4. The system of claim 2, wherein a user interface is configured to enable user adjustment of the delay amount of time.

5. The system of claim 1, wherein a user interface enables user adjustment of the threshold entrance count value and user adjustment of the threshold entrance time value.

6. The system of claim 1, the customer service notification comprises an audio message delivered by a speaker.

7. The system of claim 1, the customer service notification comprises a message provided to a mobile device.

8. The system of claim 1, comprising one or more additional cameras positioned to produce video footage of one or more additional regions that include one or more additional entrances of the retail store, wherein the instructions are executable by the processor to cause the controller to:
receive the video footage from the one or more additional cameras;

analyze the video footage from the one or more additional cameras to identify entrance events when persons enter the retail store through the one or more additional entrances; and determine the customer rush event by at least identifying an aggregate number of entrance events for the entrances that satisfies the threshold entrance count value within the amount of time that satisfies the threshold entrance time value.

9. The system of claim 1, wherein the memory contains a plurality of time ranges, a plurality of threshold entrance count values associated with the respective plurality of time ranges, a plurality of threshold entrance time values associated with the respective plurality of time ranges, and wherein the instructions are executable by the processor to cause the controller to determine the customer rush event using the respective threshold entrance count value and threshold entrance time value that correspond to the time range that includes the current time.

10. The system of claim 1, wherein the instructions are executable by the processor to cause the controller to analyze the video footage to perform person identification.

11. The system of claim 10, wherein a user interface is configured to enable a user to define a line at the entrance, and wherein the instructions are executable by the processor to cause the controller to identify an entrance event by identifying a person in the video footage and determining that the person crossed the line in an entrance direction.

12. The system of claim 1, wherein the notification is a customer service notification.

13. The system of claim 1, wherein the notification comprises a request for additional cashiers.

14. A method comprising:
positioning a camera to monitor a region that includes an entrance;
establishing communication between the camera and a controller so that the camera sends video footage to the controller for analysis;
accessing at least one image frame from the camera;
using a user interface to define the entrance in the at least one image frame;
using the user interface to designate a threshold entrance count value;
using the user interface to designate a threshold entrance time value;
wherein the controller is configured to:
analyze the video footage from the camera to identify entrance events when persons enter through the entrance;
analyze the video footage to identify a first entrance event;
start a timer with a duration set to the threshold entrance time value in response to identifying the first entrance event;
identify a number of additional entrance events during the duration of the timer; and
determine a total number of entrance events that occurred within an amount of time that satisfies the threshold entrance time value;
determine an event when the total number of entrance events satisfies the threshold entrance count value within the amount of time that satisfies the threshold entrance time value; and
provide a notification in response to the determination.

15. The method of claim 14, comprising using the user interface to position a tripwire line to define the entrance.

16. The method of claim 14, comprising using the user interface to designate a masked area to define the entrance.

17. The method of claim 14, comprising using the user interface to designate a delay amount of time, wherein the controller is configured to wait for the delay amount of time after the determination before providing the notification.

18. The method of claim 14, comprising positioning multiple cameras to monitor multiple entrances, wherein the controller is configured to aggregate entrance events from the multiple entrances.

19. The method of claim 14, comprising:
using the user interface to assign a time range to the threshold entrance count value and the threshold entrance time value; and
using the user interface to designate one or more additional time ranges and one or more additional threshold entrance count values and one or more additional threshold entrance time values that are associated with the one or more additional time ranges;
wherein the controller is configured to determine which time range applies to the time of analysis and to use the threshold entrance count value and the threshold entrance time value that are associated with applicable time range.

20. The method of claim 14, wherein the notification is a customer service notification.

21. The method of claim 14, wherein the notification is a request for additional point of sale systems to be opened in a store.

* * * * *